United States Patent
Faustini

(10) Patent No.: US 6,438,615 B1
(45) Date of Patent: *Aug. 20, 2002

(54) SYSTEM, METHOD AND ARTICLE OF MANUFACTURE FOR USING MULTIPLE BIDIRECTIONAL PORTS IN ASSOCIATION WITH A JAVA APPLICATION OR APPLET

(75) Inventor: Antony Azio Faustini, Palo Alto, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,664

(22) Filed: Jan. 31, 1997

(51) Int. Cl.[7] .................................. G06F 9/44
(52) U.S. Cl. ............................ 709/315; 717/1
(58) Field of Search ................. 395/683, 710, 395/653, 651, 335, 680; 345/335, 967, 964, 961; 717/1; 709/315; 713/100, 1

(56) References Cited

U.S. PATENT DOCUMENTS

| | | | | |
|---|---|---|---|---|
| 4,813,013 A | | 3/1989 | Dunn ........................ 364/900 |
| 4,901,221 A | | 2/1990 | Kodosky et al. ............ 364/200 |
| 4,914,568 A | | 4/1990 | Kodosky et al. ............ 364/200 |
| 5,212,792 A | * | 5/1993 | Gerety et al. ............... 395/650 |
| 5,214,756 A | * | 5/1993 | Franklin et al. ............ 395/159 |
| 5,291,587 A | | 3/1994 | Kodosky et al. ............ 395/500 |
| 5,301,301 A | | 4/1994 | Kodosky et al. ............ 395/500 |
| 5,301,336 A | | 4/1994 | Kodosky et al. ............ 395/800 |
| 5,315,703 A | | 5/1994 | Matheny et al. ............ 395/164 |
| 5,325,533 A | * | 6/1994 | McInerney et al. ......... 395/700 |
| 5,367,633 A | | 11/1994 | Matheny et al. ............ 395/164 |
| 5,386,568 A | * | 1/1995 | Wold et al. ................. 395/700 |
| 5,388,264 A | | 2/1995 | Tobias, II et al. .......... 395/650 |
| 5,444,642 A | * | 8/1995 | Montgomery et al. ...... 364/550 |
| 5,485,617 A | | 1/1996 | Stutz et al. ................. 395/700 |
| 5,553,227 A | | 9/1996 | Berry ......................... 395/161 |
| 5,848,291 A | * | 12/1998 | Milne et al. ................ 395/806 |
| 5,850,548 A | * | 12/1998 | Williams ................... 395/701 |
| 5,862,052 A | * | 1/1999 | Nixon et al. .......... 364/468.24 |
| 6,009,466 A | * | 12/1999 | Axberg et al. .............. 709/220 |

OTHER PUBLICATIONS

W. R. Stevens, UNIX Network Programming, Prentice Hall, Inc., pp. 267–275, 1990.*
S. Sechrest, "An Introductory 4.4BSD Interprocess Communication Tutorial", 4.4BSD Programmer's Supplementary Documents, O'Reilly & Associates, Inc., Tab 20, Apr. 1994.*

(List continued on next page.)

Primary Examiner—Alvin Oberley
Assistant Examiner—Sue Lao
(74) Attorney, Agent, or Firm—Beyer Weaver & Thomas, LLP

(57) ABSTRACT

Method, system and article of manufacture for creating object oriented components having one or more bidirectional ports for use with in connecting object oriented based components. The two way or bidirectional ports are first initialized to their two way state. The ports can then dynamically function as either input or output ports based solely on the manner in which they are used. The components set themselves internally to reflect the actual status of their bi-directional ports. When a connection to another component is completed, the connecting component object sends a message to the component at the other end of the connection indicating how its own port is set, input or output. The message receiving component then makes sure that its connection participating port is set oppositely. If the message receiving component's connecting port is bidirectional, that port is set opposite to the status of the first connected port. If the message receiving component's port is unidirectional and as such is in conflict with the status of the first connected port, that is, it is set to "output" when the first connected port is also set to "output", the connection is prohibited and an appropriate error message is displayed.

30 Claims, 33 Drawing Sheets

OTHER PUBLICATIONS

D. Calhoun, A. Lewandowski, "Object Oriented Framework for Dynamical Systems Modeling: Implementation in C + +", IEEE/IEE Publications Ondisc, pp. 70–77, 1994.*

M. Yasrebi, "Experience with Distributed Objects in a Portable and Multithreaded Library for a LAN/WAN Gateway Application", IEEE/IEE Publications Ondisc, pp. 164–173, 1995.*

Dan Joshi, Laura Lemay, and Charles Perkins, *teach Yourself Java in Café in 21 Days*, pp. 292–322, U.S.A.

George Shepherd, *Visual C++ 5.0 Simplifies the Process for Developing and Using COM Objects*, Microsoft Systems Journal, May 1997, vol. 12, No. 5, pp. 37–47, U.S.A.

Gess Shankar, *Web application development environment; Hahtsite: Enterprise–class tool*, InfoWorld, Mar. 17, 1997, Intranet World, p. 54a, U.S.A.

Herb Bethoney, *HAHTSite Gives Pros Everything They Need*, PC Week, Mar. 10, 1997, p. 36, U.S.A.

Maggie Biggs, *BETA; Java development tool; Mojo working on data support*, InfoWorld, Feb. 3, 1997, Intranet World, p. IW/1, U.S.A.

Maggie Biggs, *Penumbra's got its Mojo working for Java–based apps*, InfoWorld, Nov. 18, 1996, vol. 18, No. 47, p. IW4; ISSN: 0199–6649, U.S.A.

* cited by examiner

SYSTEM, METHOD AND ARTICLE OF MANUFACTURE FOR USING MULTIPLE BIDIRECTIONAL PORTS IN ASSOCIATION WITH A JAVA APPLICATION OR APPLET

COPYRIGHT NOTIFICATION

Portions of this patent application include materials that are subject to copyright protection. The copyright owner has no objection to the facsimile reproduction by anyone of the patent document itself, or of the patent application, as it appears in the files of the United States Patent and Trademark Office, but otherwise reserves all copyright rights whatsoever in such included copyrighted materials.

FIELD OF THE INVENTION

This invention generally relates to improvements in computer software and, more particularly, to dynamically settable bidirectional ports for use with object-oriented components

BACKGROUND OF THE INVENTION

Object-oriented based programming (OOP) is probably the most arresting, stimulating and intriguing aspect of programming in today's software world. Although it has been available for some time in languages such as Simula and SmallTalk and recently in C++ and Java, OOP has only recently taken hold as the hoped for solution to closing the gap between the theoretical capability of hardware and the general performance of software while simultaneously solving problems left over from prior software development approaches.

In the past, programming development which began with a single procedure approach, evolved to modular programming, went from there to structured programming and then branched off into computer aided software engineering (CASE) and program generators. All of these methodologies, while solving some or many of the difficulties inherent in prior approaches, introduced their own limitations and inefficiencies. Program bloat, data corruption and "spaghetti" code were but a few of the problems that were caused or left unsolved by the aforementioned software development approaches.

In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Into to this breach, entered Object-Oriented Programming (OOP) techniques which involve the definition, creation, use and destruction of "objects." Objects are self-sufficient software entities comprising data elements and routines, or functions, sometimes called methods, which are used to manipulate the data elements. The object's data and related functions are treated by the software as an entity and they can be created, used and deleted as if they were a unitary item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not per se objects themselves, but which act as templates that instruct a compiler how to construct an actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct and initialize the object and its data members. Likewise objects are destroyed by a special function called a destructor. Objects are employed by using their data and invoking their functions to accomplish a task.

The concept of an object is predicated on and the benefits of object-oriented programming techniques arise from the use of three basic principles; those of encapsulation, polymorphism and inheritance. These principles work in conjunction with objects as described below. It is noteworthy to distinguish between an object and a class of objects. A class is a type definition or template used to create objects in programs. The objects so created are then merely each a single instance of the class of objects, which is often just called a class. A class has no memory or behavior of its own except to serve as the blueprint from which objects can be created.

An object is a self-sufficient component that includes both data and function. An object is of the same type as the class from which it has been derived. Objects are said to be instantations of their class and use memory for their data and functions, unlike the class template itself which does not.

Objects can be designed to hide, or encapsulate, all, or a portion of, their internal data structure and internal functions. OOP also allows a programmer to create an object that is a part of another object and thereby define assemblies and sub-assemblies, as may be required by a program or the situation or item it is modeling.

More particularly, during program design, a program developer can define objects in which all or some of the data variables and all or some of the related functions are considered "private" or made available for use only by the object itself. Other data or functions can be declared "public" or available for use by other objects or programs.

Further, access to private variables by other objects or programs can be controlled by defining public functions for an object which access the object's private data. The public functions form a controlled and consistent interface between the private data and the "outside" world. Any attempt to write program code which directly accesses the private variables causes the compiler to generate an error which stops the compilation process and prevents the program from being run.

Polymorphism is capability to conceal the different implementations behind a common interface. This means that separate objects of the same class can have different internal functions and data and implement received messages differently, but still produce uniform or consistent results. For example, an addition function may be defined as variable A plus variable B (A+B) and this same format can be used whether variables A and B represent numbers, characters or monetary units such as dollars and cents. However, the actual program code which performs the addition may differ widely depending on the type of variables that comprise A and B. Polymorphism allows three separate objects that employ different function definitions to be written, one for each type of variable (numbers, characters and dollars). After the functions have been defined, a program can later refer to the addition function by its common format (A+B) and, during compilation, the OOP based compiler will determine which of the three functions needs to be used by examining the variable types. The compiler will then substitute the proper function code in the object it compiles. Polymorphism allows similar functions that produce analogous results to be "grouped" in the program source code to produce a more logical and clearer program flow.

The third principle which underlies object-oriented programming is that of inheritance. Inheritance allows program developers to easily reuse pre-existing programs or portions thereof to avoid creating software from scratch. The principle of inheritance allows a software developer to declare classes (and the objects which are later created from them) as related. Specifically, classes may be designated as subclasses of base classes. A subclass "inherits" and has access to all of the public functions of its base classes just as if these functions appeared in the subclass. Alternatively, a subclass can override some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs while still taking advantage of reusing prior, usually debugged and well behaved code, rather than having to write and qualify new code of their own.

By utilizing the concepts of encapsulation, inheritance and polymorphism, an object can be made to accurately and independently represent just about anything in our world, real or simulated. In fact, the limits of our logical perceptions of such representation is the only restraint on the kinds of things that can become objects in object-oriented software. Some typical categories are as follows:

Objects can represent physical objects, such as airplanes in an air traffic control system, components in a stereo or television system, balance sheet and income statement elements in a fundamental analysis company business model, or stars in the simulated night sky on display at a planetarium;

Objects can represent elements of the computer-user environment such as windows, scrollbars, sliders, menus or other graphical items;

An object can represent a collection of data, such as a personnel file or a table of the latitudes and longitudes of cities; or An object can represent user-defined data types such as time, angles, and complex numbers, functions or points on the plane.

While object-oriented programming offers significant improvements over other programming concepts in the design and development of programs, program development and program development tools, even within an OOP environment, still require significant outlays of time and effort. This is particularly true where the developer has to write a significant amount of code from scratch and is unable to take full advantage of the benefits of object oriented programming. The ability of development tools to negate or reduce the need to write code in the traditional sense and permit a developer to concentrate on development and visually interact with an enriched development tool is the focus and goal of the present invention.

It is usually the case that proponents of a particular type of programming language or of a specific language of that type are best able to advance their cause and the popularity and vitality of the language type or specific implementation or dialect of the language they support.

This is usually done by directly or indirectly providing appropriate tools that make use of the language type or a specific implementation of the language easy, practical and efficient. Visual Basic and Visual C++ are examples of two current programming environments with an object oriented foundation that have been developed and made available for programmers to use in creating applications for the Windows 3.x, Windows 95 and Windows NT platforms. While Visual Basic and Visual C++ undoubtedly make program development easier by including tools, called Wizards, that relieve the programmer of the necessity to write the underlying Basic or C++ code needed to create and implement such typical graphical user interface (GUI) elements as scrollbars, sliders, buttons or dialog boxes and to define their properties, these tools do not go far enough in easing the programmer's development burden. For example, it is still necessary in either Visual Basic and Visual C++ for the programmer to write code that defines and controls the interrelationship of the elements selected for use in the program under development or to otherwise manually intercede in the object based "point and click" or "drag and drop" aspects of this program development process.

This is true in the development of general OOP based applications and also in development environments for creating Applets in a JAVA system. As the Java system and applet creation becomes more widely used, the need to simplify the development of these applications becomes desirable. In addition, while the developer in these prior art visual programming environments is given a Wizard that writes the underlying code to make an event involving one or more of the selected elements occur, the ability to simultaneously view and experience that interrelationship is not provided.

It would be desirable to provide the tool's objects or components with bidirectional ports that can function as input or output pins in a dynamic fashion without specific user designation of their role to thereby conserve screen real estate, reduce clutter and ease use of the design tool for the user.

SUMMARY OF THE INVENTION

It is a primary object of the present invention to provide a programming environment and appropriate tools and components therefor that promote greater ease of use than is presently available in typical programming environments.

It is an additional object of the present invention to provide bidirectional ports that can be dynamically set to be either an input or an output port.

It is a further object of the present invention of the present invention to minimize clutter and preserve screen real estate through the use of bidirectional ports.

It is yet another object of the present invention to provide the user with means to utilize such bidirectional ports in an effective, non-intrusive manner.

The above objectives are achieved by utilizing bidirectional ports in association with object-oriented components. The two way or bidirectional ports are first initialized to their two way state. The ports can then dynamically function as either input or output ports based on the manner in which they are used. The components set themselves internally to reflect the actual status of their associated bi-directional ports. When a connection to another component is completed, the connecting component object sends a message to the component at the other end of the connection indicating how its own port is set, to input or output. The message receiving component insures that its connection participating port is set oppositely. If the message receiving component's connecting port is bidirectional, that port is set opposite to the status of the first connected port. If the message receiving component's port is unidirectional and as such is in conflict with the status of the first connected port, that is, it is set to "output" or "input" when the first connected port is also set to "output"or "input" respectively, the connection is prohibited and an appropriate error message is displayed

BRIEF DESCRIPTION OF THE DRAWINGS

The above and further advantages of the invention may be better understood by referring to the following description in conjunction with the accompanying drawings, in which.

DETAILED DESCRIPTION

Figure 1:
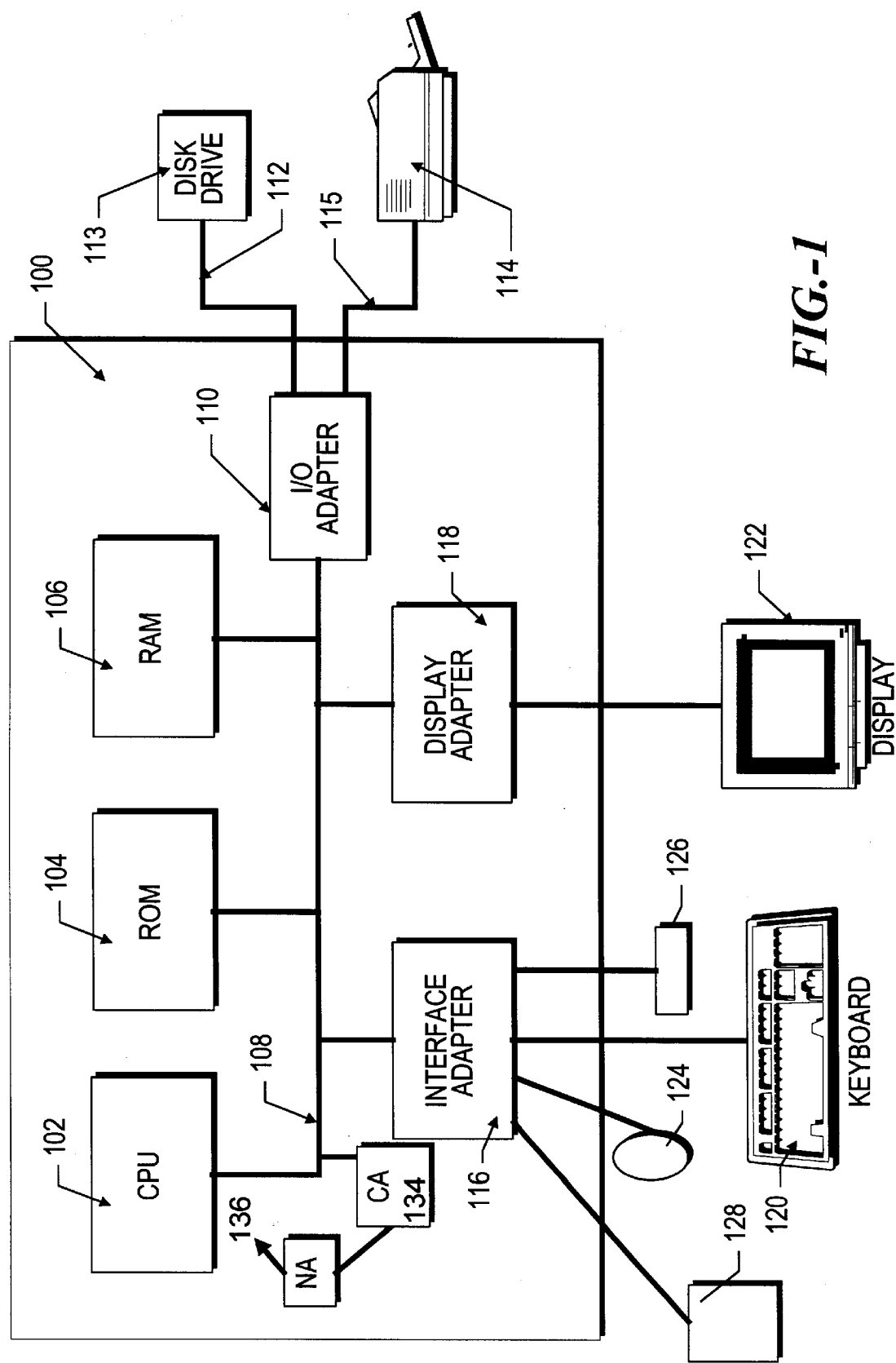
FIG. 1 is a block schematic diagram of a typical computer system, for example, a personal computer system on which inventive object-oriented based programming tools or development environment functions can operate in accordance with the present invention.

The invention is preferably practiced in the context of a suitable operating system resident on a workstation or desktop computer, such as a SUN, IBM, PS/2, or Apple, Macintosh, computer. A representative hardware environment is depicted in FIG. 1, which illustrates a typical configuration for a computer system 100 that can be utilized to practice the subject invention. The computer 100 is controlled by a central processing unit 102 (which may be a conventional microprocessor). A number of other units, all interconnected via a system bus 108, are provided to accomplish specific tasks. Although a particular computer may only have some of the units illustrated in FIG. 1, or may have additional components not shown, most computers will include at least the units shown.

Specifically, computer system 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk drive unit 113 and printer 114 to the bus 108, via cables 112 and 115, respectively. A user interface adapter 116 is also provided for connecting input devices, such as a keyboard 120, and other known interface devices including a microphone 124, a mouse 126 and a speaker 128, to the bus 108. Visual output is provided by a display device 122, such as a video monitor, which is connected via display adapter 118 to bus 108. Lastly, a communications adapter 134, connected to bus 108, provides access to a network 136.

The computer 100 has resident thereon and its basic operations are controlled and coordinated by operating system software such as the SUN Solaris, Windows/95, Windows NT or the Java OS operating system. For purposes of the preferred embodiment as described herein, regardless of the operating system being used, computer 100 is provided, at the very least, with the Java run time environment and an optional Just-In-Time (JIT) Java compiler.

In a preferred embodiment, the invention is implemented in the Java programming language, relying substantially on its object-oriented programming techniques. Java is a compiled language, that is, Java based programs are typically written in a human-readable script which is eventually provided as input to another program called a compiler. The compiler generates a byte code version of the script that can be loaded into, and directly executed by, any computer which contains a Java virtual machine. Java objects are compiled to class files that include bytecodes representative of the original source code program with references to methods and instance variables of the Java objects. The bytecodes are not specific to particular machines or operating systems and don't have to be recompiled or rearranged to run on different hardware/software platforms. Rather, the bytecodes can be run in the Java Virtual Machine (Java VM) or passed to a (JIT) compiler that converts them into native code for a target platform on the fly.

This means that the original Java application or applet bytecode, which isn't specific or native to any one hardware platform or architecture, can be run without recompilation on any hardware or software platform that has a Java Run-Time Environment. In other words, a Java program's native architecture is the Java VM which is or will soon be available in both software and hardware implementations, making Java applications and applets multi-platform capable as long as the target system is Java enabled. As described below, the Java language has certain characteristics which allow a software developer to easily use and reuse programs written by himself or others while still providing a reason for reuse of programs or portions of programs to prevent their destruction or improper use.

Sun's Java language has emerged as an industry-recognized language, not only for "programming the Internet, but also as" . . . a serious programming language capable of tackling the most sophisticated business applications." Sun defines Java as: "a simple, object-oriented, distributed, interpreted, robust, secure, architecture-neutral, portable, high-performance, multithreaded, dynamic, buzzwordcompliant, general-purpose programming language. Java supports programming for the Internet in the form of platform-independentJava applets." Java applets are small, specialized applications that comply with Sun's Java Application Programming Interface (API) allowing developers to add "interactive content" to Web documents (e.g. simple animation, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution".

Another technology that has function and capability similar to JAVA is provided by Microsoft and its ActiveX technology, to give developers and Web designers the wherewithal to build dynamic content for the Internet and personal computers. ActiveX runs only the so-called Wintel platform (a combination of a version of Windows and an Intel microprocessor), as contrasted with Java which is a compile once, run anywhere language.

ActiveX includes tools for developing animation, 3-D virtual reality, video and other multimedia content. The tools use Internet standards, work on multiple platforms, and are being supported by over one hundred companies. The group's building blocks are called ActiveX Controls, small, fast components that enable developers to embed parts of software in hypertext markup language (HTML) pages. ActiveX Controls work with a variety of programming languages including Microsoft's Visual C++, Borland's Delphi, Microsoft's Visual Basic programming system and, in the future, Microsoft's development tool for Java, code named "Jakarta." ActiveX Technologies also includes ActiveX Server Framework, allowing developers to create server applications. One of ordinary skill in the art will readily recognize that ActiveX and ActiveX components could be substituted for JAVA and its components as their use is described herein without undue experimentation to practice the invention.

Further explanation of the Java programming language, its characteristics and advantages is not deemed necessary. Java is now well-known and many articles and texts are available which describe the language in great detail. In addition, compilers and development kits are commercially available from several vendors including SunSoft Inc., Borland International, Inc. and Microsoft Corporation. Accordingly, for reasons of brevity and clarity, additional details of the Java language and the operation of the Run- Time Environment or the JIT compilers will not be discussed further in herein since this information can be readily obtained elsewhere. One appropriate source can be found in Gosling, Joy & Steele, The Java Language Specification (1996), the disclosure of which is hereby incorporated by reference. Another source for Java VM information is Sun Microsystems' Java Virtual Machine Specification, Release 1.0 Beta DRAFT (Aug. 21, 1995), the disclosure of which is also hereby incorporated by reference.

Figure 2:
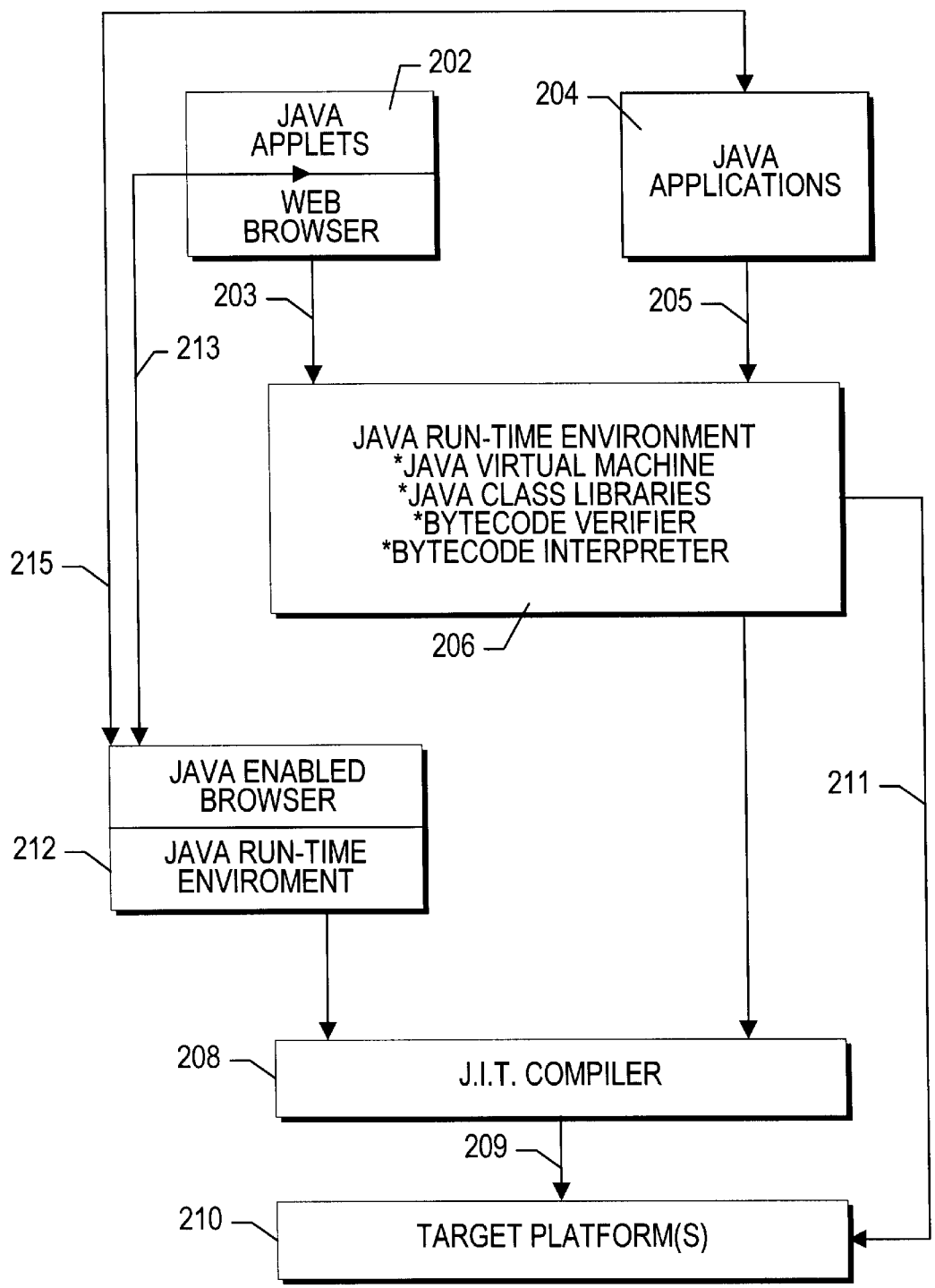
FIG. 2 depicts a block diagram of a Java platform development tool in accordance with a preferred embodiment.

The arrangement described above concerning the running of Java applets and applications is illustrated in FIG. 2. This block diagram shows how a Java application or applet can be run on one or more hardware/software platform combinations. The applets can be obtained, along with the static information (text and/or graphics) of the web page they are resident on, by either an ordinary web browser or one that is Java enabled. If the applet is obtained by a non-Java enabled browser, as depicted in block 202, it is passed via connection 203 to the Java Run-Time Environment 206 where the applet code is compiled into Java bytecode class files. The bytecode is then checked for security purposes by the bytecode verifier and then run on the Java VM by the bytecode interpreter to yield Java derived code that can be input to the optional JIT compiler 208 via connection 207 for conversion to platform native code.

Java source is compiled into bytecodes in an intermediate form instead of machine code (like C, C++, Fortran, etc.) to enable and facilitate portability. The bytecodes execute on any machine with a bytecode interpreter. Thus, Java applets and applications can and do run on a variety of client machines. Further, since the bytecodes are compact and designed to transmit efficiently over a network, Java enhances a preferred embodiment with universal clients and server-centric policies.

The output of the JIT compiler 208 is passed therefrom via connection 209 to a target platform 210. Target platform 210 could be, for example, a Windows combination, a Macintosh System 7/PowerPC combination or a Unix/RISC combination. If the Operating System (OS) of the target platform is Java enabled, that is, if it includes its own Java Run-Time environment, then the Environment 206 output could be passed directly via connector 211 to the target platform 210 avoiding the Java JIT compiler 208 whose services would not be needed.

Alternatively, if an applet is obtained by a Java enabled browser (such as Sun's HotJava, Netscape's Navigator 3.0 or Microsoft's Internet Explorer 3.0) which includes and has already installed the Java Run-Time Environment on the computer where it resides, there is no need to utilize the separate Environment 206. Applets so captured are passed via connector 213 through by the Java enabled browser at 212 to the Java Environment, also logically part of block 212, where such applets are handled as described above in connection with function block 206. Lastly, stand-alone Java applications are passed directly to the Java Environment block 206 where they are handled and processed in a similar manner to the Java applets. The Java applications do not need to be obtained nor do they work in conjunction with a browser. However, if a Java enabled browser is loaded on the developer's hardware, as is probable, a Java application can be passed directly to the browser of function block 212 via connector 215 and handled in the same manner as an applet would have been.

A preferred embodiment of an applet that will be known as the Visual Java Tool (or VJ Tool hereafter) takes the concept of objects and applies it through the entire development system to provide a development or authoring tool that is robust, easy to use and one that minimizes the amount of code a developer needs to write. VJ Tool is described herein in the context of an applet, but as it has been noted, VJ Tool could also be provided as a full application and handled in the manner described above. The user of VJ Tool would not have to be knowledgeable about Java or OOP and could build or create a Java applet or application from scratch just by using VJ Tool in the manner described herein.

Figure 3:
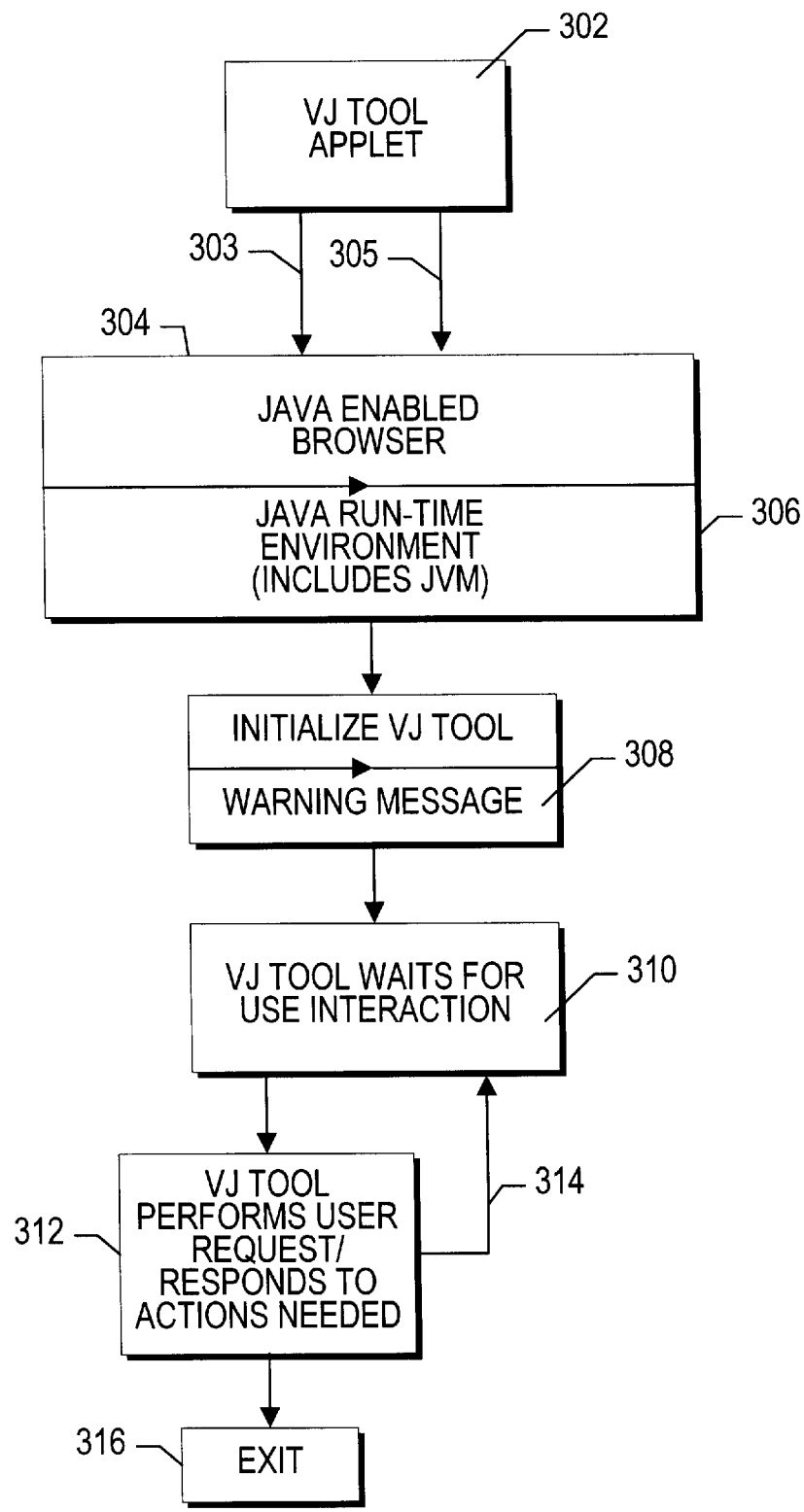
FIG. 3 illustrates a block diagram showing the initialization process for the Visual Java Tool applet in accordance with a preferred embodiment.

FIG. 3 is a block diagram that shows the initialization process for the Visual Java Tool applet in accordance with a preferred embodiment of the invention. The applet 302 is seen by a Java enabled browser 304, such as Sun's HotJava or Netscape's Navigator, via link 305 and then downloaded via connection 303 to the client computer on which the browser resides. Alternatively, the VJ Tool can be obtained from local storage as an application. When browser 304 is activated, it also initializes and makes the Java Run-Time Environment 306 active thereby initiating and readying the Java Virtual Machine for the eventual arrival of an applet.

Once obtained from its web page or local storage, the VJ Tool is itself initialized as shown in block 308 and made ready for interaction with a user, see block 310. Initialization of the applet includes initialization of the desktop (VJContainer) and the web page view (VJDocument). VJContainer and VJDesktop are tightly coupled. VJContainer is a container API. The details of applet initialization for VJ Tool are included in VJContainer and VJDesktop.

For each component, a template is initially used to define the particular characteristics of the component. The template includes a start, stop, initialize, destroy, connect, disconnect, customize (edit), save, load and one or more component specific task methods. These methods are customizable for each of the components so that the sliderbar component has a different disconnect method then a button component.

The C++ source code enabling VJContainer is presented below.

```
import java.awt.*;
import java.util.*;
public class VjContainer extends VJNode {
// Attributes of this component
VjDesktop theDesktop = null; // if NOT null the window (frame)
associated with this container node
                            // if null this is a primitive node
final static int cut = 1;
final static int copy = 2;
final static int paste = 3;
int lastCommand = 0;
final static String out      = "out_nd.gif";
```

-continued

```
final static String in      = "in_nd.gif";
Vector por_info;
Vector port_name;
//final static String port1_info = "output from container";
//final static String port1_name = "Pin 1";
final static String url_name = "container.html";
final static String info_name = "A VJ Folder or container";
boolean open;
int nodeCount;        // the number of nodes
static int instanceCount = 0;
// containerNode container;
// the panel in which contains a hierarchcal node's nodes
//
// 1) instantiate a new component on either physicai or logical display
// and an optional customizer (edit) window appears.
// 2) each customizer (edit) window is defined in the template as a
// method corresponding to the customizer (edit) method.
// 3) Properties of the component are dynamically updated based on
// user interaction with the customizer (edit) window.
containerEditor edit;
protected Vector nodes;        // if null this is a primitive node
                               // otherwise the nodes contained in this
hierarchical node
int thisInstance;
static Image normalImage;
static Image selectedImage;
VJ vj;
boolean outConnect[];
boolean request[];
boolean outRequest[];
int outRequestTime[];
int requestTime[];
VJNetPin thePin[];
int nextPort = 0;
VjContainer theParent;
// Constructor
public VJContainer(VJ v){
    super(v);
    vj v;
}
public static void getImages(GlFFactory f){
    normalImage = f.GetGIF("out_nd.gif");
    selectedImage = f.GetGIF("in_nd.gif");
}
VJNode dup() {
    return null;
}
// Component Initialization
public void VJContainerInit(int x_pt, int y_pt) {
    thisInstance = instanceCount++;
    setName(new String("Container "+String. valueOf(thisInstance)));
    nodes = new Vector();
    outConnect = new boolean[20];
    request = new boolean[20];
    outRequest = new boolean[20];
    outRequestTime = new int[20];
    requestTime = new int[20];
    thePin = new VJNetPin[20];
    for(int k=0; k<20; k++) {
        outConnect[k]=false;
        request[k]=false;
        outRequestTime[k]= 0;
        requestTime[k]= 0;
        thePin[k]=null;
    }
    setNormalIcon("out_nd.gif");
    setSelectedIcon("in_nd.gif");
    setComponentURL("container.html");
    setComponentInfo("A simple VJ container");
    VJNodeInit(true,x_pt,y_pt,false);
    setImages(normalImage,selectedImage); //Pass references to the
static images down to the node
    theDesktop = new VJDesktop(vj,this);
    theDesktop.pack();
    if(instanceCount==1){
        theDesktop.setTitle("VJ Desktop");
        theDesktop.reshape(10,30,400,640);
        theDesktop.show();
        open = true;
```

-continued

```
        } else {
            theDesktop.setTitle(getName());
theDesktop.reshape(instanceCount*20,instanceCount*20,400,460);
        }
        port_info = new Vector();
        port_name = new Vector();
        nodeRect = new Rectangle(x_pt-3,y_pt-
3,selectedImage.getwidth(vj.theContainer.theDesktop.vp_w)+3,selecte
dImage.getHeight(vj.theContainer.theDesktop.vp_w) +3);
}
public void addNewPort(VJNetPin addedPin, int i, String info, String
name){
        port_info.addElement(info);
        port_name.addElement(name);
        thePin[i] = addedPin;
        addedPin.setConnection(i);
        addPort(info,name,VJPort.InputOutput,addedPin.theLocation);    //
Pin 0
}
public void setParent(VjContainer p) {
        theParent = p;
}
public void request(int port,int time) {
        if(thePin[port]!=null) thePin[port].requestIN(time);   else {
        System.out.println("Pin connection problem");
        }
}
public void requestOUT(int port,int time) {
        if(outConnect[port]) vj.request(port,time ,this);
        else {
        if(outRequest[port]) System.out.println("Losing previous out
request");
        outRequest[port] = true;
        outRequestTime[port] = time;
        }
}
public int componentID() {return 500; }
public void disconnecting(int port) {
        if(port<20){
            request[port] = false;
            outConnect[port] = false;
            requestTime[port] = 0;
        }
}
public void connecting(int port) {
        if(outRequest[port]) {
            outRequest[port] = false;
            vj request(port,outRequestTime [port],this);
        }
}
public void load(String s) {
}
public String save() {
        return "";
}
public void set(Object o,int port,int time) {
        // System.out.println("set IN port "+port);
        if(port<20){
            thePin[port].setIN(o,time);
        }
}
public void setOUT(Object o,int port,int time) {
        //System.out.println("set OUT port "+port);
        if(port<20){
            vj.set(o,port,time,this);
        }
}
public void propertiesEditor() {
        if(!theDesktop.isShowing() || !theDesktop.isVisible())
theDesktop.show();
        if(edit==null && thisInstance >0) {
            edit = new containerEditor((Frame)(vj.theFrame),this);
            edit.pack();
            edit.resize(6*32,6*32);
            edit.show();
        }
}
public void init(){
        for(Enumeration e = nodes.elements() ; e.hasMoreElements() ;) {
```

-continued

```
            VJNode vjn (VJNode) e.nextElement();
            vjn.init();
        }
    };
    public void start(){
        if(open) theDesktop.show();
        for(Enumeration e = nodes.elements() ; e.hasMoreElements() ;) {
            VJNode vjn = (VJNode) e.nextElement();
            vjn.start();
        }
    };
    public void stop(){
        if(open) theDesktop.hide();
        for(Enumeration e = nodes.elements() ; e.hasMoreElements() ;) {
            VJNode vjn = (VJNode) e.nextElement();
            vjn.stop();
        }
    };
    public void destroy(){};
    public synchronized void addNode(Object o) {
        //System.out.println("Adding node");
        nodes.addElement(o);
    }
    public void doSelectAll(){
        for(Enumeration e = nodes.elements() ; e.hasMoreElements() ;) {
            VJNode vjn = (VJNode) e.nextElement();
            vjn.setSelected(true);
        }
        theDesktop.vp__w.repaint();
        vj.theDocument.repaint();
    }
    public void editComponent(){
        for(Enumeration e = nodes.elements() ; e.hasMoreElements() ;) {
            VJNode vjn = (VJNode) e.nextElement();
            if(vjn.getSelected()) vjn.propertiesEditor();
        }
    }
    public void doCut(){
        lastCommand = cut;
        vj.nodepasteBoard.removeAllElements();
        getSubnet(true);
    }
    public void doCopy(){
        lastCommand = copy;
        vj.nodePasteBoard.removeAllElements();
        getSubnet(false);
    }
    public void doPaste(){
        int k,vCount=0;
        VJNode theSRCNode = null;
        if(lastCommand==copy){
            vCount = theDesktop.vp__w.container.nodes.size ();
        }
        for(Enumeration e = vj.nodePasteBoard.elements()
    e.hasMoreElements() ;) {
            VJNode vjn = (VJNode) e.nextElement();
            VJNode vjn__c;
            if(lastCommand==copy) {
                vjn__c = vjn.dup();
                if(vjn__c==null) {
                    System.out.println("duplication failed in doPaste");
                    return;
                }
                for(k=0; k<vjn.getNumberOfPorts() ;k++){
                    VJNode tn = vjn.getConnectingNode(k);
                    if(tn!=null && tn.getSelected()) {
                        vjn__c.setConnectingPort(k,vj__n.getConnectingPort(k));
                        vjnc.setToDraw(k,vjn.getToDraw(k));
                    } else {
                        vjn__c.setConnectingPort(k,O);
                        vjn__c.setConnectingNode(k,null);
                        vjn__c.setToDraw(k,false);
                    }
                }
            }
            if(vjn.isUINode)
    vj.theDocument.clearLite(vj.theDocument.getGraphics() ,vj n.comp.bou
    nds());
```

-continued

```
            } else {
                vjn__c = vjn;
            }
            theDesktop.vp__w.container.addNode(vjn__c);
            if(vjn__c.isUINode) vj.theDocument.add(vjn__c.comp);
        }
        if(lastCommand==copy){
        int where = vCount;
        for(Enumeration e1 = vj.nodePasteBoard.elements()
e1.hasMoreElements() ;) {
            VJNode vjn1 = (VJNode) e1.nextElement();
            for(k=0; k<vjn1.getNumberOfPorts() ; k++){
                VJNode cn = vjn1.getConnectingNode(k);
                if(cn!=null){
                int m = vj.nodepasteBoard.indexOf(cn);
                    if(m>=0)
                    try{
                        theSRCNode = (VJNode) nodes.elementAt(where);
                        VJNode theDSTNode = (VJNode)
nodes.elementAt(vCount+m);
                        theSRCNode.setConnectingNode(k,theDSTNode);
                    } catch(Exception e) {
                        System.out.println("doPaste "+
                    }
                }
            }
            where++;
        }
            for(Enumeration e1 = vj.nodepasteBoard.elements()
        e1.hasMoreElements() ;) {
                VJNode vjn1 = (VJNode) e1.nextElement();
                vjn1.setSelected(false);
            }
        }
        theDesktop.vp__w.repaint();
        vj.theDocument.repaint();
        docopy();
        / /DUMP();
    }
public synchronized void DUMP() {
    for(Enumeration e = nodes.elements() ; e.hasMoreElements() ;) {
        VJNode vjn = (VJNode) e.nextElement();
        System.out.print("Node" +vjn.name);
        for(int k=0; k<vjn.getNumberOfPorts() ;k++){
            System.out.print("port"+k);
            System.out.print("XPt["+k+"]="+vjn.getXPt(k));
            System.out.print("YPt["+k+"]="+vjn.getYPt(k));
            if(vjn.getToDraw(k)) System.out.print("ToDraw=true"); else
System.out.print("ToDraw=false");
            System.out.print("ctpt "+vjn.getconnectingPort(k));
            if(vjn.getConnectingNode(k)==null)
                System.out.print("NO cn ");
            else
                System.out.print("cn"+vjn.getConnectingNode (k).name);
        }
        System.out.println(" ");
    }
}
public synchronized void getSubnet(boolean isCut) {
    for(Enumeration e = nodes.elements() ; e.hasMoreElements() ;) {
        VJNode vjn (VJNode) e.nextElement();
        if(vjn.getSelected()){
            vj.nodePasteBoard.addElement(vjn);
            if(isCut){
                if(vjn.isUlNode){
vj.theDocument.clearLite(vj.theDocument.getGraphics(),vjn.comp.bou
nds());
                }
                theDesktop.vp__w.clearArea(vjn.nodeRect);
                if(vjn.isUlNode){
                    vj.theDocument.remove(vjn.comp);
                }
            }
            for(int k=0; k<vjn.getNumberOfPorts() ;k++){
                int cp = vjn.getconnectingPort(k);
                VJNode vj__c = vjn.getconnectingNode(k);
                    if(vj__c!=null && isCut){
                    Graphics g = theDesktop.vp w.getGraphics();
                    int xbeg = vjn.getxPt(k);
```

-continued

```
                    int ybeg = vjn.getYPt(k);
                    int xend = vj_c.getxPt(cp);
                    int yend = vj_c.getYPt(cp);
                    if(xbeg<xend) {
                        if(ybeg<yend)
                            g.clearRect(xbeg,ybeg,xend-xbeg,yend-ybeg);
                        else
                            g.clearRect(xbeg,yend,xend-xbeg,ybeg-yend);
                    } else {
                        if (y_beg<yend)
                            g.clearRect(xend,ybeg,xbeg-xend ,yend-ybeg);
                        else
                            g.clearRect(xend,yend,xbeg-xend,ybeg-yend);
                    }
                }
                if(vj_c!=null&&isCut)
                if(!vj_c.getSelected()){
                    vj_c.setconnectingNode(cp,null);
                    vj_c.setconnectingPort(cp,0);
                    vj_c.set)(Pt(cp,0);
                    vj_c.setYPt(cp,0);
                    vj_c.setToDraw(cp,false);
                    vjn.setConnectingNode(k,null);
                    vjn.setConnectingPort(k,0);
                    vjn.setXPt(k,0);
                    vjn.setYpt(k,0);
                    vjn.setToDraw(k,false);
                }
            }
            if(isCut){
                if(!nodes.removeElement(vjn))
                    System.out.println("VJ Error unable remove deleted node");
                getSubnet(isCut);
                return;
            }
        }
    }
    if(isCut)theDesktop.vp_w.repaint();
}
public synchronized void deleteNode() {
    for(Enumeration e = nodes.elements() ; e.hasMoreElements() ;) {
        VJNode vjn = (VJNode) e.nextElement();
        if(vjn.getselected()){
            if(vjn.isUJNode){
vj.theDocument.clearLite(vj.theDocument.getGraphics(),vjn.comp.bounds());
            }
            theDesktop.vp_w.clearArea(vjn.nodeRect);
            if(vjn.isUlNode){
                vj.theDocument.remove(vjn.comp);
            }
                for(int k=0; k<vjn.getNumberOfPorts() ;k++){
                int cp = vjn.getConnectingPort(k);
                if(cp>=0){
                    VJNode vj_c = vjn.getConnectingNode(k);
                    {
                        Graphics g = theDesktop.vp_w.getGraphics();
                        int xbeg = vjn.getXPt(k);
                        int ybeg = vjn.getYPt(k);
                        int xend = vj_c.getXPt(cp);
                        int yend = vj_c.getYPt(cp);
                        if(xbeg<xend) {
                            if(ybeg<yend)
                                g.clearRect(xbeg,ybeg,xend-xbeg,yend-ybeg);
                            else
                                g.clearRect(xbeg,yend ,xend-xbeg,ybeg-yend);
                        } else {
                            if(ybeg<yend)
                                g.clearRect(xend,ybeg,xbeg-xend,yend-ybeg);
                            else
                                g.clearRect(xend,yend,xbeg-xend,ybeg-yend);
                        }
                        vj_c.setconnectingNode(cp,null);
                        vj_c.setConnectingPort(cp, -1);
                        vjc.setxPt(cp, -1);
                        vj_c.setyPt(cp, -1);
                        vj_c.resetToDraw(cp);
                }
            }
```

-continued

```
        }
        if(!nodes.removeElement(vjn))
            System.out.println("VJ Error unable remove deleted node");
            deleteNode();
            return;
    }
    }
        theDesktop.vp_w.repaint();
}
public synchronized void selectNode() {
}
public synchronized void drawNet(Graphics g) {
    Image img;
    for(Enumeration e = nodes.elements() ; e.hasMoreElements() ;) {
        VJNode vjn = (VJNode) e.nextElement();
        if(vjn.getSelected())
            img = vjn.getSelectedIcon();
        else
            img = vjn.getNormalIcon();
        if(img!=null) theDesktop.drawNode(img,vjn.x,vjn.y);
        for(int
i=0;i<vjn.getNumberOfPorts() ;i++)HOTSPOTS.drawHotspot(vjn,i,g);
        // System.out.println("The name = "+vjn.name);
    }
    for(Enumeration e1 = nodes.elements() ; e1.hasMoreElements() ;) {
        VJNode vjn = (VJNode) e1.nextElement();
        for(int j=0; j <vjn.getNumberOfPorts(); j ++)
            if(vjn.getToDraw(j)){
                g.drawLine(vjn.getXPt(j),
                        vjn.getYPt(j),
vjn.getConnectingNode(j).getxPt(vjn.getConnectingPort(j)),
vjn.getConnectingNode(j).getypt(vjn.getConnectingPort(j))
                        );
            }
    }
}
public synchronized void resetSelected() {
    for(Enumeration e = nodes.elements() ; e.hasMoreElements() ;) {
        VJNode vjn = (VJNode) e.nextElement();
        if(vjn.getSelected()){
            vjn.setSelected(false);
        }
    }
}
} // end class VJContainer
```

The source code enabling the container editor for modifying properties of the container is presented below. When a new component is instantiated on either the physical or logical display, an optional customizer (edit) window is presented if a containerEditor method is defined for the component. The customizer (edit) window is defined in the template as a method corresponding to the customizer (edit) method. The method contains the logic facilitating the dynamic definition of properties of the component and the update of the properties based on user interaction with the customizer (edit) window.

```
class containerEditor extends Frame
{
// Attributes
VJContainer vjc;
Button ok;
Button cancel;
boolean dirty;
Panel centerPanel;
Polygon p_v[];
boolean selected[];
TextField tf;
public containerEditor (Frame parent,VJContainer 1)
    {
        super("Click to select pins");
        vjc = 1;
            setBackground(Color.lightGray);
        setLayout(new BorderLayout());
        Panel p = new Panel();
        Panel n = new Panel();
```

-continued

```
        n.add(new Label("Name"));
        tf = new TextField(vjc.getName());
        n.add(tf);
        add("North",n);
        centerPanel = new Panel();
        p_v = new Polygon[20];
        selected = new boolean[20];
        for(int m=0; m<20;m++) if(vjc.thePin[m]!=null) selected[m]=true;
else selected[m]=false;
        p.add(new Button("OK"));
            p.add(new Button("Cancel"));
        add("South",p);
        int xport[] = new int[5];
        int yport[] = new int[5];
        int xStart = 90–1;
        int yStart = 45–1;
        int x,y;
        int i_width =
(vjc .normalImage.getWidth(vjc.vj.theContainer.theDesktop.vp_w))*3–6;
        int i_height =
(vjc.normalImage.getHeight(vjc.vj.theContainer.theDesktop.vp_w))*3–6;
        for(int direction=0; direction<4; direction++)
            for(int k = 0; k<5; k++) {
                switch(direction){
                    case 0: x = xStart+7+i_width;
                        y = yStart+3+k*(i_height/4);
                        break;
                    case 1: x = xStart+3+k*(i_width/4);
                        y = yStart;
                        break;
                    case 2: x = xStart;
                        y = yStart+3+k*(i_height/4);
                        break;
                    default: x = xStart+3+k*(i_width/4);
                        y = yStart+i_height+7;
                        break;
                }
                for(int i=0;i<5;i++){
                    xport[i] = HOTSPOTS.IOx_offset[direction][i]+x;
                    yport[i] = HOTSPOTS.IOy_offset[direction][i]+y;
                }
                p_v[k+direction* 5] = new Polygon(xport,yport, 5);
            }
}
public void paint(Graphics g){
g.drawImage(vjc.normalImage,90,45,vjc.normalImage.getWidth(vjc.vj.t
heContainer.theDesktop.vp_w)*3,
vjc.normalImage.getHeight(vjc.vj.theContainer.theDesktop.vp_w)*3,
            this);
    for(int k=0;k<20;k++) if(selected[k]) g.fillPolygon(p_v[k]);
                    else g.drawPolygon(p_v[k]);
}
public boolean handleEvent(Event evt)
    {int k,x,y;
        switch(evt.id){
            case Event.MOUSE_DOWN:
                for(k=0;k<20;k++)
if(p_v[k].getBoundingBox().inside(evt.x,evt.y)) {
                selected [k]=!selected [k];
repaint(p_v[k]. getBoundingBox().x,p_v[k].getBoundingBox().y,p_v[k].get
BoundingBox().width,p_v[k].getBoundingBox().height);
                }
                return true;
            case Event.ACTION_EVENT:
                    if("OK".equals(evt.arg))       {
                vjc.edit = null;
                vjc.setName(tf.getText());
                vjc.theDesktop.setTitle(tf.getText());
                vjc.resetSelected();
                int nextPort = 0;
                for(int direction=0; direction<4; direction++)
                    for(k = 0; k<5; k++) {
                        switch(direction){
                        case 0: x = 290;
                            y = 100+k*(200/4);
                            break;
                        case 1: x = 50+k*(200/4);
                            y = 70;
                            break;
```

-continued

```
                case 2: x = 10;
                       y = 100+k*(200/4);
                       break;
                default: x = 50+k*(200/4);
                       y = 340;
                       break;
                }
if(selected[k+direction*5]&&vjc.thePin[k+direction*5]==null){
                       VJNetPin vjnp = new VJNetPin(vjc.vj);
                       vjnp.setContainer(vjc);
                       vjnp.theLocation = k+direction*5;
                       vjc.addNewPort(vjnp,nextPort++, "fred","jim");
                       vjnp.VJNetPinInit(x,y);
                       vjnp.init();
                       vjc.addNode((Object)vjnp);
                       vjnp.setSelected(true);
                }
           }
           vjc.theDesktop.show();
           vjc.open = true;
           vjc.theParent.theDesktop.vp_w.repaint();
                dispose();
                return true;
           }
           if("Cancel".equals(evt. arg)){
                vjc.edit = null;
                vjc.theDesktop.show();
                dispose();
                return true;
           }
           return false;
         default:
                return false;
      }
   }
}
}// end class containerEditor
class HOTSPOTS extends Object {
      final static int Ix_offset[][] = {{0,4,4,0}, {0,4,-4,0},{0,-4,-4,0},{0,-4,4,0}};
      final static int Iy_offset[][]= {{0,4,-4,0}, {0,-4,-4,0},{0,-4,4,0},{0,4,4,0}};
      final static int Ox_offset[][]= {{0,0,4,0,0}, {0,4,0,-4,0},{0,0,-4,0,0},{0,4,0,-4,0}};
      final static int Oy_offset[][]= {{0,4,0,-4,0}, {0,0,-4,0,0},{0,-4,0,4,0},{0,0,4,0,0}};
      final static int IOx_offset[][]= {{0,4,8,4,0}, {0,4, 0,-4,0},{0,-4,-8,-4,0},{0,-4,0,4,0}};
      final static int IOy_offset[][]= {{0,4,0,-4,0}, {0,-4,-8,-4,0},{0,-4,0,4,0},{0,4,8,4,0}};
      final static int xport[]= new int[5];
      final static int yport[]= new int[5];
      final static int East  = 0;
      final static int North = 1;
      final static int South = 3;
      final static int West  = 2;
   public HOTSPOTS() {}
      public static int getSide(int i){
      if(i<5) return East; //North;
      if(i<10) return North; //South;
      if(i<15) return West; / / East;
      return South; //West;
      }
      public static void drawHotspot(VJNode node, int 1, Graphics g){
           Dimension hotSpot = new Dimension();
           hotSpot = getHotSpot(node.nodeRect,node.x-1 ,node.y-1, node.getPortLocation(1));
      int direction = getSide(node.getPortLocation(1));
      int port_type = node.getPortType(1);
      int x = hotSpot.width;
      int y = hotspot.height;
      int i;
      switch(port_type) {
         case 0:
                for(i=0; i<4 ; i++) {
                       xport[i]= Ix_offset[direction][i]+x;
                       yport[i]=Iy_offset[direction][i]+y;
                };
```

-continued

```
                    break;
            case 1:
                    for(i=0;i<5 ;i++) {
                            xport[i]= Ox_offset[direction][i]+x;
                            yport[i]= Oy_offset[direction][i]+y;
                    };
                    break;
            case 2:
                    for(i=0;i<5;i++){
                            xport[i]= IOx_offset[direction][i]+x;
                            yport[i]= IOy_offset[direction][i]+y;
                    };
                    break;
            default: System.out.println("Unknown type "+port_type); break;
        }
        if(port_type==O)
                g.drawPolygon(xport,yport,4);
        else
                g.drawpolygon(xport,yport,5);
}
//  public static Dimension getHotSpot(VJNode node,int location){
    public static Dimension getHotSpot(Rectangle nRect,int xNode,int yNode, int location){
//          int xNode = node.x;
//          int yNode = node.y;
//          Rectangle nRect = node.nodeRect;
                int left = (nRect.width+1)/4;
                int center = (nRect.width+1)/2;
                int right = center+left;
                int top = (nRect.height+1)/4;
                int middle = (nRect.height+1)/2;
                int bottom = top+middle;
                int x,y;
                switch(location){
                        case VJPort.NorthLeft:        x = xNode; y=yNode; break;
                        case VJPort.NorthLeftCenter:  x = xNode+left; y=yNode; break;
                        case VJPort.NorthCenter:      x = xNode+center; y=yNode; break;
                        case VJPort.NorthRightCenter: x = xNode+right; y=yNode; break;
                        case VJPort.NorthRight:       x = xNode+nRect.width; y=yNode; break;
                        case VJPort.SouthLeft:        x = xNode; y=yNode+nRect.height; break;
                        case VJPort.SouthLeftCenter:  x = xNode+left; y=yNode+nRect.height; break;
                        case VJPort.SouthCenter:      x = xNode+center; y=yNode+nRect.height; break;
                        case VJPort.SouthRightCenter: x = Node+right; y=yNode+nRect.height; break;
                        case VJPort.SouthRight:       x = xNode+nRect.width; y=yNode+nRect.height; break;
                        case VJPort.EastTop:          x = xNode+nRect.width; y=yNode; break;
                        case VJPort.EastTopCenter:    x = xNode+nRect.width; y=yNode+top; break;
                        case VJPort.EastCenter:       x = xNode+nRect.width; y=yNode+middle; break;
                        case VJPort.EastBottomCenter: x = xNode+nRect.width; y=yNode+bottom; break;
                        case VJPort.EastBottom:       x = xNode+nRect.width; y=yNode+nRect.height; break;
                        case VJPort.WestTop:          x = xNode; y=yNode; break;
                        case VJPort.WestTopCenter:    x = xNode; y=yNode+top; break;
                        case VJPort.WestCenter:       x = xNode; y=yNode+middle; break;
                        case VJPort.WestBottomCenter: x = xNode; y=yNode+bottom; break;
                        default:                      x = xNode; y=yNode+nRect.height; break; /*
                        case VJPort.NorthLeft:        x = xNode; y=yNode; break;
                        case VJPort.NorthLeftCenter:  x = xNode+left; y=yNode; break;
                        case VJPort.NorthCenter:      x = xNode+center;
```

-continued

```
y=yNode; break;
                case VJPort.NorthRightCenter:    x = xNode+right;
y=yNode; break;
                case VJPort.NorthRight:       x = xNode+nRect.width;
y=yNode; break;
                case VJPort.SouthLeft:        x = xNode;
y=yNode+nRect.height; break;
                case VJPort.SouthLeftCenter:  x xNode+left;
y=yNode+nRect.height; break;
                case VJPort.SouthCenter:      x = xNode+center;
y=yNode+nRect.height; break;
                case VJPort.SouthRightCenter:    x xNode+right;
y=yNode+nRect.height; break;
                case VJPort.SouthRight:       x = xNode+nRect.width;
y=yNode+nRect.height; break;
                case VJPort.EastTop:          x = xNode+nRect.width;
y=yNode; break;
                case VJPort.EastTopCenter:       x = xNode+nRect.width;
y=yNode+top; break;
                case VJPort.EastCenter:       x = xNode+nRect.width;
y=yNode+middle; break;
                case VJPort.EastBottomCenter:    x = xNode+nRect.width;
y=yNode+bottom; break;
                case VJPort.EastBottom:       x = xNode+nRect.width;
y=yNode+nRect.height; break;
                case VJPort.WestTop:          x = xNode;
y=yNode; break;
                case VJPort.WestTopCenter:       x = xNode;
y=yNode+top; break;
                case VJPort.WestCenter:       x = xNode;
y=yNode+middle; break;
                case VJPort.WestBottomCenter:    x = xNode;
y=yNode+bottom; break;
                default:            x = xNode;
y=yNode+nRect.height; break;* /
            }
            return newDimension(x,y);
    }
}
VJDesktop is coded as follows:
import java.util.*;
import java.awt.*;
public dass VJDesktop extends Frame{
    final String FILEMENU           = "File"
    final String NEWMENUITEM        = "New";
    final String OPENMENUITEM       = "Open...";
    final String SAVEMENUITEM       = "Save";
    final String SAVEASMENUITEM     = "Save As...";
    final String CLOSEMENUITEM      = "Close";
    final String EXITMENUITEM       = "Exit";
    final String SEPARATORMENUITEM  = "-";
    final String INFOMENUITEM       = "View catalogue entry for
current component...";
    final String EDITMENU           = "Edit";
    final String UNDOMENUITEM       = "Undo";
    final String EDITMENUITEM       = "Edit Component";
    final String CUTMENUITEM        = "Cut";
    final String COPYMENUITEM       = "Copy";
    final String PASTEMENUITEM      = "Paste";
    final String ALLMENUITEM        = "Select All";
    final String CLEARMENUITEM      = "Clear All";
    final String APPLETMENU         = "Environment";
    final String RESETMENUITEM      = "Reset all components";
    final String COMPILEMENUITEM    = "Create standalone applet";
    final String HELPMENU           = "Help";
    final String ABOUTMENUITEM      = "About Visual Java";
    final String HELPTOPICSMENUITEM = "Help Topics";
    final static String EMPTY ="";
    Image in_controls[] = new Image[21];
    Image out_controls[] = new Image[21];
    Image xy,wh;
    int current;
    int cnt;
    Toolbar tools;
    int status=0;
    containerNode vp_w;
    VjContainer container;
    VJ applet_w;
    boolean editorOpen=false;
```

-continued

```
    String user = EMPTY;
    String password = EMPTY;
    Vector nodepasteBoard;
    public VJDesktop(VJ v, VjContainer n) {
        Panel centerPanel = new Panel();
        apple_w = v;
        container = n;
        MenuBar mb = new MenuBar();
        Menu m = new Menu(FILEMENU);
        m.add(new MenuItem(NEWMENUITEM));
        m.add(new MenuItem(OPENMENUITEM));
        m.add(new MenuItem(SAVEMENUITEM));
        m.add(new MenuItem(SAVEASMENUITEM));
        m.add(new MenuItem(SEPARATORMENUITEM));
        m.add(new MenuItem(CLOSEMENUITEM));
        m.add(new MenuItem(EXITMENUITEM));
        mb.add(m);
        Menu m1 = new Menu(EDITMENU);
        m1.add(new MenuItem(UNDOMENUITEM));
        m1.add(new MenuItem(SEPARATORMENUITEM));
        m1.add(new MenuItem(CUTMENUITEM));
        m1.add(new MenuItem(COPYMENUITEM));
        m1.add(new MenuItem(PASTEMENUITEM));
        m1.add(new MenuItem(ALLMENUITEM));
        m1.add(new MenuItem(CLEARMENUITEM));
        m1.add(new MenuItem(EDITMENUITEM));
        mb.add(m1);
        Menu m2 = new Menu(APPLETMENU);
        m2.add(new MenuItem(INFOMENUITEM));
        m2.add(new MenuItem(RESETMENUITEM));
        m2.add(new MenuItem(COMPILEMENUITEM));
        mb.add(m2);
        Menu m3 = new Menu(HELPMENU);
        m3.add(new MenuItem(ABOUTMENUITEM));
        m3.add(new MenuItem(SEPARATORMENUITEM));
        m3.add(new MenuItem(FIELPTOPICSMENUITEM));
        mb.add(m3);
        setMenuBar(mb);
        tools = new Toolbar(apple_w,true);
            doImages();
        add("West",tools);
        vp_w = new containerNode(applet_w, container);
        add("Center",vp_w);
            setBackground(new Color(0,190,255));
    }
    public void paint(Graphics g) {
        int h_off v_off
        if(applet_w.isMicrosoft){ h_off = 0 v_off=0; } else {
            h_off=insets().left v_off=insets().top;)
        for(int i=0;i<cnt;i++)
            int h = (i%12)*23+h_off;
            int v =(i/12)*22+v_off;
            if(i == current && i <= (cnt-1))
g.drawImage(in control[i],h,v,this);
                    else g.drawImage(out controls[i],h,v,this);
        }
    }
    public boolean handleEvent(Event evt) {
        int h,v;
            if (evt.id == Event.ACTION_EVENT){
                if (evt.target instanceof MenuItem) {
                String label = (String)evt.arg;
                if (label.equals(NEWMENUITEM)) {
                }else if (label.equals(OPENMENUITEM)) {
                }else if (label.equals(SAVEMENUITEM)) {
                }else if (label.equals(SAVEASMENUITEM)) {
                }else if (label.equals(CLOSEMENUITEM)) {
                    if(container.thisInstance>0) {
                        container.open = false; hide(); }
                }else if (label.equals(EXITMENUITEM)) {
                }else if (label.equals(INFOMENUJTEM)) {
                }else if (label.equals(UNDOMENUITEM)) {
                    doPaste();
                }else if (label.equals(CUTMENUITEM)) {
                    doCut();
                }else if (label.equals(COPYMENUITEM)) {
                    doCopy();
                }else if (label.equals(PASTEMENUITEM)) {
                    doPaste();
```

-continued

```
                }else if (label.equals(ALLMENUITEM)) {
                    doSelectAll();
                }else if (label.equals(CLEARMENUITEM)) {
                    doSelectAll();
                    doCut();
                }else if (label.equals(EDITMENUITEM)) {
                    editComponent();
                }else if (label.equals(RESETMENUITEM)) {
                }else if (label.equals(COMPILEMENUITEM)) {
                }else if (label.equals(ABOUTMENUITEM)) {
                }else if (label.equals(HELPTOPICSMENUITEM)) {
                }
                return true;
            }
        }
        if (evt.id == Event.WINDOW_DESTROY) {
            return true;
        }
                if (evt.id==Event.MOUSE_EXIT){
                }
                if (evt.id==Event.MOUSE_MOVE){
                }
                if (evt.id==Event.MOUSE_DOWN){
                }
        // System.out.print(evt.toString());
        return super.handleEvent(evt);
    }
public void doSelectAll(){
    if(applet_w.loading) {System.out.println("Loading VJ"); return; }
    container.doSelecAll();
}
public void doCut(){
    if(apple_w.loading) {System.out.println("Loading VJ"); return; }
    container.doCut();
}
public void editComponent(){
    if(applet_w.loading) {System.out.println("Loading VJ"); return; }
    container.editComponent();
}
public void doCopy(){
    if(applet_w.loading) {System.out.println("Loading VJ"); return; }
    container.doCopy();
}
public void doPaste(){
    if(applet_w.loading) {System.out.println("Loading VJ"); return; }
    container.doPaste ();
}
public void doImages() {
                GIFFactory factory new GIFFactory(apple_w);
                VJCInterface.getImages(factory);
                VJContainer.getImages(factory);
                VJNetPin.getImages(factory);
                VJPlus.getImages(factory);
                VJBiCopy.getImages(factory);
                VJEquals.getImages(factory);
                VJConstant.getImages(factory);
                VJRandom.getImages(factory);
                VJCounter.getImages(factory);
                VJURLOpener.getImages(factory);
                VJSplit.getImages(factory);
tools.addItem(factory.GetGIF("incu.gif") ,factory.GetGIF("out_cu.gi"));
tools.addItem(VJContainer.selectedImage ,VJContainer.normalImage);
// tools.addItem(VJNetPin.selectedImage ,VJNetPin.normalImage);
                tools.addItem(VJPlus.selectedImage,VJPlus.normalImage);
tools.addItem(VJBicopy.selectedImage,VJBiCopy.normalImage);
tools.addItem(VJEquals.selectedImage ,VJEquals.normalImage);
tools.addItem(VJConstant.selectedImage,VJConstant.normalImage);
tools.addItem(VJRandom.selectedImage,VJRandom.normalImage);
tools.addItem(VJCounter.selectedImage ,VJCounter.normalImage);
tools.addItem(VJURLOpener.selectedImage ,VJURLOpener.normalImage
e);
                tools.addItem(VJSplit.selectedImage ,VJSplit.normalImage);
        }
        public String deskInfo(int ii){
            switch(ii) {
                case 3: return "GGGG"; // /VJButton.quick_info;
                default: return EMPTY;
            }
        }
```

-continued

```
        public String browserInfo(int ii){
                switch(ii){
                    case 3: return "KKKKKKK"; / /VJTextField.quick_info
                    default: return EMPTY;
                }
        }
        public void update(Graphics g) {
                    paint(g);
        }
    public void drawNode(Image img,int x, int y){
            vp_w.drawNode (img,x,y);
    }
}
class containerNode extends Panel {
    boolean marquee;
    boolean drag;
    boolean connecting;
    boolean disconnecting;
    int xbeg,xend,ybeg,yend;
    int xleft,top,right,bottom;
    int xleft,xright,ytop,ybottom;
    int current_i;
    int current_port;
    int portInfo;
    VJNode current_node;
    int current_comp_node;
    int downType;
    int inset_h inset_v;
    boolean firstTime = true;
    boolean portInfoDrawn = false;
    boolean nodeInfoDrawn = false;
    static long lastTime=0;
    VJ app;
    VJContainer container;
    public containerNode(VJ v, VJContainer n) {
        super();
        setLayout(null);
        disconnecting = false;
        app = v;
        container = n;
    }
    public boolean closeEnough(int fx, int fy,int x, int y,int epsilon){
        return x <fx+epsilon && x >fx-epsilon && y <fy+epsilon && y
>fy-epsilon;
    }
public void doNodeSelection(VJNode vjn,boolean cntDwn,int x, int y){
if(!cntDwn) {
    beginDrag(x,y);
    if(!vjn.getselected()) {
        app.theDocument.clearlight(app.theDocument.getGraphics());
        container.resetSelected();    / / reset all nodes in container to
unselected
        vjn.setSelected(true);    / / select the current node
        app.theDocument.highlight(app.theDocument.getGraphics());
    }
    current_node = vjn;
    repaint();
} else {
    if(vjn.getSelected()) {
        Rectangle r = vjn.nodeRect;
        vjn.setSelected(false);
        if(vjn.isUINode)
app.theDocument.clearLite(app.theDocument.getGraphics() ,vjn.comp.
bounds());
        getGraphics().clearRect(r.x-4,r.y-4,r.width+12 ,r.height+12);
        for(Enumeration e2 = container.nodes.elements()
e2.hasMoreElements() ;) {
            VJNode vjn2 = (VJNode) e2.nextElement();
            if(vjn2.getSelected()) {
                repaint();
                return;
            }
        }
    } else {
        vjn.setSelected(true);
        if(vjn.isUINode)
```

-continued

```
app.theDocument.drawLite(app.theDocument.getGraphics() ,vjn.comp.
bounds());
                repaint();
                return;
            }
        }
    }
}
public VJNode onNode(int x, int y){
        for(Enumeration e = container.nodes.elements()
    e.hasMoreElements() ;) {
            VJNode vjn (VJNode) e.nextElement();
            if(vjn.nodeRect.inside(x,y)) {
                // System.out.println("On node "+vjn.name);
                return vjn;
            }
        }
        return null;
}
public VJNode onport(int x, int y){
    Dimension d;
    current_port = -1;
    for(Enumeration e = container.nodes.elements()
e.hasMoreElements() ;) {
        VJNode vjn = (VJNode) e.nextElement();
        for(int k=0; k<vjn.getNumberOfPorts() ;k++){
                d =
HOTSPOTS.getHotspot(vjn.nodeRect,vjn.x,vjn.y,vjn.getportLocation(k))
;
                if(closeEnough(d.width, d.height,x,y,8)) {
                        //System.out.println("On port ="+k+" of Node "+vjn.name);
                    current_port = k;
                    return vjn;
                }
            }
        }
        return null;
}
public boolean bigEnough(){
    return xbeg-yend !=0 && ybeg-xbeg!=0;
}
public void beginconnection(int x, int y){
    VJNode cn_beg;
    int cp_beg;
    connecting = true;
    if(disconnecting){
        if(current_node == null || current_port == -1){
            System.out.println("VJDesktop / doNodeSelection node or port
not set");
            return;          // May need to do more work before/after
return
        }
        cn_beg = current_node.getconnectingNode(current_port);
        cp_beg = current_node.getconnectingPort(current_port);
        if(cn_beg==null) System.out.println("How can we be disconnecting
?");
        xbeg = cn_beg.get)(Pt(cp_beg);
        ybeg = cn_beg.getYPt(cp_beg);
        xend = current_node.get)(Pt(current_port);
        yend = current_node.getYPt(current_port);
    } else {
        xbeg = x;
        ybeg = y;
        xend = x;
        yend = y;
        Graphics g = getGraphics();
        g.setXORMode(Color.white);
        g.drawLine(xbeg,ybeg,xend,yend);
    }
}
public void doConnection(int x, int y){
    // System.out.println("DO CONNECTION");
    Graphics g = getGraphics();
    g.setXORMode(Color.white);
    g.drawLine(xbeg,ybeg,xend,yend);
    xend = x;
```

```
            yend = y;
            g.drawLine(xbeg,ybeg,xend,yend);
    }
    public void endConnection(int x, int y){
        int srcPort;
        VJNode srcNode;
        //System.out.println("END CONNECTION");
        Graphics g = getGraphics();
        g.setXORMode(Color.white);
        g.drawLine (xbeg,ybeg,xend,yend);
        xend = x;
        yend = y;
        connecting = false;
        srcNode = current_node;
        if(srcNode==null) System.out.println("srcNode =null?");
        srcPort = current_port;
        current_node=onport(x,y);
        VJNode vj_c = srcNode.getConnectingNode(srcPort);
        if(vj_c==null) System.out.println("vj_c =null?");
        int yj_p = srcNode.getConnectingPort(srcPort);
        if(disconnecting && current_node==null){
            int xb = srcNode.get)(Pt(srcPort);
            int xe = vj_c.getXPt(vj_c.getConnectingPort(srcPort));
            int yb = srcNode.getypt(srcPort);
            int ye = vj c.getYPt(vj_c.getConnectingport(srcPort));
            if(xb < xe) {
                if(yb < ye)
                    g.clearRect(xb-2, yb-2, xe - xb+4, ye - yb+4);
                else
                    g.clearRect( xb-2, ye-2, xe - xb+4, yb - ye+4);
            } else {
                if(yb < ye)
                    g.clearRect(xe-2, yb-2, xb - xe+4, ye - yb+4);
                else
                    g.clearRect(xe-2, ye-2, xb - xe+4, yb - ye+4);
            }
            vj_c.disconnecting(srcNode.getConnectingPort(srcPort));
            srcNode.disconnecting(srcPort);
            vj_c.setConnectingNode(srcNode.getConnectingPort(srcPort) ,null);
            vj_c.setConnectingPort(vj_p,0);
            vj_c.setXPt(vj_p,0);
            vj_c.setYPt(vj_p,0);
            vj_c.setToDraw(vj_p,false);
            srcNode.setToDraw(srcPort,false);
            srcNode.setConnectingNode(srcPort,null);
            srcNode.setConnectingPort(srcPort,0);
            srcNode.set)(Pt(srcPort,0);
            srcNode.setYPt(srcport,0);
            disconnecting = false;
            return;
        }
        if(current_node!=null &&
compatible(srcNode,srcport,current_node ,current_port)) {
            if(disconnecting) {
                int xb = srcNode.getXPt(srcPort);
                int xe = vj_c.getXPt(vj_p);
                int yb = srcNode.getypt(srcPort);
                int ye = vj_c.getYPt(vj_p);
                if(xb < xe) {
                    if(yb < ye)
                        g.clearRect( xb-2, yb-2, xe - xb+4, ye - yb+4);
                    else
                        g.clearRect( xb-2, ye-2, xe - xb+4, yb - ye+4);
                } else {
                    if(yb < ye)
                        g.clearRect( xe-2, yb-2, xb - xe+4, ye - yb+4);
                    else
                        g.clearRect( xe-2, ye-2, xb - xe+4, yb - ye+4);
                }
                vj_c.setConnectingNode (vj_p,current_node);
                vj_c.setConnectingPort(vj_p,current_port);
                vj_c.setToDraw(vj_p,true);
                current_node.setConnectingNode(current_port,vj_c);
                current_node.setConnectingPort(current_port,vj_p);
                current_node.set)(Pt(current_port,xend);
                current_node.setYPt(current_port,yend);
                current_node.resetToDraw(current_port);
                vj_c.connecting(vj_p);
                current_node.connecting(current_port);
```

```
                srcNode.disconnecting(srcPort);
                srcNode.resetToDraw(srcPort);
                srcNode.setConnectingNode(srcPort,null);
                srcNode.setConnectingPort(srcPort,0);
                srcNode.setXpt(srcPort,0);
                srcNode.setypt(srcPort,0);
                disconnecting = false;
                g.drawLine(xbeg,ybeg,xend,yend);
                return;
            }
            srcNode.setConnectingNode(srcPort,current_node);
            srcNode.setConnectingPort(srcPort,current_port);
            srcNode.setXpt(srcport,xbeg);
            srcNode.setypt(srcport,ybeg);
            srcNode.setToDraw(srcport,true);
            current_node.setConnectingNode (current_port, srcNode);
            current_node.setConnectingPort(current_port, srcPort);
            current_node.set)(Pt(current_port,xend);
            current_node.setYPt(current_port,yend);
            current_node connecting(current_port);
            srcNode.connecting(srcPort);
            g.drawLine(xbeg,ybeg,xend,yend);
        }
    }
    public void doAllconnects(){
    }
    public boolean compatible(VJNode sn, int sp, VJNode dn, int dp){
        if(disconnecting){
            VJNode cn_s = sn.getConnectingNode(sp);
            int cp_s = sn.getConnectingPort(sp);
            if(cn_s.getPortType(cp_s) ==VJPort.Input && dn.getportType(dp) ==
VJPort.Input)
                return false;
            if(cn_s.getPortType(cp_s) ==VJPort.Output && dn.getportType(dp) ==
VJPort.Output)
                return false;
        } else {
            if(sn.getPortType (sp) = =VJPort.Input && dn.getportType(dp) ==
VJPort.Input)
                return false;
            if(sn.getPortType (sp) ==VJPort.Output.&& dn.getPortType(dp) ==
VJPort.Output)
                return false;
        }
        if(sn==dn && sp==dp) return false;
        if(isConnected(dn,dp)) return false;
        return true;
    }
    public boolean isConnected(VJNode node,int port){
        return node.getConnectingNode{port) !=null;
    }
    public void beginMarquee(int x, int y){
        / / System.out.println("BEGIN MARQUEE");
        marquee = true;
        xbeg = x;
        ybeg = y;
        xend = x;
        yend = y;
        marquee = true;
        Graphics g = getGraphics();
        g.setXORMode(Color.white);
        g.drawRect( xbeg, ybeg, 0, 0);
    }
    public void doMarquee(int x, int y){
        / /System.out.println("DO MARQUEE");
        Graphics g = getGraphics();
        g.setXORMode(Color.white);
        if(xbeg < xend) {
            if(ybeg < yend)
                g.drawRect(xbeg, ybeg, xend - xbeg, yend - ybeg);
            else
                g.drawRect(xbeg, yend, xend - xbeg, ybeg - yend);
        } else {
            if(xbeg < yend)
                g.drawRect(xend, ybeg, xbeg - xend, yend - ybeg);
            else
                g.drawRect(xend, yend, xbeg - xend, ybeg - yend);
        }
```

```
        xend = x;
        yend = y;
        if(xbeg < xend) {
            if(ybeg < yend)
                g.drawRect(xbeg, ybeg, xend - xbeg, yend - ybeg);
            else
                g.drawRect(xbeg, yend, xend - xbeg, ybeg - yend);
        } else {
            if(ybeg < yend)
                g.drawRect(xend, ybeg, xbeg - xend,yend - ybeg);
            else
                g.drawRect(xend, yend, xbeg - xend, ybeg - yend);
        }
}
public void endMarquee(int x,int y){
    int j,i,t,1,b,r;
    boolean emptySelect;
    // System.out.println("END MARQUEE");
    Graphics g = getGraphics();
    g.setXORMode(color.white);
    if(xbeg < xend){
        if(ybeg < yend)
            g.drawRect(xbeg, ybeg, xend - xbeg, yend - ybeg);
        else
            g.drawRect(xbeg, yend, xend - xbeg, ybeg - yend);
    } else {
        if(ybeg < yend)
            g.drawRect xend, ybeg, xbeg - xend, yend - ybeg);
        else
            g.drawRect(xend,yend,xbeg - xend,ybeg - yend);
    }
    xend = x;
    yend = y;
    marquee = false;
    emptySelect = true;
    if(xbeg < x && ybeg < y) {
        t = ybeg;
        1 = xbeg;
        b = y;
        r = x;
    }
    else
        if(xbeg < x && ybeg > y) {
            t = y;
            1 = xbeg;
            b = ybeg;
            r = x;
        }
    else
        if(xbeg> x && ybeg < y) {
            t = ybeg;
            1 = x;
            b = y;
            r = xbeg;
        }
        else {
            t = y;
            1 = x;
            b = ybeg;
            r = xbeg;
        }
    Rectangle r1 = new Rectangle(1,t,r-1,b-t);
    for(Enumeration e = container.nodes.elements();
e.hasMoreElements() ;) {
        VJNode vjn = (VJNode) e.nextElement();
        if(vjn.nodeRect.intersects(r1)) {
            if(vjn.getselected()) {
                vjn.setSelected(false); // set current selection here
                if(vjn.isUlNode)
app.theDocument.clearLite(app.theDocument.getGraphics() ,vjn.comp.
bounds());
            }
            else
            vjn.setSelected(true);
            emptySelect = false;
        }
    }
```

-continued

```
        app.theDocument.repaint();
        / / if(emptySelect) container.resetSelected();
        repaint();
}
public void beginDrag(int x, int y){
        / /System.out.println("BEGIN DRAG");
        xbeg = x;
        ybeg = y;
        xend = x;
        yend = y;
        Graphics g = getGraphics();
        g.setXORMode(Color.white);
        for(Enumeration e = container.nodes.elements()
e.hasMoreElements() ;) {
                VJNode vjn = (VJNode) e.nextElement();
                if(vjn.getSelected()) {
                    g.drawRect(vjn.nodeRect.x,vjn.nodeRect.y,
                        vjn.nodeRect.width,vjn.nodeRect.height);
                    drag = true;
                }
        }
}
public void doDrag(int x, int y){
        / / System.out.println("DO DRAG");
        Graphics g getGraphics();
        g.setXORMode(Color.white);
        for(Enumeration e = container.nodes.elements()
e.hasMoreElements() ;) {
            VJNode vjn = (VJNode) e.nextElement();
            if(vjn.getselected())
                g.drawRect(vj n.nodeRect.x+xend-xbeg,vjn.nodeRect.y+yend-
ybeg,
                        vjn.nodeRect.width,vjn.nodeRect.height);
        }
        xend = x;
        yend = y;
        for(Enumeration e = container.nodes.elements()
e.hasMoreElements() ;) {
            VJNode vjn = (VJNode) e.nextElement();
            if(vjn.getSelected())
                g.drawRect(vj n.nodeRect.x+xend-xbeg,vj n.nodeRect.y+yend-
ybeg,
                        vjn.nodeRect.width,vjn.nodeRect.height);
        }
}
public void endDrag(int x, int y){
        int i;
        / / System.out.println("END DRAG");
        Graphics g = getGraphics();
        g.setXORMode(Color.white);
        for(Enumeration e = container.nodes.elements()
e.hasMoreElements() ;) {
            VJNode vjn = (VJNode) e.nextElement();
            if(vjn.getSelected())
                g.drawRect(vjn.nodeRect.x+xend-xbeg,vjn.nodeRect.y+yend-
ybeg,
                        vjn.nodeRect.width,vjn.nodeRect.height);
        }
        g.clearRect(0,60 ,bounds ().width, bounds().height-60); / / Clear
Everthing
        for(Enumeration e = container.nodes.elements()
e.hasMoreElements() ;) {
            VJNode vjn = (VJNode) e.nextElement();
            if(vjn.getSelected()){
                if(y>60+inset v){
                    vjn.nodeRect.move(vjn.nodeRect.x+xend-
xbeg,vjn.nodeRect.y+yend-ybeg);
                    vjn.x = vjn.x +xend-xbeg;
                    vjn.y = vjn.y +yend-ybeg;
                    for(int j =0;j <vjn.getNumberOgPorts() ;j ++)
                        if(vjn.getxPtU) >=0){
                            vjn.set)(Pt(j, vjn.getxPt(j) +xend-xbeg);
                            vjn.setYPt(j, vjn.getyPt(j)+yend-ybeg);
                        }
                }
            }
        }
```

```
            xend = x;
            yend = y;
            drag = false;
    }
    public void clearArea(Rectangle r){
            Graphics g = getGraphics();
            g.clearRect(r.x-9 ,r.y-9 ,r.width+24,r.height+24);
            repaint(r.x-9 ,r.y-9 ,r.width+24 ,r.height+24);
    }
        public void highlight(Graphics g) {
                int i;
    }
        public void drawLite(Graphics g, Rectangle r) {
    }
        public void clearLite(Graphics g, Rectangle r) {
    }
        public void resetSelected() {
    }
        public void update(Graphics g){
                paint(g);
            }
            public void drawNode(Image img,int x, int y){
                Graphics g = getGraphics();
                g.drawImage(img,x,y,this);
            }
            public void paint(Graphics g) {
                int i,j;
                if(firstTime) {
                    if(app.isMicrosoft){
                        inset_v = 0;
                        inset_h = 0;
                    } else {
                        inset_v = insets().top;
                        inset_h = insets().left;
                    }
                    firstTime = false;
                }
g.drawLine(0,60+inset_v,bounds().width,60+inset_v);
                container.drawNet(g);
    }
public boolean handleEvent(Event e) {
    if(app.loading) {system.out.println("Loading VJ"); return true; }
switch (e.id) {
    case Event.MOUSE_MOVE:
        current_node = onNode(e.x,e.y);
        if(current_node!=null&&!nodeInfoDrawn) {
            EraseNodeInfo();
            DrawNodeInfo();
            nodeInfoDrawn = true;
        }else
                if(current_node==null&&nodeInfoDrawn) {
            EraseNodeInfo();
            nodeInfoDrawn = false;
        }
        current_node = onport(e.x,e.y);
        if(current_port>=0&&!portInfoDrawn) {
            ErasePortInfo();
            DrawPortInfo();
            portInfoDrawn = true;
            portInfo = current_port;
    } else
                if(portInfoDrawn&&current_port!=portInfo) {
            EraseportInfo();
            portInfoDrawn = false;
        }
        return true;
case Event.KEY_PRESS:
    if(e.key== 127) container.theDesktop.doCut();
    if(e.key==4) container.DUMP();
    if(e.controlDown()){
        switch(e.key){
            case 3:
                    container.theDesktop.doCopy();
                    break;
            case 5:
                    container.theDesktop.editComponent();
                    break;
```

-continued

```
            case 24:
                    container.theDesktop.doCut();
                    break;
            case 22:
                    container.theDesktop.dopaste();
                    break;
            case 1:
            container.theDesktop.doSelectAll();
            break;
            default:
                    break;
                    }
                }
            return true;
        case Event.MOUSE_DOWN:
                    if((e.when - lastTime)<1000) {
                        lastTime = e.when;
                        System.out.println("DC");
                        container.editComponent();
                            return false;
                    }
                    lastTime = e.when;
                    current_node = onNode(e.x,e.y);
                    if(current_node!=null){
                        doNodeSelection(current_node ,e.controlDown() ,e.x,e.y);
                    } else {
                        current_node = onport(e.x,e.y);
                        if(current_node!=null){
                            if(isConnected(current node,current_port)) {
                                // System.out.println("BEGIN DISCONNECTING");
                                disconnecting=true;
                            }
                            connecting=true;
                        } else {
                            if(!(e.controlDown())){
app.theDocument.clearlight(app.theDocument.getGraphics());
                                container.resetSelected();
                            }
                                    current_comp_node =
container.theDesktop.tools.getCurrent();
// System.out.println("current_selection"+current_comp_node);
                            if(current_comp_node>0) {
                                // Add New component
                                VJNode theNode=null;
                                switch(current_comp_node){
                                    case 1: VjContainer vjcnt = new VjContainer(app);
                                        vjcnt.setParent(container);
                                        vjcnt.VJContainerInit(e.x,e.y);
                                        theNode = vjcnt;
                                        break;
                                //    case 2: VJNetPin vjnp = new VJNetPin(app);
                                //        vjnp.setContainer(container);
                                //        vjnp.VJNetPinInit(e.x,e.y);
                                //        theNode = vjnp;
                                //        break;
                                    case 2: VJPlus vjp = new VJPlus(app);
                                        vjp.VJPlusInit(e.x,e.y);
                                        theNode = vjp;
                                        break;
                                    case 3: VJBiCopy vjb = new VJBiCopy(app);
                                        vjb.VJBiCopyInit(e.x,e.y);
                                        theNode = vjb;
                                        break;
                                    case 4: VJEquals vje = new VJEquals(app);
                                        vje.VJEqualsInit(e.x,e.y);
                                        theNode = vje;
                                        break;
                                    case 5: VJConstant vjc = new VJConstant(app);
                                        vjc.VjConstantInit(e.x,e.y);
                                        theNode = vjc;
                                        break;
                                    case 6: VJRandom vjr = new VJRandom(app);
                                        vjr.VjRandomInit(e.x,e.y);
                                        theNode = vjr;
                                        break;
                                    case 7: VJCounter vjct = new VJCounter(app);
                                        vjct.VJCounterInit(e.x,e.y);
                                        theNode = vjct;
                                        break;
```

-continued

```
                    case 8: VJURLOpener vju = new VJURLOpener(app);
                        vju.VJuRLopenerInit(e.x,e.y);
                        theNode = vju;
                        break;
                    case 9: VJSplit vjs = new VJSplit(app);
                        vjs.VjSplitInit(e.x,e.y);
                        theNode = vjs;
                        break;
                    case 10: theNode = null;
                        break;
                }
                if(theNode!=null){
                    theNode.init();
                    theNode.propertiesEditor();
                    if(!e.controlDown()){
                        container.resetSelected();
                    }
                    container.addNode((Object)theNode);
                    theNode.setSelected(true);
                            container.theDesktop.tools.setCurrent(0);
                    current_comp_node =
container.theDesktop.tools.getCurrent();
                            container.theDesktop.tools.repaint();
                }
                    }
                }
                if(connecting) {
                    beginConnection(e.x,e.y);
                }
                else beginMarquee(e.x,e.y);
            }
            return true;
        case Event.MOUSE_UP:
            // System.out.println("UP");
            if(connecting) {endconnection(e.x,e.y); repaint(); return
true;}
            if(marquee) {endMarquee(e.x,e.y); repaint(); return true;}
            if(drag) {endDrag(e.x,e.y); repaint(); return true;}
            return true;
        case Event.MOUSE_DRAG;
            //System.out.println("DRAG");
            if(connecting) {
                doConnection(e.x,e.y);
                return true;
            }
            if(marquee) {
                doMarquee(e.x,e.y);
                return true;
            }
            if(drag) {
                doDrag(e.x,e.y);
                return true;
            }
            return true;
        default: // System.out.println("Other event "+e.toString());
            return false;
        }
    }
}
void DrawportInfo(){
    Graphics g = getGraphics();
    VJNode vjn;
    if(current_node==null || current_port<0) return;
    g.drawString(current_node.name+"Pin: "+current_port+"
"+current_node.getPortInfo(current_port) , 30,40);
}
void ErasePortInfo(){
    Graphics g = getGraphics();
    g.clearRect(30 ,29 ,bounds().width, 15);
}
void DrawNodeInfo(){
    Graphics g = getGraphics();
    if(current_node == null) return;
g.drawString(current_mode.name+": "+current_node.getNodeInfo(),30,2
2);
void EraseNodeInfo(){
    Graphics g = getGraphics();
    g.clearRect(30,12,bounds().width,13);
}
```

-continued

```
void Error(String error) {
    System.out.println("Node: "+ error);
    System.out.flush();
}
}
VJNode is coded as follows:
import java.awt.*;
import java.awt.image.*;
import java.util.*;
// A class that is used to represent both primitive and hierarchical VJ
nodes
abstract class VJNode extends VJCore {
// Class attributes
private final static String getPortNameError = "get port name error";
private final static String getPortInfoError = "get port info error";
private final static String noQuickInfo    = "no quick info available";
private final static String noAuthorInfo   = "no author info available";
private final static String noExpirationDate = "no expiration date";
private final static String noVersionInfo  = "no version info";
private final static String noCostInfo     = "no cost info";
private final static String noName         = "no name";
private final static String noComponentURL = "no URL";
private final static String noportName     = "no port name";
//Attributes
private String info_url;
private String quick_info;
private String author_info;
private String version_info;
private String cost_info;
private String expiration_date;
private String componentURL;
private Vector port_name;
private Vector port_info;
private Vector porr_type;
private Vector port_location;
private Vector XPts;
private Vector YPts;
private int numberOfPorts=0;
private Image normalImage=null;
private Image selectedImage=null;
private String normal = null;
private String selected = null;
private GIFFactory factory=null;
boolean isContainer;        // true if the node is hierarchical
boolean isSelected;         // true if the node is currently selected
boolean isulNode;           // true if the node has a user interface
(exits on the web page)
int x;                      // the x position in the parent container
int y;                      // the y position in the parent container
Vector drawFromPort;
int portCount;              // the number of ports the node has
VJ vj;                      // a reference to the VJ applet
Rectangle nodeRect;         // the rectangle accociated with this nodes
image
String name;
public VJNode(VJ v){
    super(v);
    vj = v;
    port_name = new Vector();
    port_type = new Vector();
    port_info = new Vector();
    port_location = new Vector();
    drawFromPort = new Vector();
    XPts = new Vector();
    YPts = new Vector();
}
public void VjNodeInit(boolean isCnt,int x,int y,boolean ui){
    this.x = x;
    this.y = y;
    isSelected = false;
    isContainer = isCnt;
    isUlNode = ui;
    portCount = 0;
}
    public void setSelected(boolean b){
    isSelected = b;
}
```

-continued

```
public boolean getSelected() {
    return isSelected;
}
public void setImages(Image ni, Image si){
    normalImage = ni;
    selectedImage = si;
}
public void setToDraw(int theport,boolean b) {
    try{
        drawFromPort.setElementAt(new Boolean(b),thePort);
    } catch(Exception e){
        System.out.println(e);
    }
}
public boolean getToDraw(int port) {
    try{
        return ((Boolean) drawFromPort.elementAt(port)).booleanValue ();
    } catch(Exception e){
        System.out.println(e);
        return false;
    }
}
public void resetToDraw(int theport) {
    try{
        drawFromPort.setElementAt(new Boolean(false) ,thePort);
    } catch(Exception e){
        System.out.println(e);
    }
}
public int getXPt(int port) {
    try{
        return ((Integer) XPts.elementAt(port)).intValue ();
    } catch(Exception e){
        System.out.println(e);
        return -1;
    }
}
public void set)(Pt(int port,int val) {
    try{
        XPts.setElementAt(new Integer(val) ,port);
    } catch(Exception e){
        System.out.println(e);
    }
}
public int getYPt(int port) {
    try{
        return ((Integer) YPts.elementAt(port)).intValue();
    } catch(Exception e){
        System.out.println(e);
        return -1;
    }
}
public void setYPt(int port,int val) {
    try{
        YPts.setElementAt(new Integer(val) ,port);
    } catch(Exception e){
        System.out.println(e);
    }
}
public void addport(String pi, String pn, int pt, int pl){
    port_same.addElement(pn);
    port_info.addElement(pi);
    port_type.addElement(new Integer(pt));
    porUocation.addElement(new Integer(pl));
    XPts.addElement(new Integer(0));
    YPts.addElement(new Integer(0));
    connectingNode.addElement(null);
    connectingPort.addElement(new Integer(0));
    drawFromPort.addElement(new Boolean(false));
};
public String getportInfo(int port){
    try{
        return (String) port_info.elementAt(port);
    } catch(Exception e){
        System.out.println(e);
        return getportInfoError;
    }
};
public String getNodeInfo(){
```

-continued

```
        if(quick_info==null) return noQuickInfo;
        return quick_info;
};
public void setComponentInfo(String n){
        quick_info=n;
};
public Component getComponent(){
        if(comp==null) System.out.println("The component "+name+"is
null");
        return comp;
};
public void setComponent(Component n){
        comp=n;
};
public String getAuthorName(){
        if(author_info==null) return noAuthorInfo;
        return author_info;
};
public void setAuthorName(String n){
        author_info=n;
};
public String getExpirationDate(){
        if(expiration date==null) return noExpirationDate;
        return expiration_date;
};
public void setExpirationDate(String n){
        expiration date=n;
};
public String getCost(){
        if(cost info==null) return nocostInfo;
        return cost_info;
};
public void setCost(String n){
        cost_info = n;
};
public String getVersion(){
        if(version info==null) return noVersionInfo;
        return version_info;
};
public void setVersion(String n){
        version_info = n;
};
public void setName(String n){
        name = n;
};
public String getName(){
        if(name==null) return noName;
        return name;
};
public void setComponentURL(String n){
        componentURL = n;
};
public String getComponentURL(){
        if(componentURL==null) return noComponentURL;
        return componentURL;
};
public void setNormalIcon(String n){
        normal = n;
};
public Image getNormalIcon() {return normalImage; }
public void setSelectedIcon(String n){
        selected = n;
};
public Image getSelectedIcon(){return selectedImage; };
private boolean inRange(int n) {
        return n >=0 && n < port_type.size();
}
public int getNumberOfPorts(){
        return port_type.size();
}
public void setNumberOfPorts(int n){
        numberOfPorts = n;
}
```

```
                                    -continued public int getPortType(int port){
    try{
        return ((Integer) port_type.elementAt(port)).intValue();
    } catch(Exception e){
        System.out.println(e);
        return -1;
    }
}
public int getPortLocation(int port){
    try{
        return ((Integer) port_location.elementAt(port)).intValue();
    catch(Exception e){
        System.out.println(e);
        return -1;
    }
}
public String getPortName(int port){
    try{
        return (String) port_name.elementAt(port);
    } catch(Exception e){
        System.out.println(e);
        return noPortName;
    }
}
abstract VJNode dup();
abstract void   disconnecting(int port);
abstract void   connecting(int port);
abstract void   load(String s);
abstract String save();
abstract void propertiesEditor()
}
```

VJ Tool dispatches start stop and init messages to all active instances, 40 of components as start( ), stop( ) and init( ). When VJ is loading, we want to have the user wait until that process is completed, so VJ Tool will ignore events and a splash sheet with a warning message is displayed that says no action will be possible until loading is completed. Once VJ Tool is loaded and initialized completely, the warning screen is dropped and user interaction is enabled.

The initialization process initializes and enables the logical view and the physical view. The initialization processing includes VJ Tool's data structures and palettes, which comprise "primitive" or basic building block components coded entirely in Java. Once initialization is completed, the cut, paste, select all, move, drag, drop, point, and other functions are active. These functions associated with the VJ Tool menu bars are defaulted from the VJContainer class. The palettes and menus are created from VJDesktop.

VJ Tool then invokes user requests and such actions as may be appropriate thereto, as indicated in block 312. Once all requests have been satisfied, VJ Tool cycles back through link 314 and waits for subsequent user requests. If there are no further requests to be carried out, the user exits via block 316.

Figure 4A:
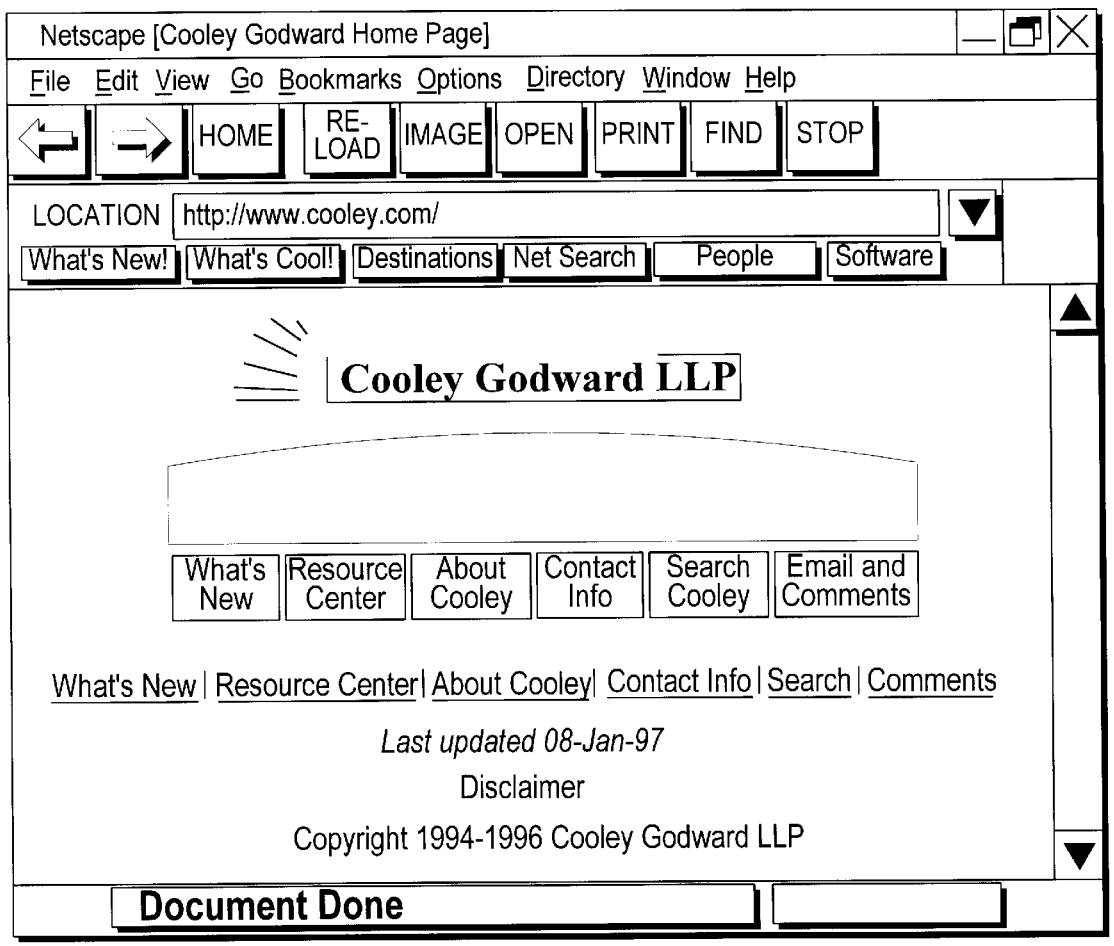
FIG. 4A shows an example of an illustrative World Wide Web home page as loaded by a Java enabled browser in accordance with a preferred embodiment.
Figure 4B:
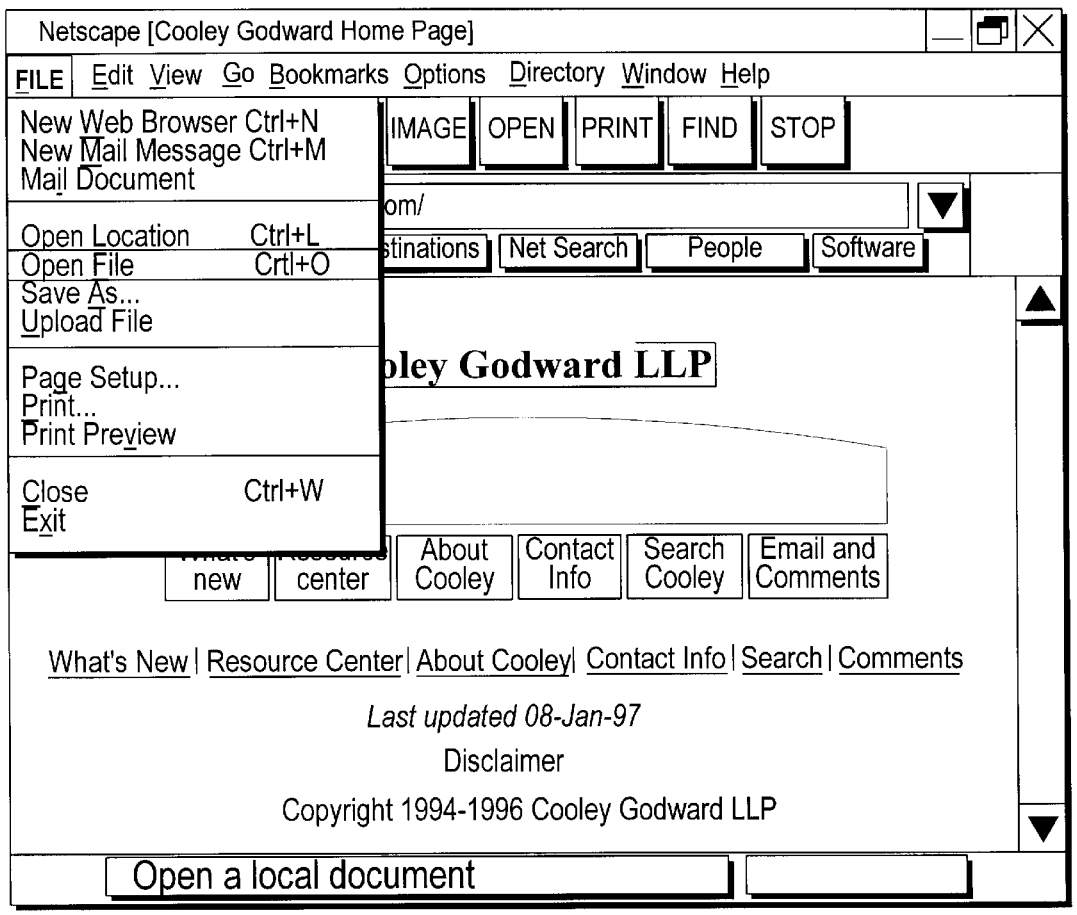
FIG. 4B illustrates the same web page with its main pull-down menu activated in accordance with a preferred embodiment.
Figure 4C:
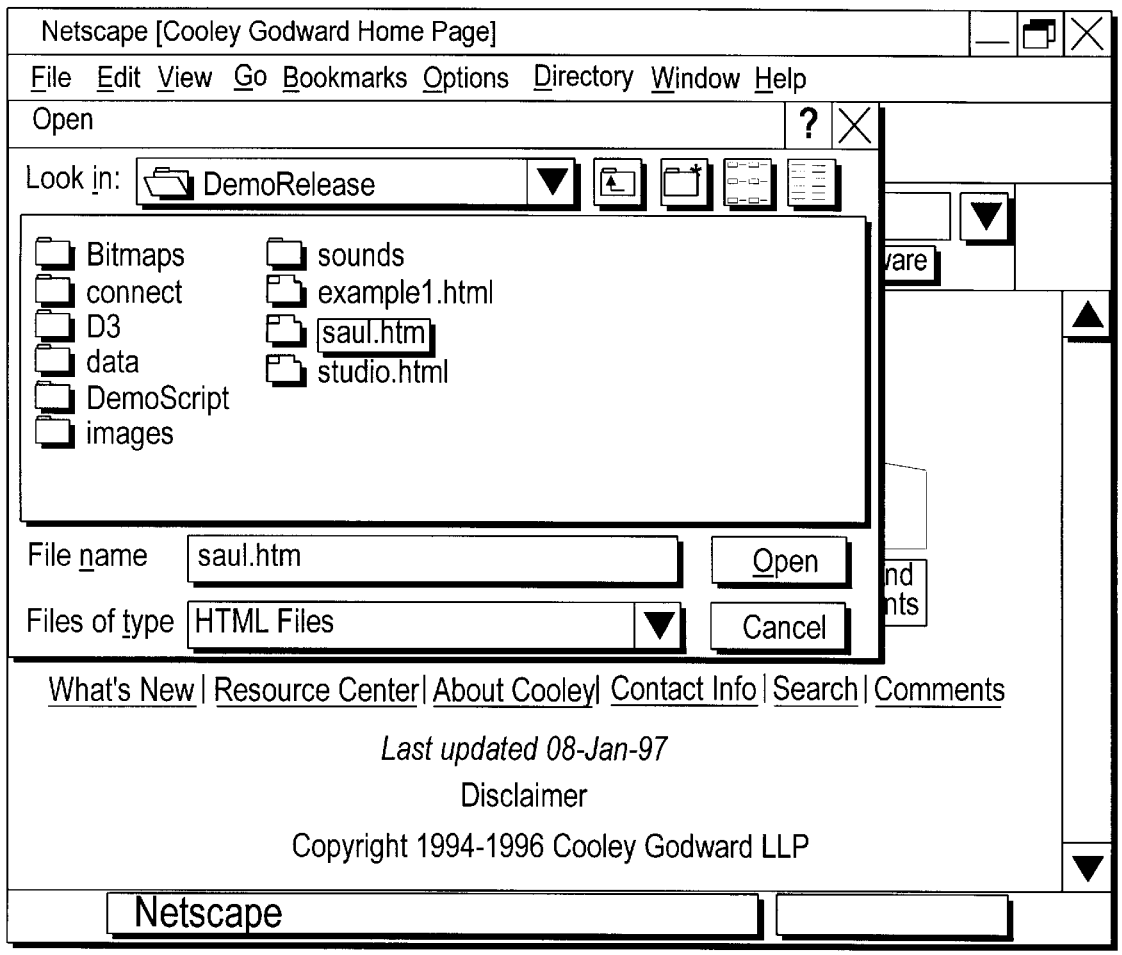
FIG. 4C depicts the "Open File" pull-down menu of the home page shown in FIG. 4B in accordance with a preferred embodiment.

FIG. 4A shows an example of a World Wide Web home page that is displayed when the Netscape Navigator is invoked in accordance with a preferred embodiment. If this page had included a Java enabled applet, that applet would have been downloaded and activated as soon as the user clicked on it. Alternatively, an applet could be locally resident and thus be directly available. FIG. 4B illustrates the same web page with its main pull-down menu activated. FIG. 4C depicts the "Open File" pull-down menu of the home page shown in FIG. 4B. Note that the files found in the local file "saul.htm" include the applet called "DemoRelease", which is actually a back level version of VJ Tool, ready to select and run.

Figure 4D:
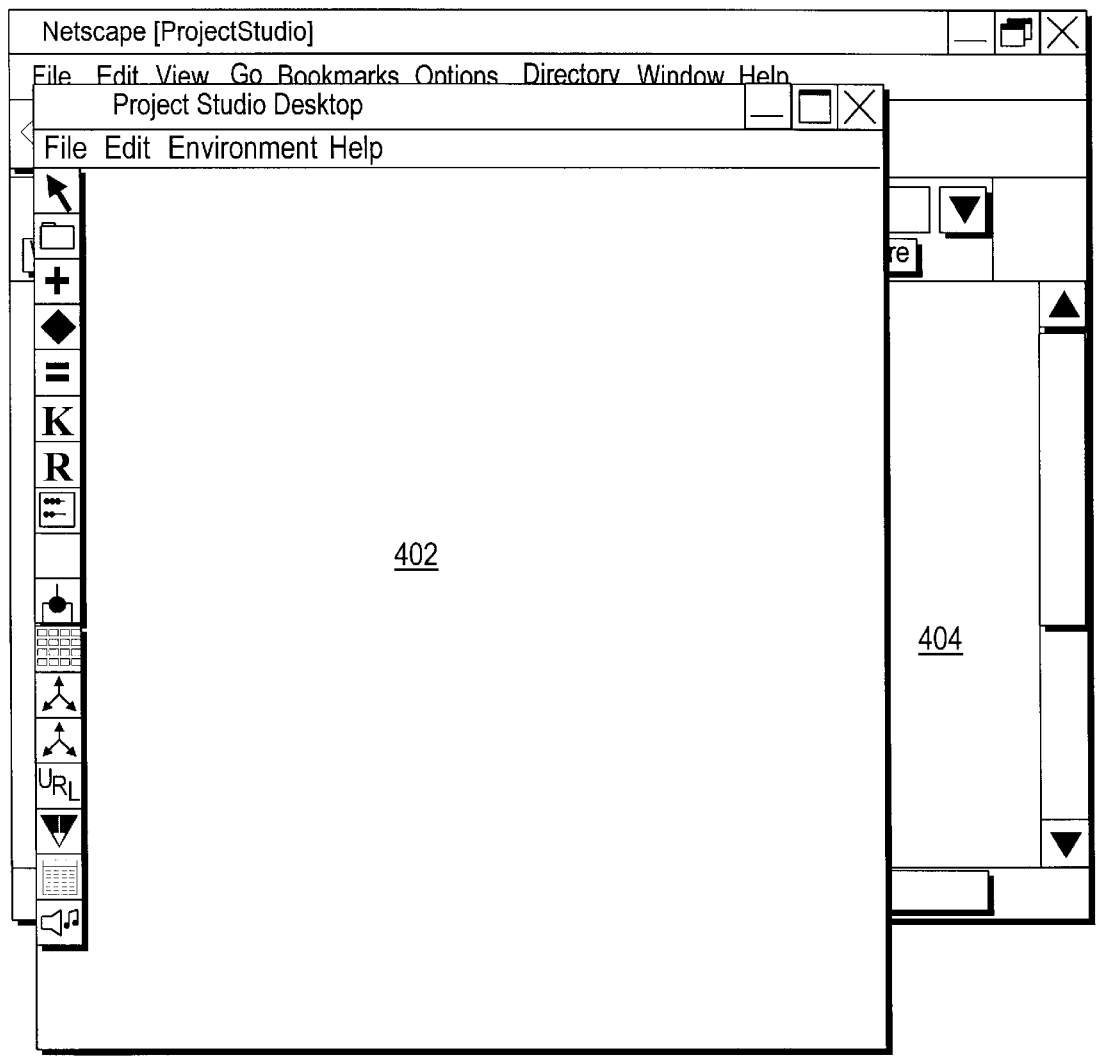
FIG. 4D shows the Virual Java Tool applet after it has been initialized and is ready to run in accordance with a preferred embodiment.
Figure 5:
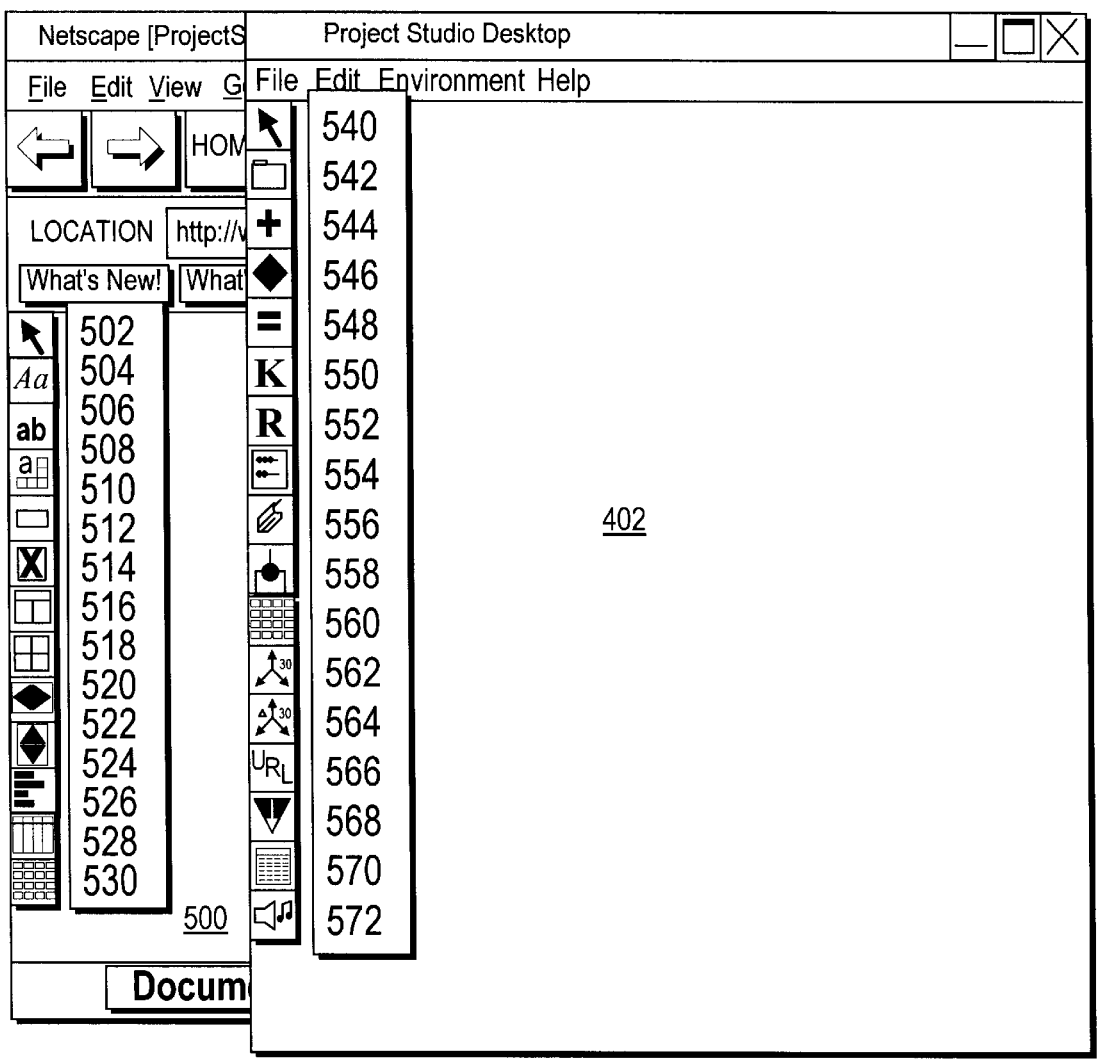
FIG. 5 illustrates the physical or end user view screen portion in accordance with a preferred embodiment.

FIG. 4D shows the VJ Tool applet after it has been initialized and is ready to run. VJ Tool comes up on the user's screen after being initialized and deployed with two main views as shown in FIG. 4D. These views are equivalent to the status depicted by block 310 in FIG. 3. Window 402 shows the active VJ Tool desktop, in particular, its logical view 402. Logical view 402, also called the document view, is created from VJDocument. Window segment 404 is the right hand portion of the base home page shown in FIGS. 4A, 4B and 4C. The other view, the user physical view is shown in FIG. 5.

The source code enabling VJDocument is presented below.

```
The source code enabling VJDocument is presented below.
importjava.util.*;
importjava.awt.*;
class VJDocument extends container {
    VJ app;
    VJContainer container;
    VJNode current_i;
    int current_ui_comp;
    static int xOffset = 40;        // used to define the position on the desktop
```

```
            static int yOffset = 100;      // at which the new icon corresponding to a
                                           // component is to be placed.
        int top, left, right, bottom;
        int ytop, xleft, xright, ybottom;
        boolean grow;
        int grow, wpe;
        public VJDocument(VJ v, VJContainer c){
            // Set the environment variables
            super(v);
            app = v;
            container = c;
            current_ui_comp = 0;
            current_i = null;
            // Initial Layout for the Applet
            setLayout(null);
        }
void marqueeAction(boolean cntrDwn, Rectangle r, int x, int y){
        current_ui_comp = app.uiTools.getCurrent( );
        if(current ui_comp>0 && bigEnough( )) {
            Graphics g = getGraphics( );
            VJNode vjn = newComponent(cntrDwn, x, y);
            if(vjn!=null){;
                if(!cntrDwn) clearlight(g);
                current_ui_comp = 0;
                vjn.setSelected(true);
                container.theDesktop.vp_w.repaint( );
                drawLite(g, r);
                app.uiTools.setCurrent(O);
                app.uiTools.repaint( );
            }
            return;
        }
        boolean emptySelect;
        emptySelect = true;
        for(Enumeration e = app.theContainer.nodes.elements( );
e.hasMoreElements( );) {
            VJNode vjn = vJNode) e.nextElement( );
            if(vjn.isUINode&&vjn.comp.bounds( ).intersects(r)){
                if(cntrDwn){
                    if(vjn.getSelected( )){
                        vjn.setSelected(false);
                        clearLite(getGraphics( ), vjn.comp.bounds( ));
                    }else vjn.setSelected(true);
                }
                else
                    vjn.setSelected(true);
                emptySelect = false;
            }
        }
        if(!emptySelect) {
            repaint( );
            container.theDesktop.vp_w.repaint( );
        }
}
void drawDrag(Graphics g, int i, int j , int k, int l){
        for(Enumeration e = app.theContainer.nodes.elements( );
e.hasMoreElements( );) {
            VJNode vjn = VJNode) e.nextElement( );
            if(vjn.getSelected( ))
                g.drawRect(vjn.comp.bounds( ).x-1+xend-
xbeg, vjn.comp.bounds( ).y-1+yend-ybeg,
vjn.comp.bounds( ).width+1, vjn.comp.bounds( ).height+1);
        }
}
void eraseDrag(Graphics g, int i, int j, int k, int l){
        for(Enumeration e = app.theContainer.nodes.elements( );
e.hasMoreElements( );) {
            VJNode vjn = (VJNode) e.nextElement( );
            if(vjn.getSelected( )) g.drawRect(vjn.comp.bounds( ).x-1+xend-
xbeg, vjn.comp.bounds( ).y-1+yend-ybeg,
vjn.comp.bounds( ).width+1, vjn.comp.bounds( ).height+1);
        }
}
void endDragAction(Graphics g, int i, int j, int k, int l){
        for(Enumeration e = app.theContainer.nodes.elements( );
e.hasMoreElements( );){
            VJNode vjn = (VJNode) e.nextElement( );
            if(vjn.getSelected( )){
```

```
                    clearLite(g, vjn.comp.bounds( ));
                    vjn.comp.move(vjn.comp.bounds( ).x+xend-
xbeg, vjn.comp.bounds( ).y+yend-ybeg);
                }
            }
        }
}
void containerPaint(Graphics g){
}
void containerMouseMove(Evente){
}
void containerKeyPress(Evente){
        if(e.key==127) app.theContainer.doCut( );
        if(e.key==4) container.DUMP( );
        if(e.controlDown( )){
            switch(e.key){
                case 3: System.out.println("copy");
                    app.theContainer.doCopy( );
                    break;
                case 24: System.out.println("cut");
                    app.theContainer.doCut( );
                    break;
                case 22: System.out.println("paste");
                    app.theContainer.doPaste( );
                    break;
                case 1: System.out.println("all");
                    app.theContainer.doSelectAll( );
                    break;
                default: System.out.pn.ntln("key"+e.key);
                break;
            }
        }
}
void containerMouseDown(Evente){
        }
void containerMouseUp(Evente){
        if(grow) endGrow(e.x, e.y);
}
void containerMouseDrag(Evente){
        if(grow) doGrow(e.x, e.y);
}
void containerDoubleClick( ){
}
boolean mouseDownSelects(Evente) { return true; }
boolean mouseDownSelection(Evente){
        VJNode vjn = onUIComponent(e.x, e.y);
        if(vjn==null){
            if(!e.controlDown( ))clearlight(getGraphics( ));
            System.out.println("Noton a UI Copmponent");
            return false;
        }
        doUISelection(current_i, e.controlDown( ), e.x, e.y);
        return true;
}
void mouseDownReset(Event e){
        clearlight(getGraphics( ));
}
boolean doMarquee( ) { return true; }
public VJNode onUlComponent(intx, int y){
        for(Enumeration e = app.theContainer.nodes.elements( );
e.hasMoreElements( );) {
            VJNode vjn = (VJNode) e.nextElement( );
            if(vjn.isUINode){
                Rectangle r = vjn.comp.bounds( );
                r.x = r.x-4;
                r.y = r.y-4;
                r.width = r.width+8;
                r.height = r.height+8;
                if(r.inside(x, y)){
                    current_i = vjn;
                    return vjn;
                }
            }
        }
        return null;
}
public boolean closeEnough(int fx, int fx, int fy, int x, int y, int epsilon){
return x <fx+epsilon && x >fx-epsilon && y <fy+epsilon && y >fy-
epsilon;
}
```

-continued

```
public int getGrowType(VJNodevjn, int x, int y){
int top_y, mid_y, bottom_y, left_x, mid_x, right_x;
Rectangle r = vjn.comp.bounds( );
top_y = r.y-4;
mid_y = r.y+(r.height+1)/2;
bottom_y = r.y+r.height+4;
left_x = r.x-4;
mid_x = r.x+(r.width+1)/2;
right_x = r.x+r.width+4;
if(closeEnough(left_x, top_y, x, y, 4)) return 0;
if(closeEnough(mid_x, top_y, x, y, 4)) return 1;
if(closeEnough(right_x, top_y, x, y, 4)) return 2;
if(closeEnough(left_x, mid_x, y, 4)) return 3;
if(closeEnough(right_x, mid.3y, x, y, 4)) return 4;
if(closeEnough(left_x, bottom_y, x, y, 4)) return 5;
if(closeEnough(mid_x, bottom_y, x, y, 4)) return 6;
if(closeEnough(right_x, bottom_y, x, y, 4))return 7;
return 8;
}
public void doUISelection(VJNode vjn, boolean cntDwn, int x, int y){
    growType = getGrowType(vjn, x, y);
    System.out.println("Do UI"+growType);
    if(!cntDwn){
        if(!vjn.getSelected( )) {
        resetSelected( );
        vjn.setSelected(true);
        }
        if(growType==8)
            beginDrag(x, y);
        else
            beginGrow(vjn, x, y);
        // current_component = i;
        repaint( );
        container.theDesktop.vp_w.repaint( );
    } else {
        if(vjn.getSelected( )) {
            Rectangle r = vjn.comp.bounds( );
            vjn.setSelected(false);
            clearLite(getGraphics( ), r);
            for(Enumeration e = app.theContainer.nodes.elements( );
e.hasMoreElements( );) {
                VJNode vjn1 = (VJNode) e.nextElement( );
                        if(vjnl.getSelected( )){
                            repaint( );
                        return;
                        }
                }
            } else {
            vjn.setSelected(true);
            container.theDesktop.vp_w.repaint( );
            repaint( );
            return;
        }
    }
}
public boolean bigEnough( ){
        //return xbeg-yend !=0 && ybeg-xbeg!=0;
        return true;
        }
public void beginGrow(VJNode vjn, int x, int y){
    Rectangle r = vjn.comp.bounds( );
    xbeg = x;
    ybeg = y;
    xend = x;
    yend = y;
    grow = true;
    Graphics g = getGraphics( );
    g.set)(ORMode(Color.white);
    top = r.y; ytop=top;
    left = r.x; xleft=left;
    bottom = r.y+vjn.comp.bounds( ).height; ybottom=bottom;
    right = r.x+vjn.comp.bounds( ).width ; xright = right;
    g.drawRect(left, top, r.width, r.height);
}
public void doGrow(int x, int y){
    Graphics g = getGraphics( );
    g.set)(oRMode(Color.white);
    g.drawRect(left, top, right–left, bottom–top);
    xend = x;
```

```
        yend = y;
        switch(growType){
                case 0: // top left
                        top = ytop+(yend−ybeg);
                        left = xleft+(xend−xbeg);
                        break;
                case 1: // top middle
                        top = ytop+(yend−ybeg);
                        break;
                case 2: // top right
                        top = ytop+(yend−ybeg);
                        right = xright+(xend−xbeg);
                        break;
                case 3: // middle left
                        left = xleft+(xend−xbeg);
                        break;
                case 4: // middle right
                        right = xright+(xend−xbeg);
                        break;
                case 5: // bottom left
                        left = xleft+(xend−xbeg);
                        bottom = ybottom+(yend−ybeg);
                        break;
                case 6: // bottom middle
                        bottom = ybottom+(yend−ybeg);
                        break;
                case 7: // bottom right
                        right = xright+(xend−xbeg);
                        bottom = ybottom+(yend−ybeg);
                        break;
        }
        g.drawRect(left, top, right−left, bottom−top);
}
public void endGrow(int x, int y){
    Graphics g = getGraphics( );
    g.set)(oRMode(Color.white);
    g.drawRect(left, top, right−left, bottom−top);
    xend = x;
    yend = y;
    clearLite(g, current_i.comp.bounds( ));
    current_i.comp.reshape (left, top, right−left, bottom−top);
    // if(current_i.compinstanceofVJChart)
    ((VJChart) (current_i.comp)).doResize (left, top, right−left, bottom−top);
    drawLite(g, currenu.comp.bounds( ));
    grow = false;
}
public void clearlight(Graphics g) {
    for(Enumeration e = app.theContainer.nodes.elements( );
e.hasMoreElements( );) {
            VJNode vjn = (VJNode) e.nextElement( );
            if(vjn.getselected( ) &&vjn.isUINode){
                clearLite(g, vjn.comp.bounds( ));
                vjn.setSelected(false);
            }
    }
    container.theDesktop.vp_w.repaint( );
}
public void highlight(Graphics g) {
    for(Enumeration e = app.theContainer.nodes.elements( );
e.hasMoreElements( );) {
            VJNode vjn = (VJNode) e.nextElement( );
            if(vjn.getSelected( ) &&vjn.isUINode){
                drawLite(g, vjn.comp.bounds( ));
            }
    }
}
public void drawLite(Graphics g, Rectangle r) {
    int top_y, mid_y, bottom_y, left_x, mid_x, right_x;
    top_y = r.y;
    mid_y = r.y+(r.height+1)/2−1;
    bottom_=r.y+r.height;
    left_x =r.x;
    mid_x =r.x+(r.width+1)/2−1;
    right_x =r.x+r.width;
    g.setColor(Color.red);
    g.fillRect(left_x−4, top_y−4, 4, 4);
    g.fillRect(left_x−4, mid_y−2, 4, 4);
    g.fillRect(left_x−4, bottom_y, 4, 4);
    g.fillRect(right_x, top_y−4, 4, 4);
```

-continued

```
        g.fillRect(right_x, mid_y-2, 4, 4);
        g.fillRect(right_x, bottom_y, 4, 4);
        g.fillRect(mid_x-2, top_y-4, 4, 4);
        g.fillRect(mid_x-2, bottom_y, 4, 4);
}
public void clearLite(Graphics g, Rectangle r) {
        int top_y, mid_y, bottom_y, left_x, mid_x, right_x
        top_y = r.y;
        mid_y = r.y+(r.height+1)/2-1;
        bottom_=r.y+r.height;
        left_x=r.x;
        mid_x =r.x+(r.width+1)/2-1;
        right_x =r.x+r.width;
        g.clearRect(left_x-4, top_-4, 4, 4);
        g.clearRect(left_x-4, mid_-2, 4, 4);
        g.clearRect(left_x-4, bottom_y, 4, 4);
        g.clearRect(right_x, top_-4, 4, 4);
        g.clearRect(right_x, mid_-2, 4, 4);
        g.clearRect(right_x, bottom_y, 4, 4);
        g.clearRect(mid_x-2, top_-4, 4, 4);
        g.clearRect(mid_x-2, bottom_y, 4, 4);
}
public void resetSelected( ) {
}
public synchronized VJNode newComponent(boolean cntrDwn, int x,
int y){
        int j, i, t, l, b, r;
                if(xbeg < x && ybeg < y) {
                        t = ybeg;
                        l = xbeg;
                        b = y;
                        r = x;
                } else
                if(xbeg < x && ybeg > y) {
                        t = y;
                        l = xbeg;
                        b = ybeg;
                        r = x;
                } else
                if(xbeg > x && ybeg < y) {
                        t = ybeg;
                        l = x;
                        b = y;
                        r = xbeg;
                } else {
                        t = y;
                        l = x;
                        b = ybeg;
                        r = xbeg;
                }
        if((r-1)<16 || (b-t)<16) {
                return null;
        }
        //resetSelected( );
        VJNode vjn;
        switch(current_ui_comp){
                case 1: VJLabel vjl = new VJLabel(app);
                        vjl.VjLabelInit(xOffset, yOffset);
                        vjn = (VJNode) vjl;
                        break;
                case 4: VJButton vjb = new VJButton(app);
                        vjb.VJButtonInit(xOffset, yOffset);
                        vjn = (VJNode)vjb;
                        break;
                case 5: VJCheckbox vjcb = new VJCheckbox(app);
                        vjcb.VJCheckboxInit(xOffset, yOffset);
                        vjn = (VJNode) vjcb;
                        break;
                case 6: VJChoice vjch = new VJChoice(app);
                        vjch.VJChoiceInit(xOffset, yOffset);
                        vjch.comp.reshape(1, t, r-1, b-t+1);
                        vjn = (VJNode) vjch;
                        break;
                case 7: VJList vjli = new VJList(app);
                        vjli.VjListInit(xOffset, yOffset);
                        vjli.comp.reshape(1, t, r-1, b-t+1);
                        vjn = (VJNode) vjli;
                        break;
```

```
                case 8: VjHScrollbar vjhsb = new VJVScrollbar(app);
                        vj hsb.VJHScrollbarInit(xOffset, yOffset);
                        vjn = (VJNode) vjhsb;
                        break;
                case 9: VJVScrollbar vjvsb = new VJVScrollbar(app);
                        vjvsb.VJVScrollbarInit(xOffset, yOffset);
                        vjn = (VJNode) vjvsb;
                        break;
                case 10: VJChart vjchart = new VJChart(app);
                vjchart.VJChartInit(xOffset, yOffset);
                vjn = (VJNode) vjchart;
                break;
                case 2: VJTextField vjt = new VJTextField(app);
                vjt.VJTextFieldInit(xOffset, yOffset);
                vjn = (VJNode) vjt;
                break;
                case 3: VJTextArea vjta = new VJTex__rea(app);
                        vjta.VJTex__reaInit(xOffset, yOffset);
                        vjn = (VJNode) vjta;
                        break;
                default: System.out.println ("UNKNOWNTYPE!"); return null;
}
if(!cntrDwn){
    container.theDesktop.vp__w.resetSelected( );
}
container.addNode((Object)vjn);
if__Offset>220) {
    yOffset = 100;
    xOffset = xOffset+60;
} else yOffset = yOffset+40;
vjn.comp.move(l, t);
add(vjn.comp);
validate ( );
vjn.comp.reshape(1, t, r-l, b-t);
vjn.comp.show( );
vjn.init( );
vjn.propertiesEditor( );
return vjn;
}
public void update(Graphics g){
    paint(g);
}
public void paint(Graphics g) {
    highlight(g);
VJDocument works in conjunction with "container.java." The source
code for "container.java" appears below.
import java.util.*;
import java.awt.*;
abstract class container extends Panel {
boolean marquee;
boolean drag;
int xbeg, xend, ybeg, yend;
int inset__h, inset__v;
boolean firstTime = true;
static long lastTime=0;
VJ app;
public container(VJ v) {
super( );
setLayout(null);
app = v;
marquee = false;
drag = false;
}
public void beginMarquee(intx, int y){
    // System.out.println("BEGINMARQUEE");
    xbeg = x;
    ybeg=y;
    xend = x;
    yend = y;
    marquee = true;
    Graphics g = getGraphics( );
    g.setXORMode(Color.white);
    g.drawRect(xbeg, ybeg, 0, 0);
}
public void doMarquee(int x, int y){
    //System.out.println("DOMARQUEE");
    Graphics g = getGraphics( );
```

-continued

```
        g.set)(oRMode(Color.white);
        if(xbeg < xend) {
            if(ybeg < yend)
                g.drawRect(xbeg, ybeg, xend–xbeg, yend–ybeg);
            else
                g.drawRect(xbeg, yend, xend–xbeg, ybeg–yend);
        } else {
            if(ybeg < yend)
                g.drawRect(xend, ybeg, xbeg–xend, yend–ybeg);
            else
                g.drawRect(xend, yend, xbeg–xend, ybeg–yend);
        }
        xend = x;
        yend = y;
        if(xbeg < xend) {
            if_beg < yend)
                g.drawRect(xbeg, ybeg, xend–xbeg, yend–ybeg);
            else
                g.drawRect(xbeg, yend, xend–xbeg, ybeg–yend);
        } else {
            if_beg < yend)
                g.drawRect(xend, ybeg, xbeg–xend, yend–ybeg);
            else
                g.drawRect(xend, yend, xbeg–xend, ybeg–yend);
        }
    }
public void endMarquee(Event e){
    int x = e.x;
    int y = e.y;
    int j, i, t, l, b, r;
    boolean emptySelect;
    // System.out.println("ENDMARQUEE");
    Graphics g = getGraphics( );
    g.set)(ORMode(Color.white);
    if(xbeg < xend){
        if(ybeg < yend)
            g.drawRect(xbeg, ybeg, xend–xbeg, yend–ybeg);
        else
            g.drawRect(xbeg, yend, xend–xbeg, ybeg–yend);
    } else {
        if_beg < yend)
            g.drawRect(xend, ybeg, xbeg–xend, yend–ybeg);
        else
            g.drawRect(xend, yend, xbeg–xend, ybeg–yend);
    }
    xend = x;
    yend=y;
    marquee = false;
    emptySelect = true;
    if(xbeg < x && ybeg < y) {
        t = ybeg;
        l = xbeg;
        b = y;
        r = x;
    }
    else
        if(xbeg<x && ybeg > y){
            t = y;
            l = xbeg;
            b = ybeg;
            r = x;
        }
        else
            if(xbeg > x && ybeg < y) {
                t = ybeg;
                l = x;
                b = y;
                r = xbeg;
            }
            else {
                t = y;
                l = x;
                b = ybeg;
                r = xbeg;
            }
    Rectangle r1 = new Rectangle(1, t, r–l, b–t);
    marqueeAction(e.controlDown( ), r1, x, y);
    repaint( );
}
```

```
public void beginDrag(intx, int y){
    // System.out.println("BEGINDRAG");
    xbeg = x;
    ybeg = y;
    xend = x;
    yend = y;
    drag = true;
    Graphics g = getGraphics( );
    g.set)(ORMode (Color.white);
    drawDrag(g, x, y, xend, yend); // if drag begin is valid make drag = true
}
public void doDrag(int x, int y){
    // System.out.println("DODRAG");
    Graphics g = getGraphics( );
    g.set)(oRMode(Color.white);
    eraseDrag(g, x, y, xend, yend);
    xend = x;
    yend = y;
    drawDrag(g, x, y, xend, yend);
}
public void endDrag(int x, int y){
    int i;
    // System.out.println("END DRAG");
    Graphics g = getGraphics( );
    g.setXoRMode(Color.white);
    eraseDrag(g, x, y, xend, yend);
        g.clearRect(0, 60, bounds( ).width, bounds ( ).height–60); // Clear Everthing
        endDra_ction(g, x, y, xend, yend);
        xend = x;
        yend = y;
        drag = false;
}
public void clearArea(Rectangle r){
        Graphics g = getGraphics( );
        g.clearRect(r.x–9, r.y–9, r.width+18, r.height+18);
        repaint(r.x–9, r.y–9, r.width+18, r.height+18);
}
public void update(Graphics g){
paint(g);
}
public void paint(Graphics g) {
int i, j;
if(firstTime) {
    if(app.isMicrosoft) {
        inset_v = 0;
        inset_h = 0;
    } else {
        inset_v = insets( ).top;
        inset_h = insets( ).left;
    }
    firstTime = faise;
}
containerPaint(g);
}
public boolean handleEvent(Evente) {
if(app.loading) { System.out.println("LoadingVJ"); return true; }
switch(e.id) {
        case Event.MOUSE_MOVE:
                containerMouseMove(e);
                return false;
        case Event.KEY_PRESS:
                containerKeyPress(e);
                return false;
        case Event.MOUSE_DOWN:
                if((e.when–lastTime)<400) {
                    containerDoubleClick( );
                    lastTime = e.when;
                        return false;
                }
                lastTime = e.when;
                if(mouseDownSelects(e)){
                    if(mouseDownSelection(e)) return false;
            } else {
                if(!(e.controlDown( ))) mouseDownReset(e);
                containerMouseDown(e);
            }
            if(doMarquee( )) beginMarquee (e.x, e.y);
            return false;
```

-continued

```
        case Event.MOUSE_UP:
            containerMouseUp(e);
            if(marquee) { endMarquee(e); repaint( ); return false;}
            if(drag) { endDrag(e.x, e.y); repaint( ); return false;}
            return false;
        case Event.MOUSE_DRAG:
            containerMouseDrag(e);
            if(marquee) { doMarquee(e.x, e.y); return false;}
            if(drag) { doDrag(e.x, e.y); return false;}
            return false;
        default: // System.out.println("Otherevent"+e.toString( ));
            return false;
    }
}
abstract void marqueeAction(boolean cnrl, Rectangle r, int x, int y);
abstract void drawDrag(Graphics g, int i, int j, int k, int l);
abstract void eraseDrag(Graphics g, int i, int j, int k, int l);
abstract void endDragAction (Graphics g, int i, int j, int k, int l);
abstract void containerPaint(Graphics g);
abstract void containerMouseMove(Evente);
abstract void containerKeyPress(Evente);
abstract void containerMouseDown(Evente);
abstract void containerMouseUp(Evente);
abstract void containerMouseDrag(Evente);
abstract void containerDoubleClick( );
abstract boolean mouseDownSelects(Evente);
abstract boolean mouseDownSelection(Evente);
abstract void mouseDownReset(Evente);
abstract boolean doMarquee( );
}
```

The palette in logical view 402, as shown in FIG. 5, is provided with a series of components that are instantiated from the component VJContainer. FIG. 5 illustrates the physical view or end user view screen portion in accordance with a preferred embodiment of the VJ Tool.

FIG. 5 also shows the physical view 500 of the VJ desktop. The logical view 402 is in the foreground on the right hand side of the drawing, while the physical view 500 is in the background on the left side of the screen. Physical view 500 is provided with palette containers 502 to 530 as follows: 502 is a select cursor button; 504 is a simple AWT label; 506 is a simple AWT text field; 508 is a simple AWT text area; 510 is a simple AWT button; 512 is a simple AWT checkbox; 514 is a simple AWT choice box; 516 is a simple AWT list; 518 is a simple AWT horizontal scroll bar; 520 is a simple AWT vertical scroll bar; 522 is a simple bar chart; 524 is a simple spreadsheet; 526 is a simple AWT panel; 528 is a calendar; and 530 is an animator.

Logical view 402 is provided with palette containers 540 to 572 as follows: 540 is a select cursor button; 542 is a VJ folder or container; 544 is an adder; 546 is a bicopy component. The bicopy component acts as a multiplexor so that whatever is input on one pin of a bicopy element is output on its other pins. 548 is a test for equals; 550 is a constant (e.g. −1 or 3.1457 or "abc"); 552 is a random number generator; 554 is a counter; 556 is an URL opener; 558 is a splitter used to connect input/output pins to components that are either input or output elements; 560 is a two-dimensional grapher; 562 is a three-dimensional grapher; 564 is a delta three-dimensional grapher; 566 is an URL text viewer; 570 forwards input from any one of an element's input pins to an outpin pin thereof; 572 is a calculator; and 574 is a sound player. AWT is the Abstract Windowing Toolkit and contains the objects utilized for providing basic windowing functions in accordance with a preferred embodiment.

The components of logical view 402 and physical view 500 can be dropped, respectively, from their palettes into the view they are associated with. Moving the cursor over any component causes a short description of that component to appear in the logical view.

FIG. 6 through 17 illustrate an example of a VJ Tool used to quickly, efficiently and accurately create an applet derived mini application that does not require the VJ Tool user to write a single line of code. Unlike other "visual" tools currently available, VJ Tool is a "point and click" and "drag and drop" development environment in which the components are all activate immediately. It is important to note that VJ Tool provides a "live" environment; that is, you can see modifications you make take hold or be applied as the component is utilized. The physical view results in corresponding changes in the logical view. If you eliminate a component from the physical view, it disappears as well from the logical page and if you change the properties of a component in the physical view, its associated component in the logical view reflects that change as it is made. The components initialization method occurs when the component is instantiated and the component immediately communicates with the other components previously defined for the physical and logical display.

The component's "liveness" refers to immediate activation of components as components are interactively added to the environment. The action of the components is analogous to a What You See Is What You Get (WYSIWIG) word processing environment in which immediate feedback of status and value information is available. So, for example, as a button is placed on the display, it is immediately available for connection to a player component to display text or activate a multimedia presentation.

"Liveness" and "live", as used in this description, are terms employed to illustrate how the present invention promotes and permits immediate socialization of new components, as they are instantiated or dropped into either the logical or physical views, with existing components. This is achieved, as depicted in the functional block diagram of FIG. 6A, by registering the component being instantiated with the VJ Kernel via block 620. Registration, in turn, invokes an initialization method in block 622 that appropriately personalizes the new component when it executes the logic associated with the initialization method, see block 624, which can include the provision of an editor for the new component if its properties are to editable. The new component can immediately communicate or socialize with other components previously defined in the logical and physical views as shown by block 626.

Liveness also indicates that the environment is tested as new components are instantiated. This means that immediate connections between components are permitted on the fly. There is no requirement that all possible connections are tried first to insure that nothing blows up. The outcome of this capability is that design creation and trial are integrated so that the results can be observed virtually at the same time that the interconnection of components is made. As noted later herein in connection with the description of FIG. 16, this is analogous to building a hardware prototype or test board by interconnecting, disconnecting and moving electronic components around the test board while the power is left on. As will be shown by the following example of Fahrenheit and Centigrade conversion, there is immediate feedback of component status and value information. This makes VJ Tool, in essence, a WYSIWIG development environment.

The specific example shown in various stages in FIGS. 6 through 14 depicts two scroll bars that have been adapted through use of VJ Tool to display conversions of Fahrenheit and Centigrade temperatures to each other on a dynamic basis. This applet has been created in the physical view and reflected in the logical view in accordance with a preferred embodiment of the present invention.

Figure 6:
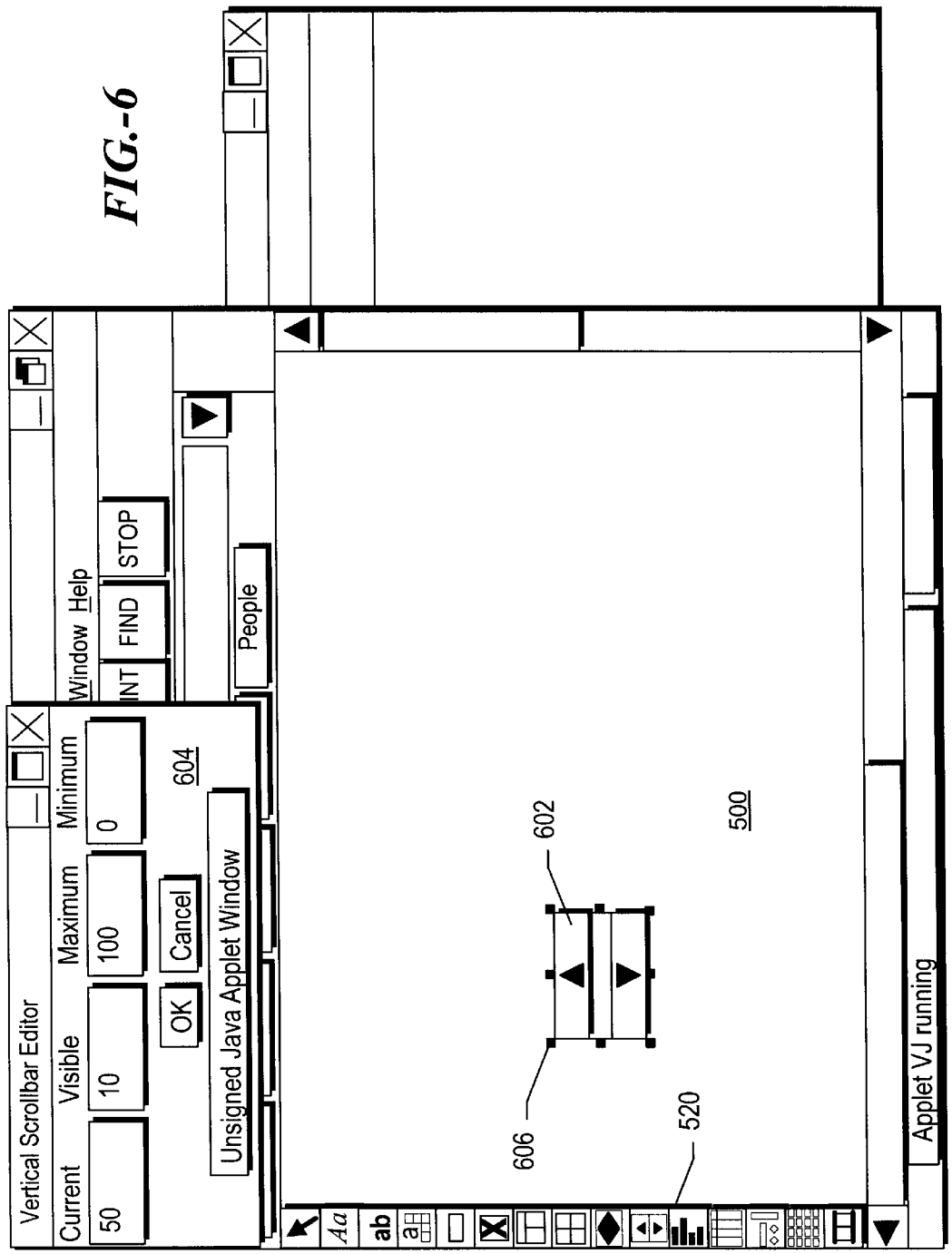
FIG. 6 shows the creation of a scrollbar which will be used to indicate Centigrade temperatures in an example of how the present invention can be utilized in accordance with a preferred embodiment.
Figure 6A:
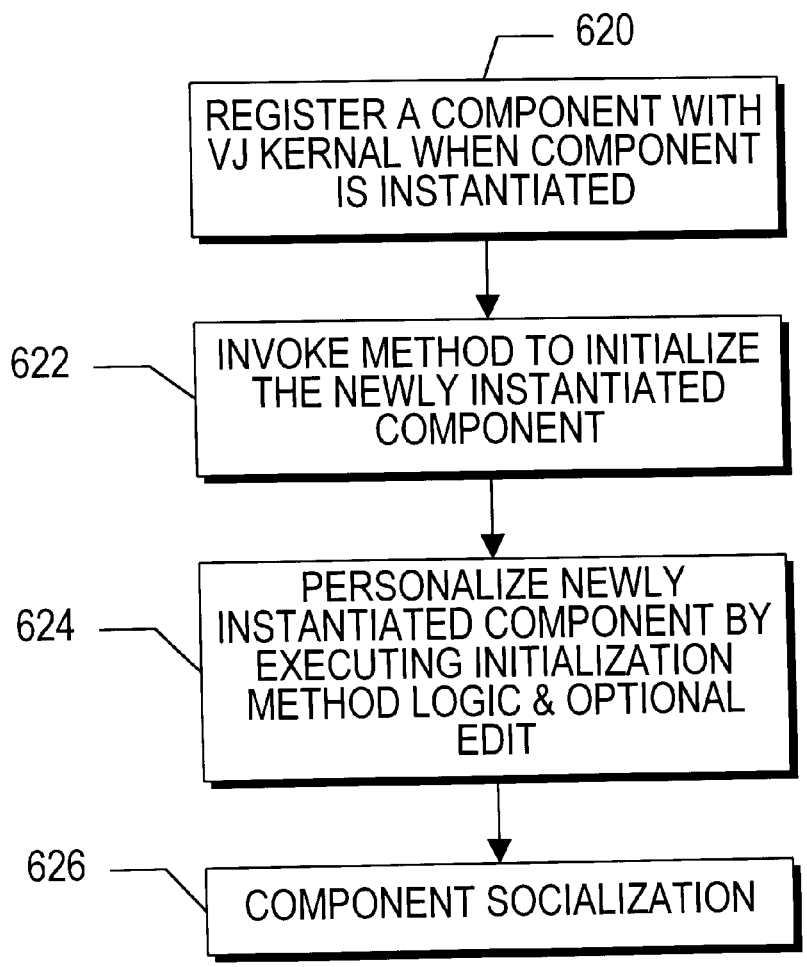

FIG. 6 shows the creation of a first scroll slider bar 602 which will be used to indicate Centigrade temperatures. This object has been instantiated by clicking on the vertical scroll bar component 520 and then dragging and dropping the object to its FIG. 6 position in the physical view 500. When scroll bar 602 is created, its editor, vertical scroll bar editor 604, pops up as a dialog box wherein the current, visible, maximum and minimum values of the scroll bar just crated are displayed and can be edited. As shown, scroll bar 602 has a current value of fifty, it is showing only ten units of its total range which varies from a maximum of one hundred (boiling point) to a minimum of zero (freezing point).

Figure 7:
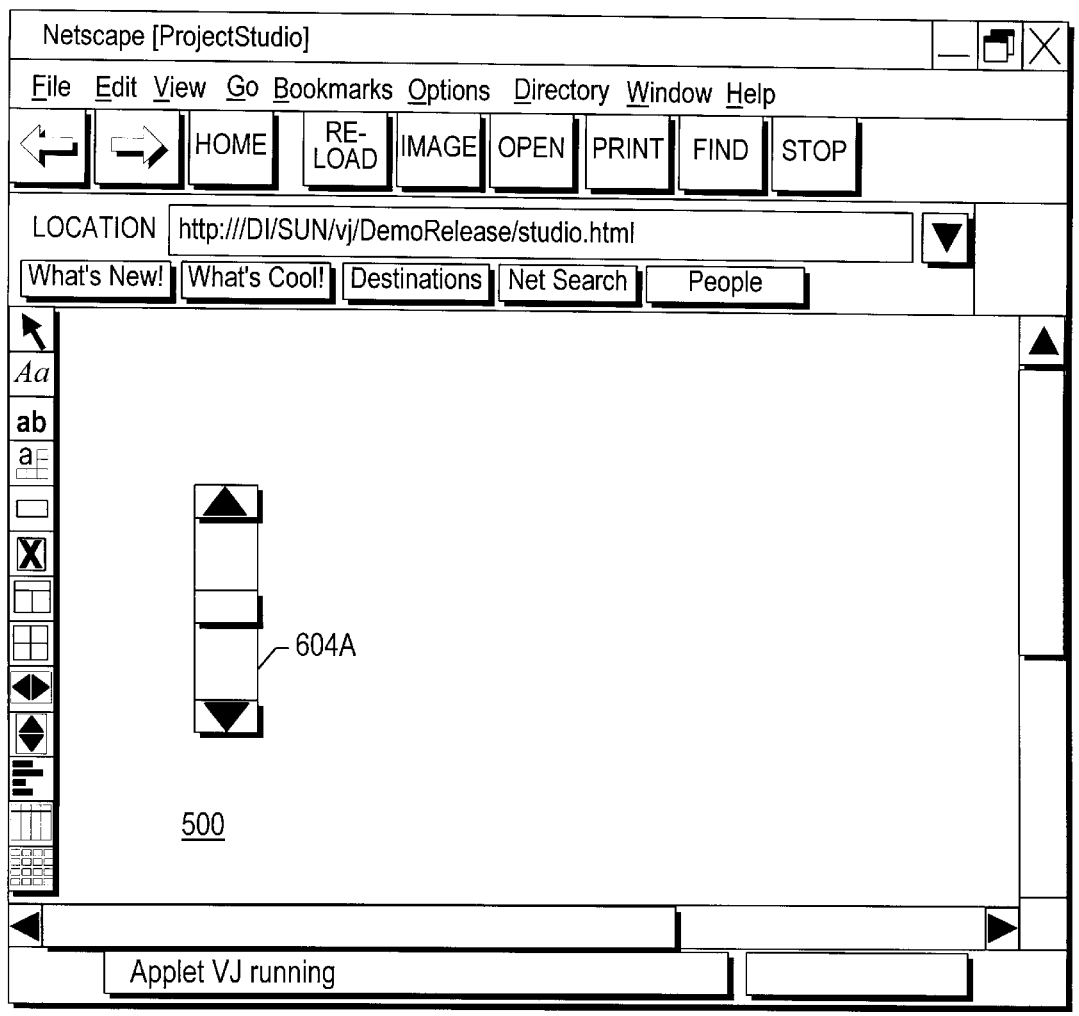
FIG. 7 visually describes an example of marqueing or sizing of a vertical scrolibar in accordance with a preferred embodiment.
Figure 8:
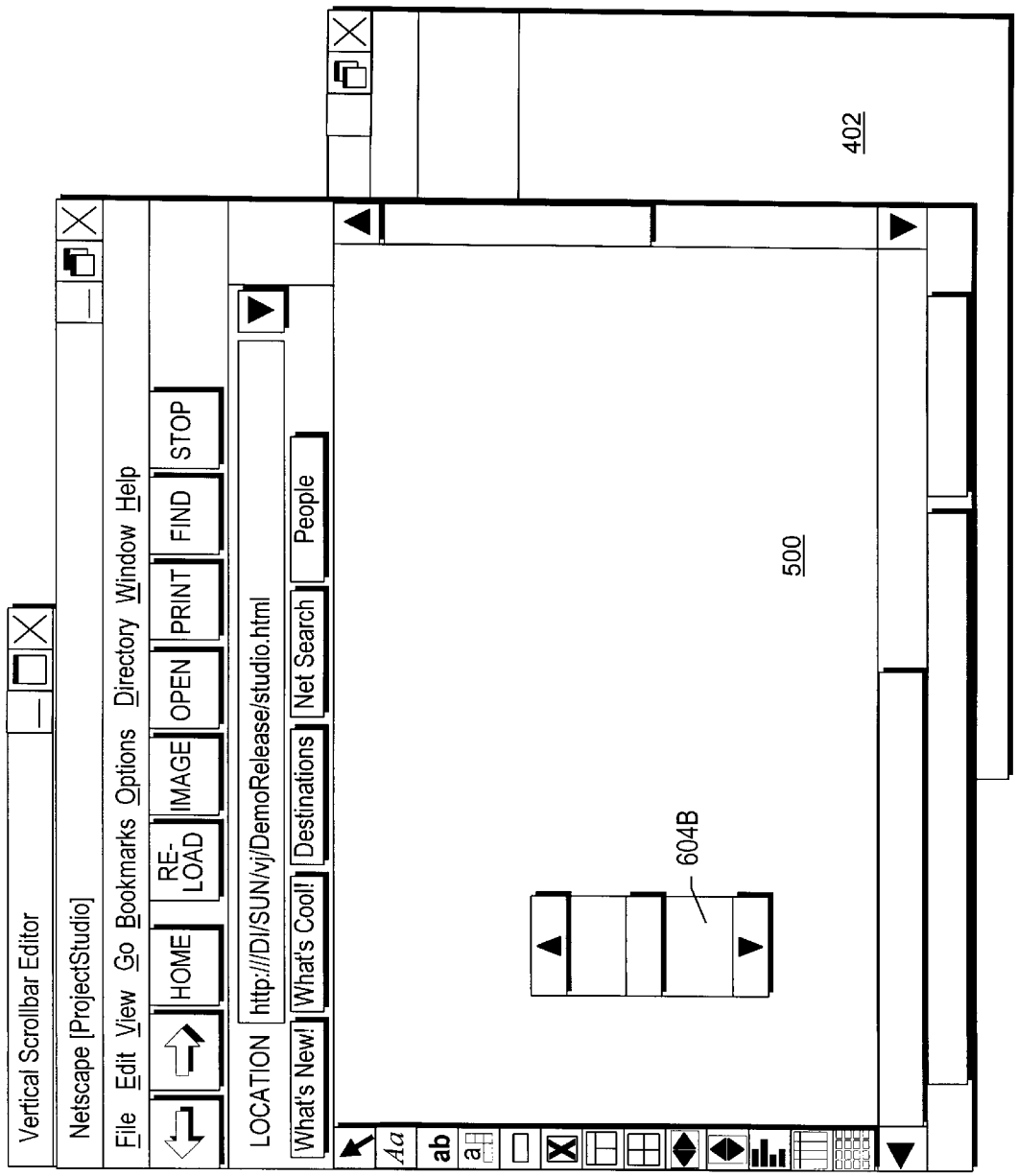
FIG. 8 depicts another example of marqueing or adjusting the size of a vertical scrollbar to a shorter, slightly wider, outline in accordance with a preferred embodiment.

FIG. 7 is an example of marqueing or sizing the vertical scrollbar in accordance with a preferred embodiment. This is done by using the mouse to drag the edges or handles 606, see FIG. 6, of scroll bar 604 until the desired scroll bar shape is achieved. The result of that action is shown in FIG. 7 where the original scroll bar has been lengthened and reduced in width to form scroll bar 604a. FIG. 8 illustrates another example of adjusting the size of the vertical scrollbar 604a to a shorter, slightly wider, outline 604b. The logical view 402 can be seen in FIG. 8, where it remains in the background, available for use as may be needed.

The source code for the VJScrollbar component is presented below.

```
import java. awt.*;
import java.util.*;
public class VJVScrollbar extends VJNode {
// Attributes of this component
public AWTVScrollbar bar;
static int instanceCount = 0;
vscrollbarEditor edit;
static Image normalImage;
static Image selectedImage;
final static String out = "out_vsb.gif";
final static String in = "in_vsb.gif";
final static String port0_info = "for setting/getting minimum value";
final static String port0_name = "Pin 0";
final static String port1_info = "for setting/getting maximum value";
final static String port1_name = "Pin 1";
final static String port2_info = "for setting/getting the current value";
final static String port2_name = "Pin 2";
final static String url_name = "hscrollbar.html";
final static String info_name = "A simple AWT horizontal scrollbar";
VJ vj;
int send_index0 = -1;
int request_index0 = 0;
int send_index1 = -1;
int request_index1 = 0;
int send_index2 = -1;
int request_index2 = 0;
// Constructor
public VJVScrollbar(VJ v){
        super(v);
        vj = v;
}
VJNode dup( ) {
    VJVScrollbarvj_comp = new VJVScrollbar(vj);
    try{
        int i = x+40;
        int j = y+40;
        AWTVScrollbar t = new AWTVScrollbar(vj_comp);
        vj_comp.bar = t;
t.setValues(bar.getValue( ), bar.getVisible( ), bar.getMinimum( ), bar.getMaxi
mum( ));
```

```
        vj_comp.setNormalIcon(out);
        vj_comp.setSelectedIcon(in);
        vj_comp.setName("VScrollbar");
        vj_comp.setComponent((Component)t);
        vj_comp.setComponentURL(url_name);
        vj_comp.setComponentInfo(info_name);
        vj_comp.VJNodeInit(false, i, j, true);
vj_comp.addPort(port0_info, port0_name, VJPort.InputOutput, VJPort.NorthLeftCenter); // Pin 0
vj_comp.addPort(port 1_info, port 1_name, VJPort.InputOutput, VJPort.NorthRightCenter); // Pin 1
vj_comp.addPort(port2_info, port2_name, VJPort.InputOutput, VJPort.SouthCenter); // Pin 1
        vj_comp.setXPt(0, getXPt(0)+40);
        vj_comp.setYPt(0, getYPt(0)+40);
        vj_comp.setXPt(1, getXPt(1)+40);
        vj_comp.setYPt(1, getYpt(1)+40);
        vj_comp.setXPt(2, getXPt(2)+40);
        vj_comp.setYpt(2, getYpt(2)+40);
        vj_comp.setImages(normalImage, selectedImage); // Pass references
to the static images down to the node
        vj_comp.nodeRect = new Rectangle(i-3, j-
3, selectedImage.getWidth(vj.theContainer.theDesktop.vp_3w)+3, selectedImage.getHeight(vj.theContainer.theDesktop.vp_w)+3);
        vj_comp.setSelected(true);
        vj.theDocument.add(vj_comp.comp);
        vj_comp.comp.validate( );
vj_comp.comp.reshape(comp.bounds( ).x+50, comp.bounds( ).y+50, comp.bounds( ).width,comp.bounds( ).height+1);
        vj_comp.comp.show( );
        return vj_comp;
    } catch(Exception e) {
        System.out.println(e);
        return null;
    }
}
public static void getImages(GIFFactoryf){
        normalImage = f.GetGIF(out);
        selectedImage = f.GetGIF(in);
}
// Component Initialization
public void VJVScrollbarInit(intx_pt, int y_pt) {
        try{
         String theText = new String("Vscrollbar
"+String.valueOf(instanceCount++));
        setNormalIcon(out);
        setSelectedIcon(in);
        bar = new AWTVScrollbar(this);
        setName(theText);
        setComponent((Component)bar);
        setComponentURL(url_name);
        setComponentInfo(info_name);
        VJNodeInit(false, x_pt, y_pt, true);
addPort(port0_info, port0_name, VJPort.InputOutput, VJPort.NorthLeftCenter); // Pin 0
addPort(port 1_info, port1_name, VJPort.InputOutput, VJPort.NorthRightCenter); // Pin 1
addPort(port2_info, port2_name, VJPort.InputOutput, VJPort.SouthCenter); // Pin 1
        setImages(normalImage,selectedImage); //Pass references to the
static images down to the node
        nodeRect = new Rectangle(x_pt-3, y_pt-
3, selectedImage.getWidth(vj.theContainer.theDesktop.vp_w)+3, selectedImage.getHeight(vj.theContainer.theDesktop.vp_w)+3);
    } catch(Exception e){
        System.out.println(e);
    }
}
public void request(int port, int time) { }
public int componentID( ) { return 3; }
public void disconnecting(int port) {
        switch(port){
            case 0:     request_index0= -1; send_index0 =-1;
                    break;
            case 1:     request_index1 = -1; send_index1 =-1;
                    break;
```

-continued

```
                case 2:     request_index2 = -1; send_index2 =-1;
                            break;
                }
        }
public void connecting(int port) {
        switch(port){
                case 0:     request_index0=0; send_index0 = 0;
                            vj.request(0, request_index0++, this);
                            break;
                case 1:     request_index1=0; send_index1 = 0;
                            vj.request(1, request_index1++, this);
                            break;
                case 2:     request_index1=0; send_index2 = 0;
                            vj.request(2, request_index2 ++, this);
                            break;
        }
}
        public void load(String s) {
                StringTokenizer tokenStream = new StringTokenizer(s);
                int max = Integer.valueOf(tokenStream.nextToken( )).intValue( );
                int min = Integer.valueOf(tokenstream.nextToken( )).intValue( );
                int value = Integer.valueOf(tokenStream.nextToken( )).intValue( );
                int visible = Integer.valueOf(tokenStream.nextToken( )).intValue( );
                bar.setValues(value, visible, min, max);
        }
        public String save( ) {
            int max = bar.getMaximum( );
            int min = bar.getMinimum( );
            int value = bar.getValue( );
            int visible = bar.getVisible( );
            return max+" "+min+" "+value+" "+visible; }
        public void set(Object o, int port, int time)
            int max, min, cur;
            boolean ok = false;
            max = bar.getMaximum( );
            min = bar.getMinimum( );
            cur = bar.getValue( );
            switch(port){
                    case 0:
                        if(time==0){
                            if(o instanceof String)
                                { min = Integer.valueOf((String)o).intValue( ); ok=true; }
                            if(o instanceof Integer) { min=((Integer)o).intValue( ); ok=true; }
                            if(o instanceof Double) { min=((Double)o).intValue( ); ok=true; }
                            if(o instanceof Long) { min=((Long)o)intValue( ); ok=true;
}
                            if(o instanceof Float) { min=((Float)o).intValue( ); ok=true; }
                        }
                        break;
                    case 1:
                        if(time==0){
                            if(o instanceof String)
                                { max = integer.valueOf((String)o).intValue( ); ok=true;; }
                            if(o instanceof Integer) { max=((Integer)o).intValue( ); ok=true; }
                            if(o instanceof Double) { max=((Double)o).intValue( ); ok=true; }
                            if(o instanceof Long) { max=((Long)o).intValue( ); ok=true;
}
                            if(o instanceof Float) { max=((Float)o).intValue( ); ok=true;
}
                        }
                        break;
                    default:
                        if(o instanceof String)
                            { cur = Integer.valueOf((String) o).intValue ( ); ok=true; }
                        if(o instanceof Integer) { cur=((Integer)o).intValue( );
```

-continued

```
ok=true; }
                                    if(o instanceof Double) { cur=((Double)o).intValue( );
ok=true; }
                                    if(o instanceof Long) { cur=((Long)o).intValue( ); ok=true; }
                                    if(o instanceof Float) { cur=((Float) o).intValue( ); ok=true; }
                                    if(ok) vj.request(2, request_index2++, this);
                                    break;
            }
            ok = false;
            bar.setValues(cur, bar.getVisible( ) , min, max);
        }
        public boolean handleEvent(Event e) {
            if(send_index2 >=O&&e.id<606&&e.id>600)vj.set((Object)(new
Integer(bar.getValue( ))), 2, send_index2++, this);
            return false;
        }
public void propertiesEditor( ) {
    if(edit==null){
        edit = new vscrollbarEditor((Frame)(vj.theFrame), this);
        edit.pack( );
        edit.resize(10*32, 5*32);
        edit.show( );
    }
}
public void init( ){ };
public void start( ){ };
public void stop( ){ };
public void destroy( ){ };
public void reset( ){ }
        request_index0=0; vj.request(0, request_index0++, this);
};
} // end class
class vscrollbarEditor extends Frame
{
    VJVScrollbar vjsb;
    TextField max;
    TextField min;
    TextField visible;
    TextField current;
    Button ok;
    Button cancel;
    boolean dirty false;
        public vscrollbarEditor (Frame parent, VJVScrollbar c)
        {
                super("Vertical Scrollbar Editor");
            setBackground(Color.lightGray);
                setLayout(new BorderLayout( ));
        Panel p = new Panel( );
        vjsb = c;
        //p.setLayout(new BorderLayout( ));
    Panel centerPanel = new Panel( );
                p.add(new Button("OK"));
                p.add(new Button("Cancel"));
        add("South", p);
        dirty = false;
            centerPanel.setLayout(newGridLayout(2, 4));
            centerPanel.add(newLabel("Current"));
            centerPanel.add(new Label("Visible"));
            centerPanel.add(new Label("Maximum"));
            centerPanel.add(newLabel("Minimum"));
        current = new TextField(String.valueOf(vjsb.bar.getValue( )));
        visible = new TextField(String.valueOf(vjsb.bar.getVisible( )));
        max = new TextField(String.valueOf(vjsb.bar.getMaximum( )));
        min = new TextField(String.valueOf(vjsb.bar.getMinimum( )));
        centerPanel.add(current);
        centerPanel.add(visible);
        centerPanel.add(max);
        centerPanel.add(min);
            add("Center", centerPanel);
        }
    public boolean handleEvent(Event evt)
    {
            switch(evt.id){
                case Event.ACTION_EVENT:
                {
                    if("OK".equals(evt.arg))
                    {   vjsb.edit = null;
vjsb.bar.setValues(Integer.valueOf(current.getText( )).intValue( ),
Integer.valueOf(visible.getText( )).intValue( ),
```

-continued

```
                    Integer.valueOf(min.getText( )).intValue( ),
                    Integer.valueOf(max.getText( )).intValue( ));
            dispose( );
            return true;
                }
        if("Cancel".equals(evt. arg))
        {   vjsb.edit = null;
            dispose( );
            return true;
        }
        return false;
            }
            default:
                    return false;
        }
    }
}
```

Figure 9:
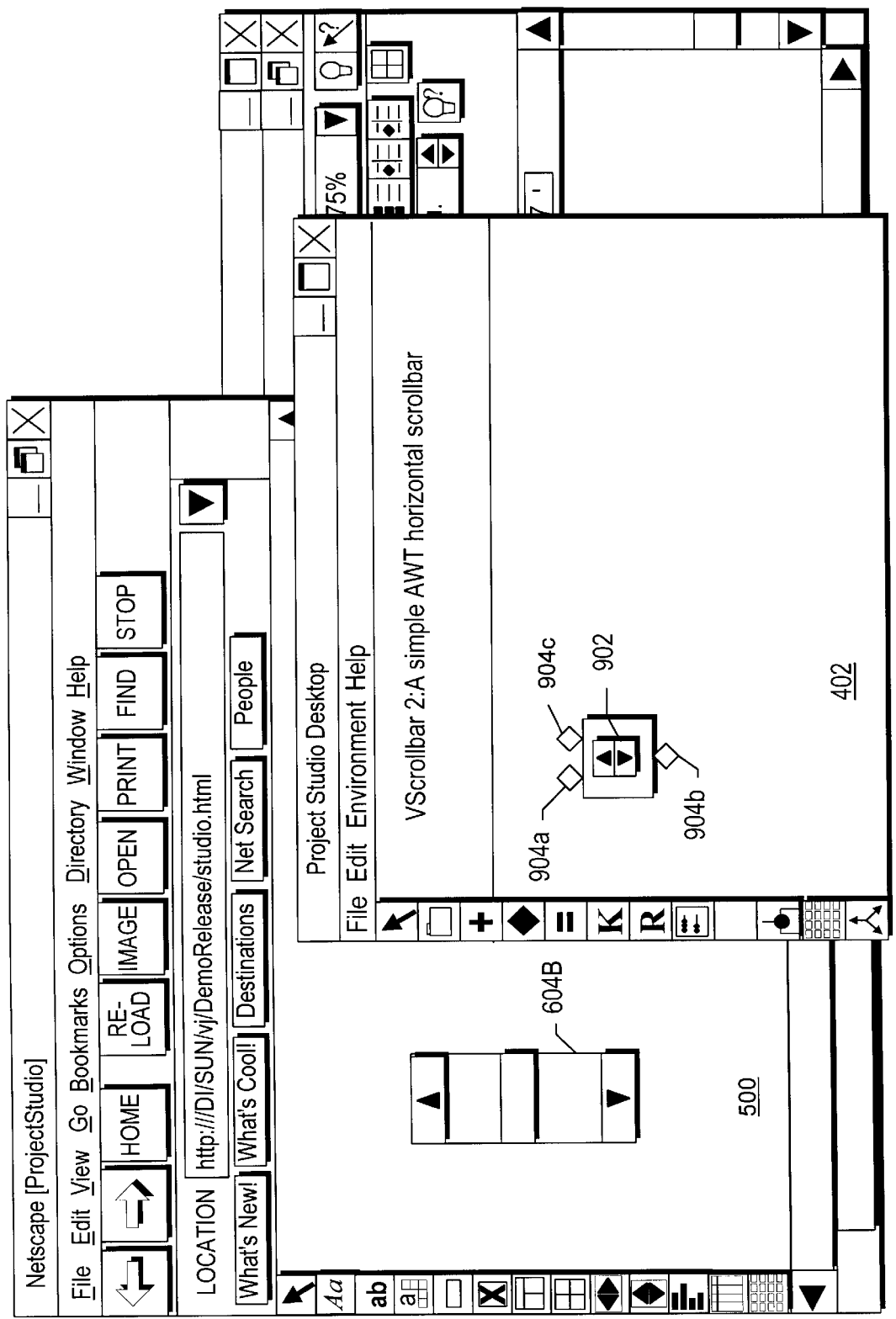
FIG. 9 illustrates an example of a scrollbar object matching the same object in FIG. 8, but created in the logical view in accordance with a preferred embodiment.

FIG. 9 depicts an example of a VJScrollbar object 604b in the logical view 500. The physical view 402 illustrates a simple AWT horizontal scrollbar 902 having diamond shaped I/O pins or ports 904. The diamond shape indicates that the I/O pin is bi-directional or two way in operational nature; that is, they accept inputs or transmit outputs, as they are utilized. The I/O pins can be shaped like a triangle, rather than a diamond. If they are diamond shaped, then those I/O pins will handle an output or an input depending on the direction in which they point. I/O pins 904, which are sometimes referred to as "net pins", can be coded as follows:

```
import java.awt.*;
public class VJNetPin extends VJNode {
// Attributes of this component
static int instanceCount = 0;
static Image normalImage;
static Image selectedImage;
final static String out    = "out_np.gif";
final static String in     = "in_np.gif";
final static String port0_info = "input or output and object";
final static String port0_name = "Pin 0";
final static String url_name = "netpin.html";
final static String info_name = "Connects components inside a
container to a pin of the container";
VJ vj;
netpinEditor edit=null;
VjContainer theContainer;
        boolean connected = false;
        boolean requested = false;
        int theLocation;
        int requestTime = 0;
        int theConnection = -1;
// Constructor
public VJNetPin(VJ v){
    super(v);
    vj = v;
}
VJNode dup( ) {
    return null;
}
public static void getImages(GIFFactory f){
        normalImage = f.GetGIF(out);
        selectedImage = f.GetGIF(in);
}
public void setContainer(VJContainer c) {
    theContainer = c;
}
public void setConnection(int c) {
    theConnection = c;
}
// Component Initiaiization
public void VJNetPinInit(intx_pt, int y_pt) {
    try{
        setNormalIcon(out);
        setSelectedIcon(in);
        setName("VJNetPin");
        setComponent(null);
        setComponentURL(url_name);
```

-continued

```
            setComponentInfo(info_name);
            VJNodeInit(false, x_pt, y_pt, false);
addport(port0_info, port0_name, VJPort.InputOutput, VJPort.SouthCenter); // Pin 0
            setImages(normalImage,selectedImage); //Pass references to the
static images down to the node
            nodeRect = new Rectangle(x_pt-3, y_pt-
3, selectedImage.getWidth(vj.theContainer.theDesktop.vp_w)+3, selectedImage.getHeight(vj.theContainer.theDesktop.vp_w)+3);
        } catch(Exception e) {
        System.out.println(e);
        }
    }
}
public int componentID( ) { return 6; }
public void disconnecting(int port) {
            connected = false;
}
public void connecting(int port) {
        connected = true;
        if(requested) {
          vj.request(0, requestTime, this);
          requested = false;
        }
}
public void load(String s) {
}
public String save( ) {
        return" "; }
public void reset( ) { }
public void request(int port, int time) {
            // what if theConnection <0?
            theContainer.requestOUT(theConnection, time);
}
public void requestIN(int time) {
        if(connected)vj.request(0, time, this);
        else { requestTime = time; requested = true; }
}
public void set(Object o, int port, int time) {
        if(theConnection>=0)
            theContainer.setOUT(o, theConnection, time);
        //vj.request(0, request_index0++, this);
}
public void setIN(Object o, int time) {
            vj.set(o, 0, time, this);
}
public void propertiesEditor( ) {
                if(edit==null){
                    edit = new netpinEditor((Frame)(vj.theFrame), this);
                    edit.pack( );
                    edit.show( );
                }
}
public void init( ){ };
public void start( ){ };
public void stop( ){ };
public void destroy( ){ };
}
class netpinEditor extends Frame
{
    VJNetPin vjc;
    TextField tf;
    Button b;
    Button cancel;
        public netpinEditor(Frame parent, VJNetPin c)
        {
        super("Pin Editor");
            setLayout(new BorderLayout( ));
            add("North", new Label("Select a pin"));
            vjc = c;
            tf = new TextField(new Integer(vjc.theLocation).toString( ));
            add("Center", tf);
            b = new Button("OK");
            cancel = new Button("Cancel");
            Panel sp = new Panel( );
            sp.add(b);
             sp.add(cancel);
             add("South", sp);
    }
```

-continued

```
    public boolean handleEvent(Event evt)
    {           // system.out.prinfln(evt.toString( ));
            switch(evt.id){
                case Event.ACTION_EVENT:
                {
                    if("OK".equals(evt.arg))
                    {
                    vjc.theLocation =
(Integer.valueOf(tf.getText( ))).intValue( );
                    //vjc.theContainer.addNewPort(vj c , "fred", "jim");
                    vjc.edit = null;
                            dispose( );
                            return true;
                    }
                if("Cancel".equals(evt.arg))
                {    vjc.edit = null;
                    dispose( );
                    return true;
            }
            return false;
            }
            default:
                    return false;
        }
    }
}
```

Figure 10:
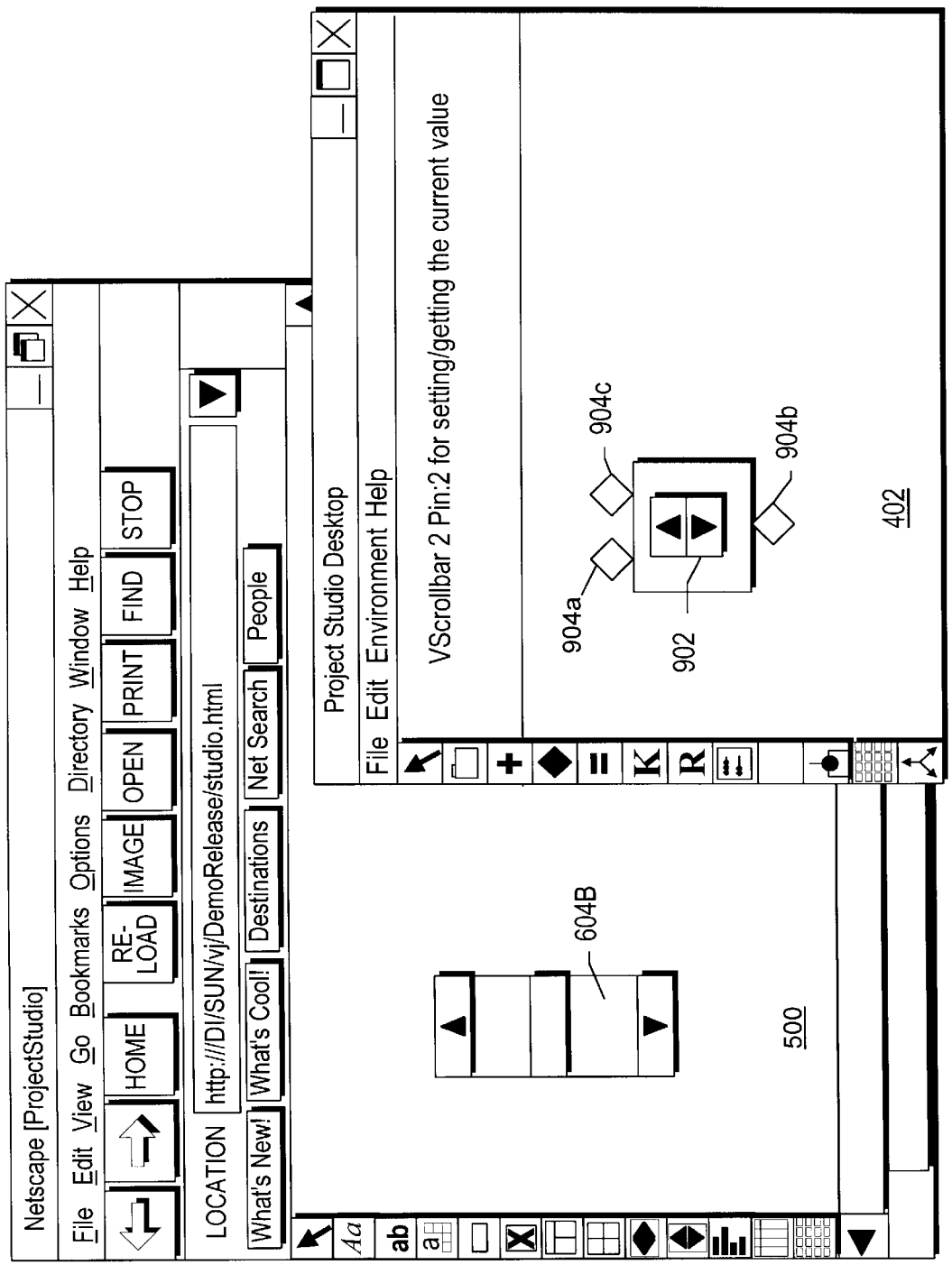
FIG. 10 shows the two pin value setting and getting capability of the scrollbar of FIG. 8 in accordance with a preferred embodiment.

FIG. 10 shows the two pin capability of scrollbar 604b. Note that each of the pins 902 and 904 are diamond shaped or two way ports. If a value if placed on these ports, it sets the scrollbar to that level. Conversely, if a value is taken from one of these ports, it reflects the position of scrollbar 604b.

In practice, the two way or bidirectional ports are first initialized to their two way state. The ports can then function either as an input port or as an output port depending solely on the way they are used. Each bidirectional port is provided with bidirectional capabilty by having a send message method defined for all outgoing transactions and a receive message method defined for all incoming transactions in the component for each bidirectional port. Thus, the method corresponding to the direction is invoked based on the flow of the message through the port.

For example, if inputs are connected to the two-way ports 904a or 904b in FIG. 10, they would function as input ports. Two-way port 906 would then function as the output port since it is the only port left that could serve in that role. In the preferred arrangement, components set themselves internally to reflect the status of each of their bidirectional ports, in accordance with the way they are being used. The bidirectional ports permit greater connective flexibility and save screen real estate as well.

When a connection to another component is completed, the connecting component sends a message to the component at the other end of the connection indicating how its connecting port is set, input or output. The message receiving component then makes sure that its connection participating port is set accordingly. If the message receiving component's port is bidirectional, the port is set opposite to the status of the first connected port. If the message receiving component's connecting port is bidirectional, that port is set opposite to the status of the first connected port. If the message receiving component's port is unidirectional and as such is in conflict with the status of the first connected port, that is, it is set to "output" when the first connected port is also set to "output", the connection is prohibited and an appropriate error message is displayed.

Figure 11:
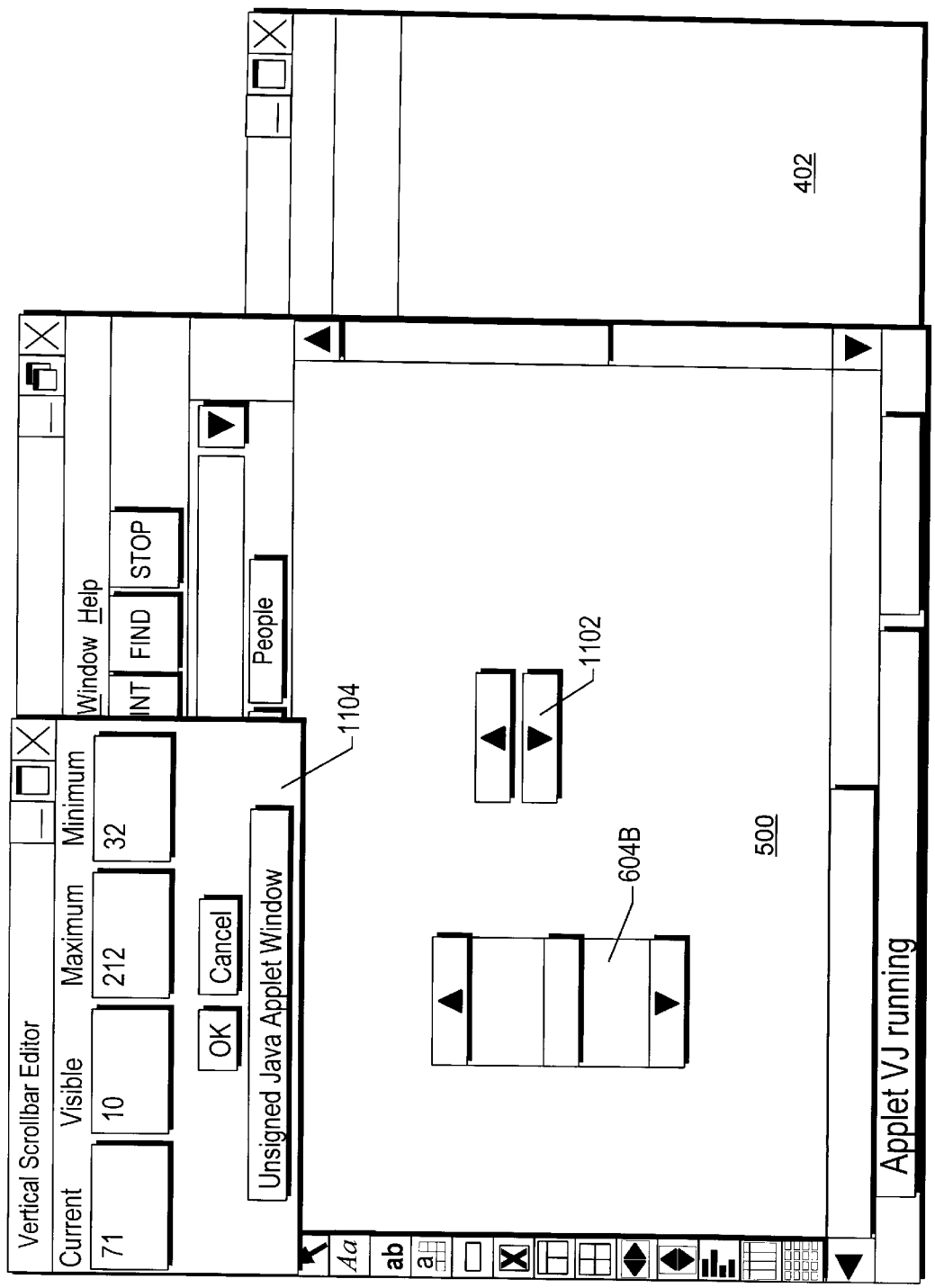
FIG. 11 illustrates the addition of a second vertical scrollbar that will be set to track the range of the Fahrenheit temperature scale in accordance with a preferred embodiment.

FIG. 11 illustrates the addition of a second vertical scrollbar that will be set to track the range of the Fahrenheit temperature scale. Note that the vertical scrollbar editor 1104 has been adjusted to set scrollbar 1102 to a maximum value of 212 (boiling point) and a minimum value of 32 (freezing point). Prior to being adjusted, scrollbar 1102 has a current value of 71 with only 10 units of its total range actually visible.

Dynamic editing is accomplished by providing each component that would have need of an editor with that capability as an integral part of the class template from which it is instantiated. Each customizer window or editor is defined in predetermined class templates as a method corresponding to the customizer method.

Thus, when such edit capable components are instantiated in either the logical view 402 or the physical view 500, their built-in customizer or edit widow 1104 is invoked, see FIG. 11, and opens automatically. The editor appears in the view ready for use to change or customize the properties of the component, in this case scrolibar 604b, based on user interaction with the customizer or editing window 1104.

Figure 11A:
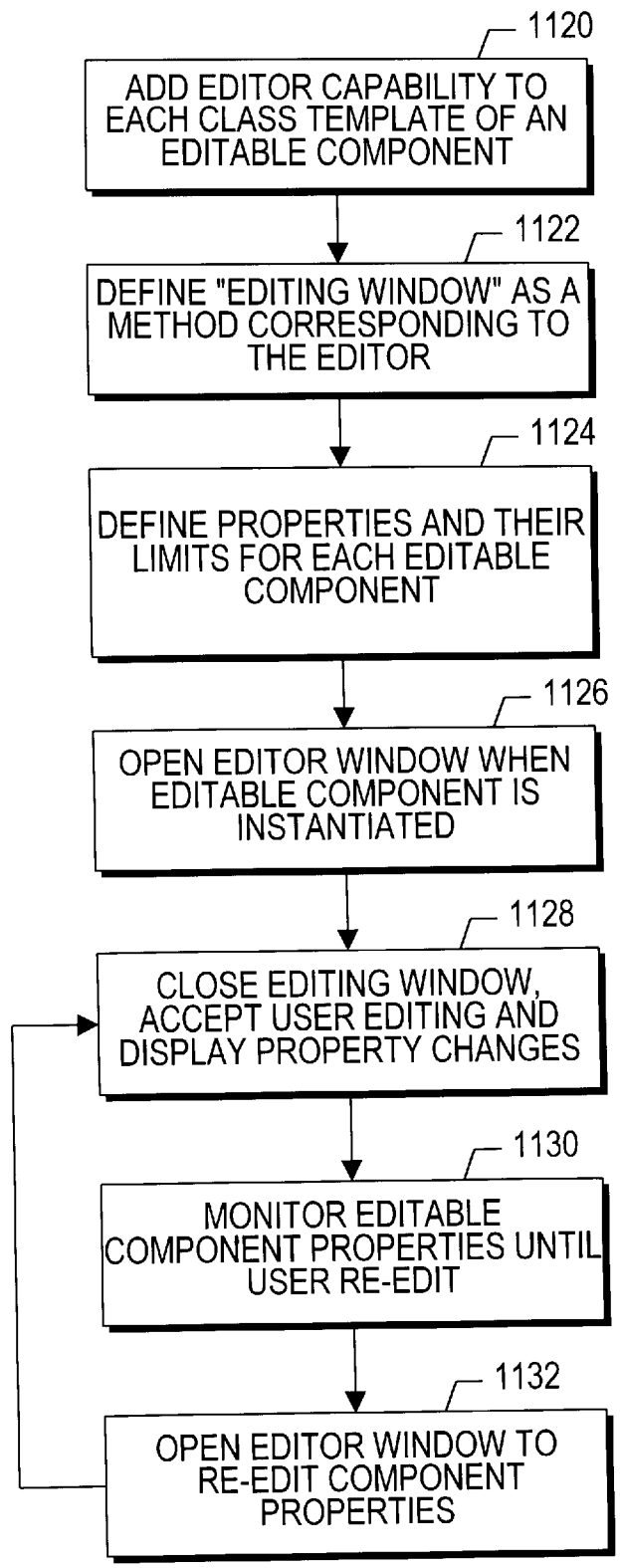
FIG. 11A is a flowchart of the detailed logic of the editor component in accordance with a preferred embodiment.

As shown in the flowchart of FIG. 11A, editor capability is added at block 1120 to each class template for which an editing capability is desired in component objects instantiated therefrom. An editing window, as indicated by block 1122 is defined as a method corresponding to the editor. The properties and their limits are also defined for each component editor as shown by block 1124. An editing window is opened by block 1126 when the component with which it is associated is dragged and dropped or instantiated for use.

After the user finishes editing the component's properties and clicks "OK", the editing window is closed and the property changes are accepted and displayed immediately in the appropriate view by block 1128. After property editing is completed, the editable components are monitored for a user action (usually a mouse click) which indicates that property re-editing is desired for a specific component, as per block 1130. When that occurs, block 1132 opens the editor widow 1104 again to permit component property changes to be made. Thereafter, control is returned to block 1128 and the user re-editing changes are accepted. Finally, monitoring of the editable components resumes as per block 1130.

Figure 15:
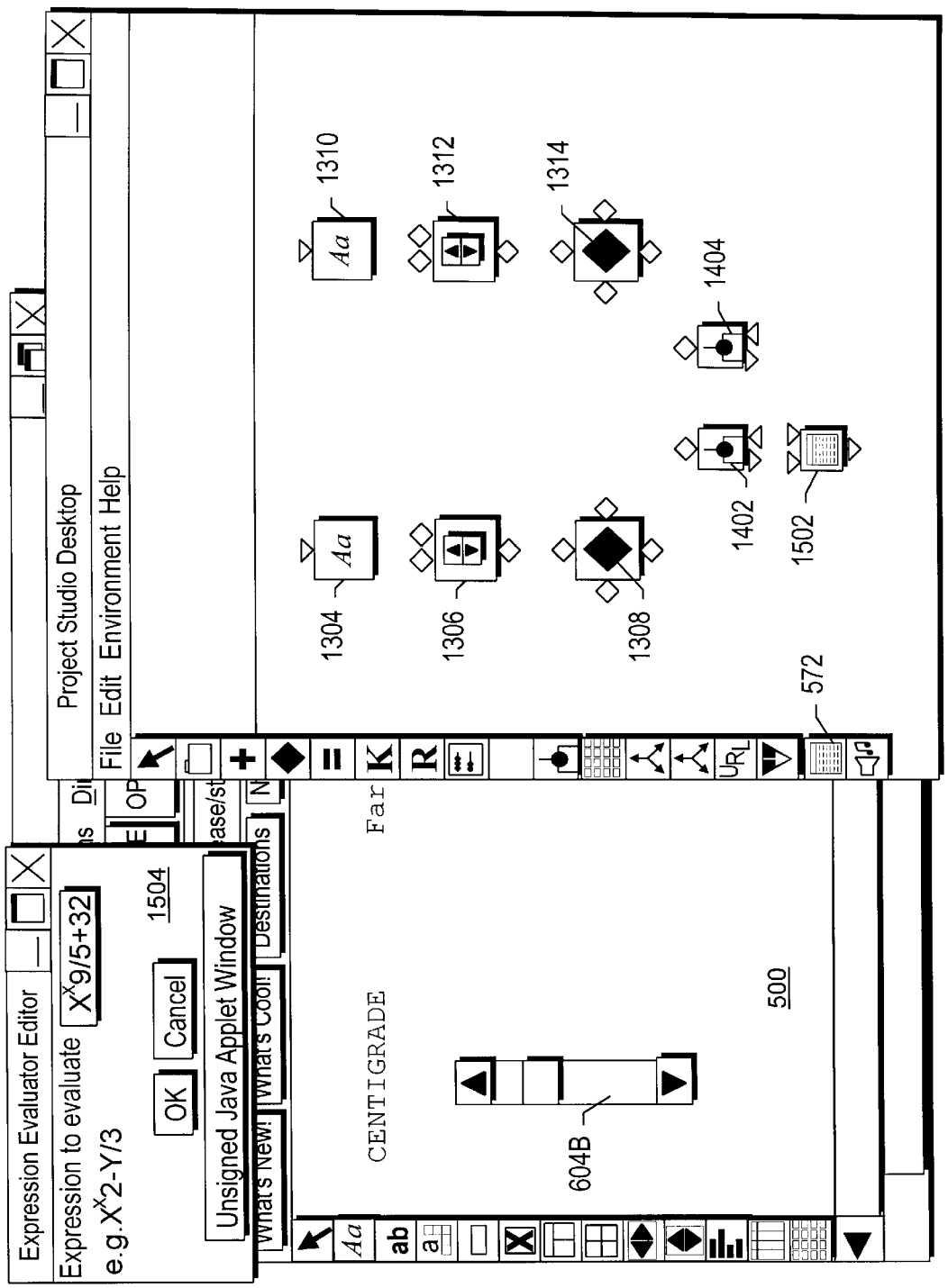
FIG. 15 shows the addition of a calculator object to the logical view in accordance with a preferred embodiment.

It is important to note that the user is not required to take any action to invoke an editor or be concerned about the suitability or appropriateness of the editor with respect to the component being customized. Moreover, the editor is customized for the specific component with which it is associated. If an editor appears when a component is instantiated, then the user instantaneously knows that that particular component is customizable. In addition, the user sees and knows just which properties of the component are editable and to what limits. Further, the user can make any desired customizing changes without having to write any code to implement those changes. Other uses of a component editor are shown in FIGS. 12 and 15.

Figure 12:
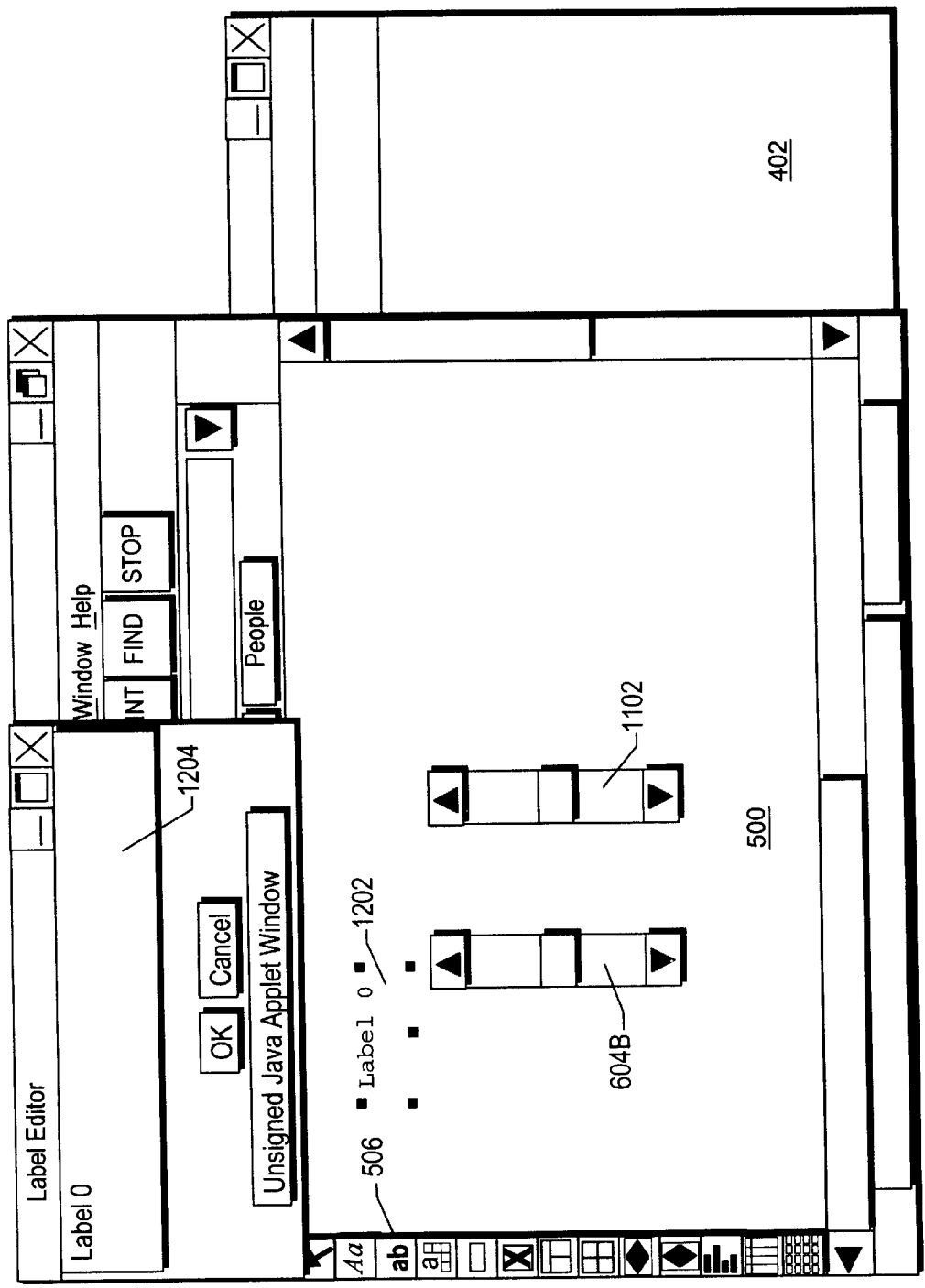
FIG. 12 depicts how label text is added to the scrollbars of FIG. 11 to label the scrollbar in accordance with a preferred embodiment.

FIG. 12 shows how VJ Tool is utilized to add text to scrollbars 604*b* and 1102 so that the function they perform or represent can be labeled and thereby identified to any user. First, the simple text field component 506 is invoked by clicking on its icon and dragging it onto the physical view 500. The text field representation 1202 can then be dropped at any desired location and, as desired, sized to match the element it will identify, in this case scrollbar 604*b*. The text field or label editor 1204 is then used to generate the actual text or scrollbar label.

The label text field component is coded as follows:

```
The label text field component is coded as follows:
import java.awt.*;
import java.util.*;
public class VJLabel extends VJNode {
// Attributes of this component
public AWTLabel label;
static int instanceCount = 0;
labelEditor edit;
static Image normalImage;
static Image selectedImage;
final static String out = "out_la.gif";
final static String in = "in_la.gif";
final static String port0_info = "for setting the text";
final static String port0_name = "Pin 0";
final static String url_name = "label.html";
final static String info_name = "A simple AWT label";
VJ vj;
int send_index=0;
int request0_index=0;
// Constructor
public VJLabel(VJ v){
      super(v);
      vj = v;
}
VJNode dup( ) {
      VJLabel vj_comp = new VJLabel(vj);
      try {
            int i = x+40;
            int j = y+40;
            AWTLabel 1 = new AWTLabel(label.getText( ),vj_comp);
            vj_comp.label = 1;
            vj_comp.setNormalIcon(out);
            vj_comp.setSelectedIcon(in);
            vj_comp.setName(label.getText( ));
            vj_comp.setComponent((Component)1);
            vj_comp.setComponentURL(url_name);
            vj_comp.setComponentInfo(info_name);
            nj_comp.VJNodeInit(false,i,j,true);
vj_comp.addPort(port0_info, port0_name, VJPort.Input, VJPort.NorthCenter); // Pin 0
            vj_comp.setXPt(0, getXPt(0)+40);
            vj_comp.setYPt(0, getYPt(0)+40);
            vj_comp.setImages(normalImage, selectedImage); //Pass references to the static images down to the node
            vj_comp.nodeRect = new Rectangle(i-3, j-
3, selectedImage.getWidth(vj.theContainer.theDesktop.vp_w)+3, selecte
dImage.getHeight(vj.theContainer.theDesktop.vp_w)+3);
            vj_comp.setSelected(true);
            vj.theDocument.add(vj_comp.comp);
            vj_comp.comp.validate( );
vj_comp.comp.reshape(comp.bounds( ).x+50, comp.bounds( ).y+50, comp
.bounds( ).width, comp.bounds( ).height);
            vj_comp.show( );
            return vj_comp;
      }   catch(Exception e) {
            System.out.println(e);
            return null;
      }
}
public static void getImages(GIFFactory f){
            normalImage = f.GetGIF(out);
            selectedImage = f.GetGIF(in);
```

-continued

```
}
// Component Initialization
public void VJLabelInit(int x_pt, int y_pt) {
    try {
        String theText = new String("Label "+String.valueOf(instanceCount++));
        label = new AWTLabel(theText, this);
        label.setFont(new Font("Counter", Font.PLAIN, 14));
        setNormalIcon(out);
        setSelectedIcon(in);
        setName(theText);
        setComponent((Component)label);
        setComponentURL(url_name);
        setComponentInfo(info_name);
        VJNodeInit(false, x_pt, y_pt, true);
        addPort(port0_info, port0_name, VJPort.Input, VJPort.NorthCenter);
// Pin 0
        setImages(normalImage, selectedImage); //Pass references to the static images down to the node
        nodeRect = new Rectangle(x_pt-3, y_pt-3, selectedImage.getWidth(vj.theContainer.theDesktop.vp_w)+3, selectedImage.getHeight(vj.theContainer.theDesktop.vp_w)+3);
    } catch(Exception e) {
        System.out.println(e);
    }
}
public void request(int port, int time) { }
    public int componentID( ) { return 2; }
    public void load(String s) {
    }
    public String save( ) {
        return " "; }
    public void disconnecting(int port) {
        switch(port){
            case 0: request0_index= -1;
                break;
        }
    }
    public void connecting(int port) {
        switch(port){
            case 0: request0_index=0;
                vj.request(0, request0_index++, this);
                break;
        }
}
    public void set(Object o, int port, int time) {
        boolean ok = false;
        if(o instanceof Color) { label.setForeground((Color)o); ok=true; }
        if(o instanceof String) { label.setText((String)o); ok = true;}
        if(o instanceof Long) {
label.setText((String)(((Long)o).toString( ))); ok = true;}
        if(o instanceof Double) {
label.setText((String)(((Double)o).toString( ))); ok = true;}
        if(o instanceof Float) {
label.setText((String)(((Float)o).toString( ))); ok = true;}
        if(o instanceof Integer) {
label.setText((String)(((Integer)o).toString( ))); ok = true;}
        if(o instanceof Boolean) {
label.setText((String)(((Boolean)o).toString( ))); ok = true; }
        if(ok) {
            //System.out.println(name + " has input at "+ String.valueOf(time)+" = "+ getText( ));
            if(time<199) vj.request(0, request0_index++, this);
        }
        ok = false;
    }
    public boolean handleEvent(Event e) {
        return false;
    }
}
public void propertiesEditor( ) {
    if(edit==null){
        edit = new labelEditor((Frame)(vj.theFrame), this);
        edit.pack( );
        //edit.resize(12*32, 6*32);
        edit.show( );
    }
}
public void init( ){ };
public void start( ){ };
```

```
public void stop( ){ };
public void destroy( ){ };
} // end class VJLabel
class labelEditor extends Frame
{
        VJLabel vjl;
        TextField tf;
        Button ok;
        Button cancel;
        boolean dirty;
            public labelEditor (Frame parent, VJLabel 1)
            {
                    super("Label Editor");
                    setLayout(new BorderLayout( ));
                    vjl = 1;
                    tf = new TextField(vjl.label.getText( ));
            add("Center", tf);
            ok = new Button("OK");
            cancel = new Button("Cancel");
            Panel sp = new Panel( );
            sp.add(ok);
             sp.add(cancel);
             add("South", sp);
        }
        public boolean handleEvent(Event evt)
        {      // System.out.println(evt.toString( ));
            switch(evt.id){
                case Event.ACTION_EVENT:
                {
                    if("OK".equals(evt.arg))
                        {
                    vjl.label.setText(tf.getText( ));
                    vjl.edit = null;
                            dispose( );
                            return true;
                        }
                if("Cancel".equals(evt.arg))
                {    vjl.edit = null;
                    dispose( );
                    return true;
                }
                return false;
                    }
                    default:
                        return false;
            }
        }
}
```

Figure 13:
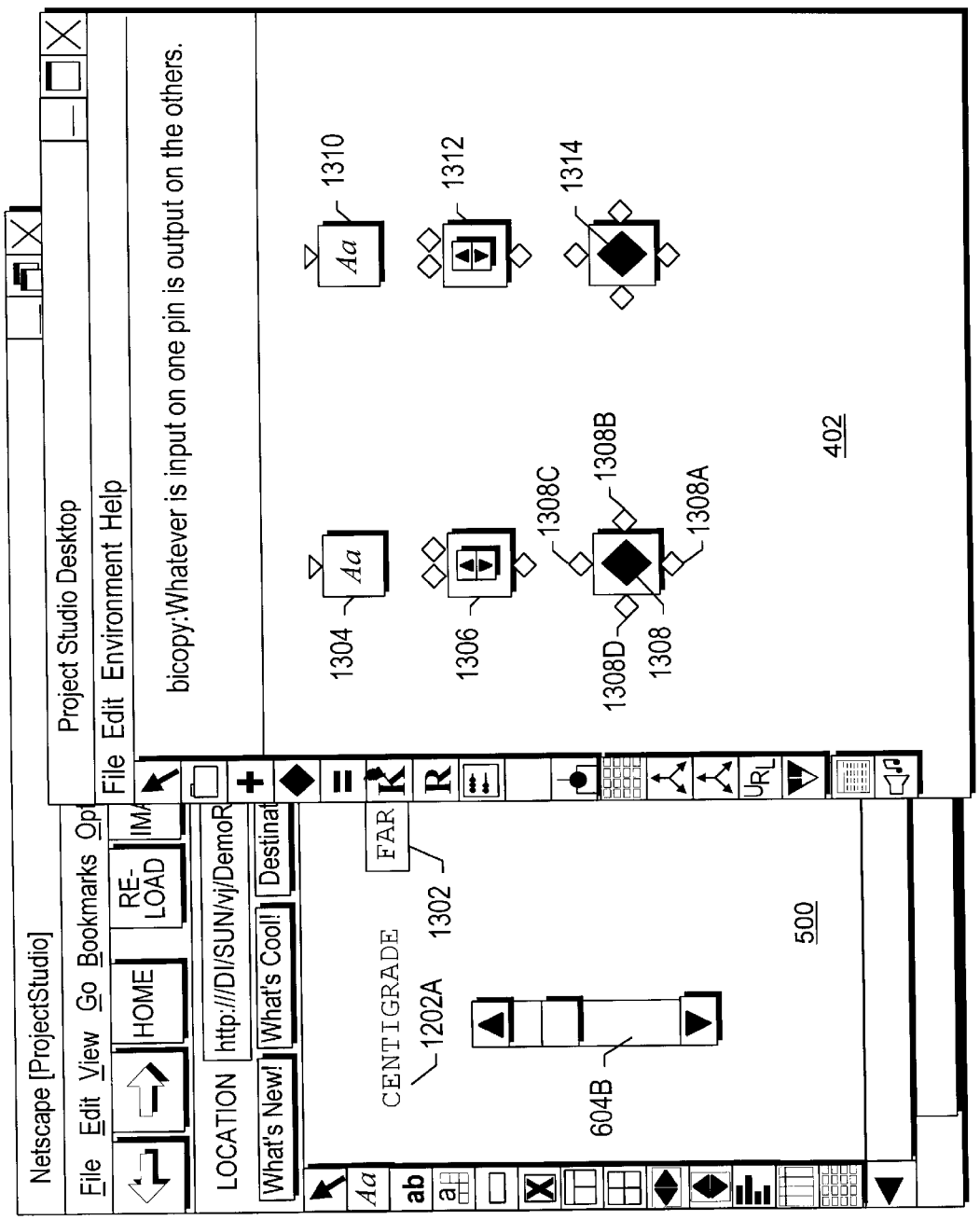
FIG. 13 shows how text from a label editor has been placed as a label above the first scrollbar of FIG. 11 in accordance with a preferred embodiment.

As shown in FIG. 13, text field 1202 has been made into the "CENTIGRADE" label 1202a above scrollbar 604b through use of the text field editor 1204. Label "FAHRENHEIT" 1302 has been generated in the same manner and positioned above scrollbar 1102 (not shown in FIG. 13).

It should be noted that several of the components described herein, vertical scrollbars 604a and 604b and text field 1202 label editor, are provided with their own editors, vertical scrollbar editor 604 and label editor 1204, which permits the predefined properties of the associated components to be directly and dynamically edited. Such editing takes place without the user having to exit VJ Tool or having to write any code to support the desired editorial changes.

FIG. 13 also illustrates in logical view 402, representations of scrollbars, text and bicopy objects that will be used to functionally link scrollbars 604b and 1102. Objects 1306 and 1312 logically represent scroll bars 604b and 1102 while label objects 1304 and 1310 represent the labels 1202a and 1302 respectively. Bicopy is a backend component that is only found in the logical view palette. A bicopy object, such as 1308 and 1314, as implemented in accordance with a preferred embodiment of the present invention, will place whatever is input on one of its diamond shaped I/O pins 1308a, 1308b, 1308c or 1398d on the other I/O pins.

Bicopy, which functions like a multiplexor, is coded as follows:

```
Bicopy, which functions like a multiplexor, is coded as follows:
import java.awt.*;
import java.util.*;
public class VJBiCopy extends VJNode {
// Atrributes of this component
static int instanceCount = 0;
static Image normalImage;
```

```
static Image selectedImage;
final static String out_bi    = "out_bi.gif";
final static String in_bi     = "in_bi.gif";
final static String port0_info = "Pin 0";
final static String port0_name = "Pin 0";
final static String port1_info = "Pin 1";
final static String port1_name = "Pin 1";
final static String port2_info = "Pin 2";
final static String port2_name = "Pin 2";
final static String port3_info = "Pin 3";
final static String port3_name = "Pin 3";
final static String url_name  = "bicopy.html";
final static String info_name = "Whatever is input on one pin is output
on the others";
VJ vj;
        int send_index0 = -1;
        int send_index1 = -1;
        int send_index2 = -1;
        int send_index3 = -1;
        int request_index0 = -1;
        int request_index1 = -1;
        int request_index2 = -1;
        int request_index3 = -1;
// Constructor
public VJBiCopy(VJ v){
    super(v);
    vj = v;
}
VJNode dup( ) {
    VJBiCopy b = new VJBiCopy(vj);
    try {
        int i = x+40;
        int j = y+40;
        b.setNormalIcon(out_bi);
        b.setSelectedIcon(in_bi);
        b.setName("BiCopy");
        b.setComponent(null);
        b.setComponentURL(url_name);
        b.setComponentInfo(info_name);
        b.VJNodeInit(false, i, j, false);
b.addPort(port0_info, port0_name, VJPort.InputOutput, VJPort, NorthCen
ter); // Pin 0
        b.addPort(port1_info, port1_name, VJPort.InputOutput,
VJPort.EastCenter); // Pin 1
b.addPort(port2_info, port2_name, VJPort.InputOutput, VJPort, SouthCen
ter); // Pin 2
        b.addPort(port3_info, port3_name, VJPort.InputOutput,
VJPort.WestCenter); // Pin 3
        b.setXPt(0, getXPt(0)+40);
        b.setYPt(0, getYPt(0)+40);
        b.setXPt(1, getXPt(1)+40);
        b.setYPt(1, getYPt(1)+40);
        b.setXPt(2, getXPt(2)+40);
        b.setYPt(2, getYPt(2)+40);
        b.setXPt(3, getXPt(3)+40);
        b.setYPt(3, getYPt(3)+40);
        b.setImages(normalImage, selectedImage); // Pass references to the
static images down to the node
        b.nodeRect = new Rectangle(i-3, j-
3, selectedImage.getWidth(vj.theContainer.theDesktop.vp_w)+, selectedI
mage.getHeight(vj.theContainer.theDesktop.vp_w)+3);
        b.setSelected(true);
        return b;
    } catch(Exception e) {
        System.out.println(e);
        return null;
    }
}
public static void getImages(GIFFactory f){
        normalImage = f.GetGIF(out_bi);
        selectedImage = f.GetGIF(in_bi);
}
// Component Initialization
public void VJBiCopyInit(int x_pt, int y_pt) {
        try {
            setNormalIcon(out_bi);
            setSelectedIcon(in_bi);
            setName("bicopy");
            setComponent(null);
```

```
                setComponentURL(url_name);
                setComponentInfo(info_name);
                VJNodeInit(false, x_pt, y_pt, false);
                addPort(port0_info, port0_name, VJPort.InputOutput,
VJPort.NorthCenter); // Pin 0
                addPort(port1_info, port1_name, VJPort.InputOutput,
    VJPort.EastCenter); // Pin 1
                addPort(port2_info, port2_name, VJPort.InputOutput,
    VJPort.SouthCenter); // Pin 2
                addPort(port3_info, port3_name, VJPort.InputOutput,
    VJPort.WestCenter); // Pin 3
                setImages(normalImage, selectedImage); //Pass references to the
    static images down to the node
                nodeRect = new Rectangle(x_pt-3, y_pt-
    3, selectedImage.getWidth(vj.theContainer.theDesktop.vp_w)+3, selectedI
    mage.getHeight(vj.theContainer.theDesktop.vp_w)+3);
        } catch(Exception e) {
            System.out.println(e);
        }
    }
    public void request(int port, int time) { }
    public int componentID( ) { return 5; }
                public void disconnecting(int port) {
                    switch(port){
            case 0:      send_index0 = -1; request_index0 = -1;
                         break;
            case 1:      send_index1 = -1; request_index1 = -1;
                         break;
            case 2:      send_index2 = -1; request_index2 = -1;
                         break;
            case 3:      send_index3 = -1; request_index3 = -1;
                         break;
        }
        }
public void connecting(int port) {
                switch(port){
                    case 0:   request_index0=0; send_index0 = 0;
                              vj.request(0, request_index0++, this);
                              break;
            case 1:       request_index1=0; send_index1 = 0;
                          vj.request(1, request_index1++, this);
                          break;
            case 2:       request_index2=0; send_index2 = 0;
                          vj.request(2, request_index2++, this);
                          break;
            case 3:       request_index3=0; send_index3 = 0;
                          vj.request(3, request_index3++, this);
                          break;
        }
}
public void load(String s) {
}
public String save( ) {
    return " "; }
public void set(Object o, int port, int time) {
    switch(port){
            case 0:       if (request_index1 > 0) vj.set(o, 1, send_index1++, this);
                          if (request_index2 > 0) vj.set(o, 2, send_index2++, this);
                          if (request_index3 > 0) vj.set(o, 3, send_index3++, this);
                          vj.request(0, request_index0++, this);
                          break;
            case 1:       if (request._3index0 > 0) vj.set(o, 0, send_index0++, this);
                          if (request_index2 > 0) vj.set(o, 2, send_index2++, this);
                          if (request_index3 > 0) vj.set(o, 3, send_index3++, this);
                          vj.request(1, request_index1++, this);
                          break;
            case 2:       if (request._3index1 > 0) vj.set(o, 1, send_index1++, this);
                          if (request_index0 > 0) vj.set(o, 0, send_index0++, this);
                          if (request_index3 > 0) vj.set(o, 3, send_index3++, this);
                          vj.request(2, request_index2++, this);
                          break;
            case 3:       if (request._3index1 > 0) vj.set(o, 1, send_index1++, this);
                          if (request_index2 > 0) vj.set(o, 2, send_index2++, this);
                          if (request_index0 > 0) vj.set(o, 0, send_index0++, this);
                          vj.request(3, request_index3++, this);
                          break;
        }
    }
```

-continued

```
public void propertiesEditor( ) {
}
public void init( ){ };
public void start( ){ };
public void stop( ){ };
public void destroy( ){ };
} // end class VJButton
```

Figure 13A:
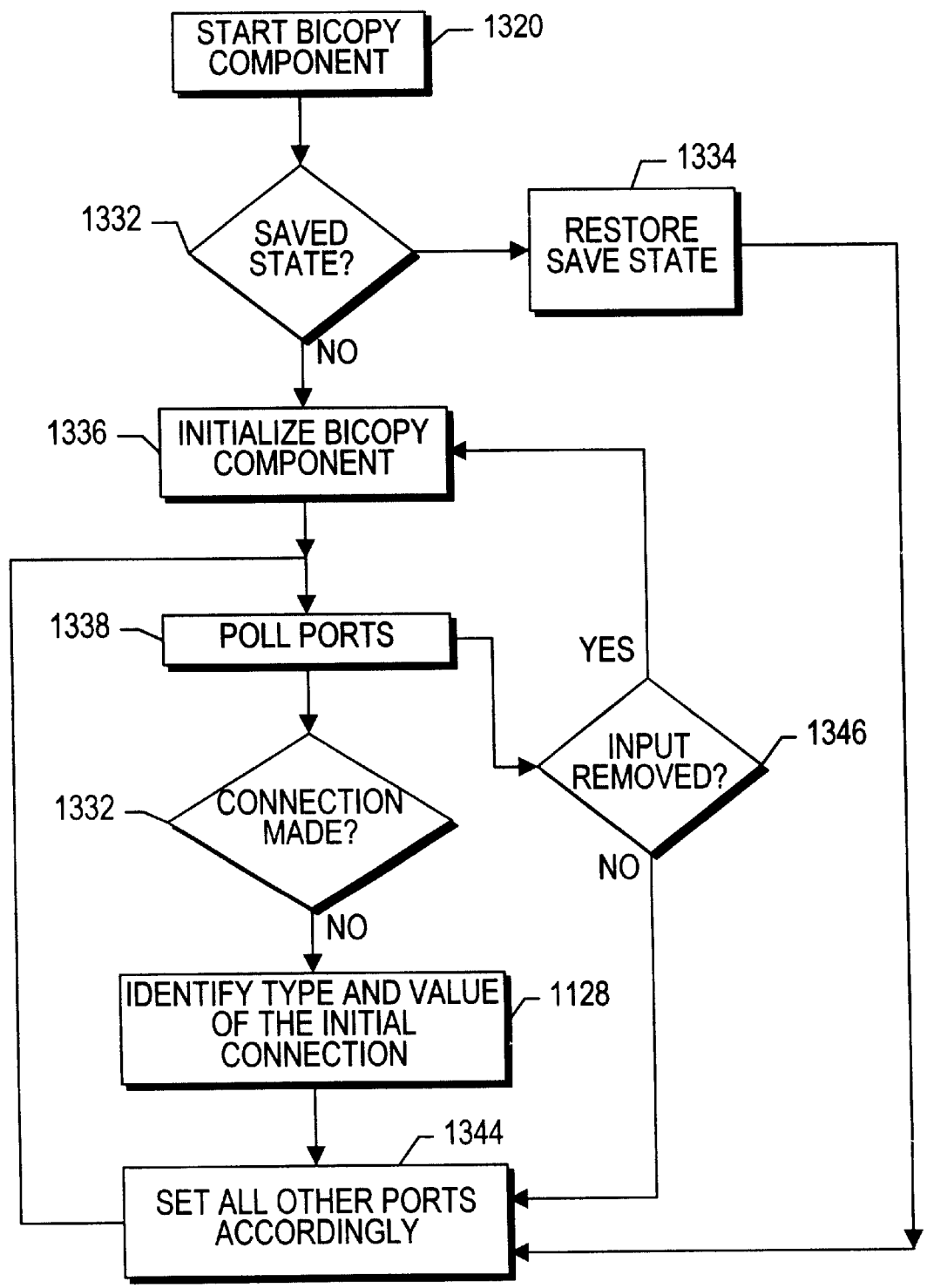
FIG. 13A illustrates a flowchart for the process by which the bicopy component shown in FIG. 13 functions in accordance with a preferred embodiment.

FIG. 13A illustrates a flowchart of the process by which the bicopy component 1308 shown in FIG. 13 functions. The act of dragging and dropping a new bicopy component onto the logical desktop 402 or of dropping an assembly from folder 542, which assembly contains a bicopy component, onto the logical view desktop 402 actually starts the bicopy component as called for in block 1330. A test is next made to see there is a saved, prior state for bicopy element 1308 that needs to be restored by decsion block 1332. If restoration is neded, control is passed to block 1334 which obtains the necessary values and has the ports set accordingly in block 1344.

If the bicopy component is new, its two-way ports are initialized or set to zero in bock 1336. Once that has been done, the ports are polled in block 1338 to monitor connection attempts. Decision block 1340 returns control to block 1338 for continued polling if there were no connections made to any of bicopy's component ports. If a proper connection has been made, a connection sufficient to place a value on one of the bicopy componet's ports, control is passed to block 1342 where the type and value of the connection is identified.

Thus, if a connection has been made from a text field, a character string is placed on one of the bicopy component's ports and captured by the Bicopy component. Similarly, if an integer value, such as 32, isplaced placed on one of the bicopy component's ports, that type and value is also recognized and captured. Once the type and value of an input are known, the remaining ports are set to provide the same type and value as the input by block 1344. Thus, at this point, see FIG. 16, bicopy component 1308 would have its port 1308c set by the output of scrollbar representation 1306 to the current value (position) of the scrollbar. This means that ports 1308a, 1308b and 1308d, which act as output ports, will carry the output value of scrollbar 1306 until the input connection to port 1308c is changed.

Decision block 1346, which is advised of the initial connection by block 1342, checks for removal of the input value to bicopy component 1308 and returns control back to block 1344 if it has not been removed or to block 1336 for reinitialization if it has been removed.

Figure 14:
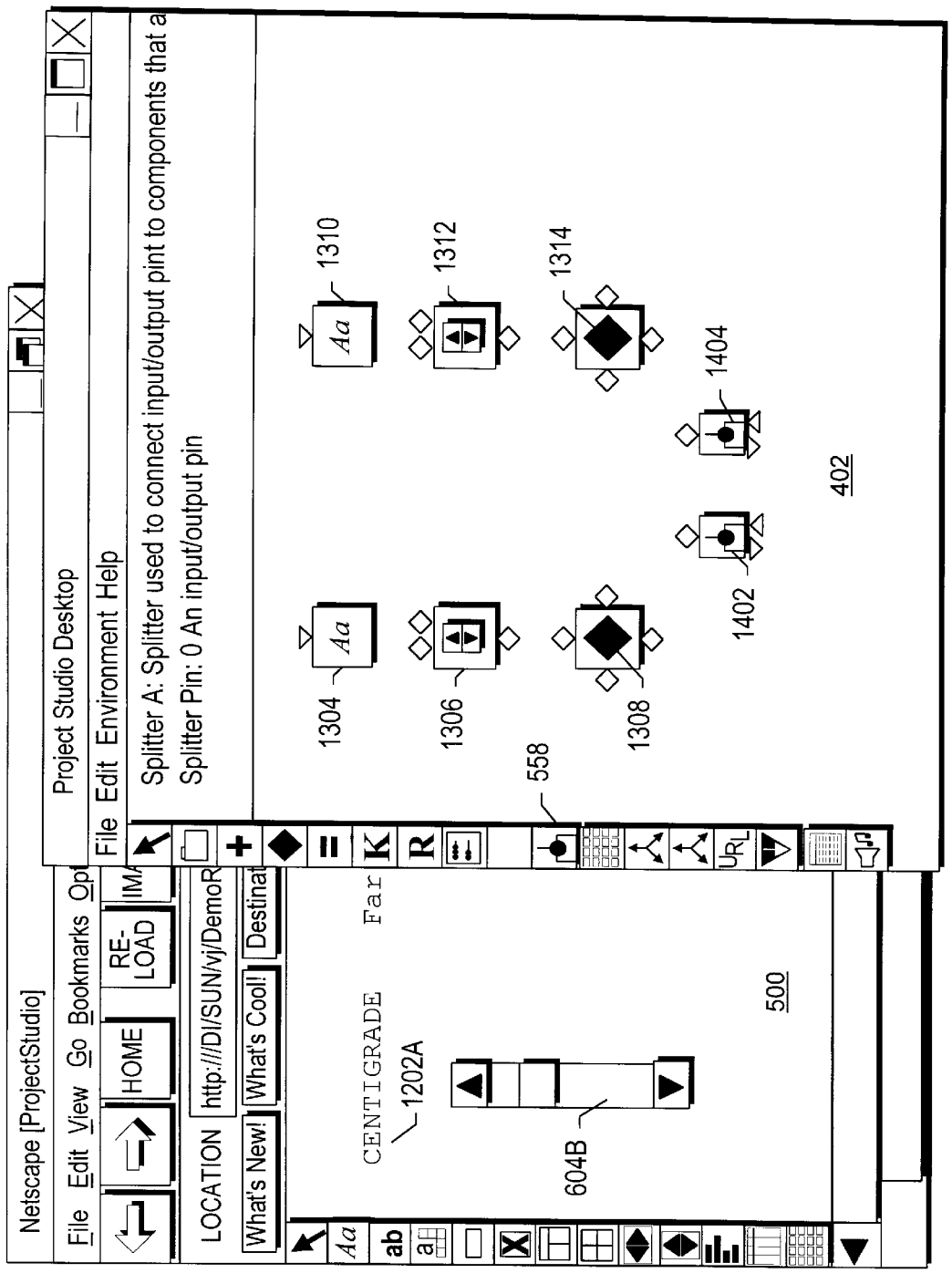
FIG. 14 illustrates the addition and use of splitters in the logical view in accordnace with in accordance with a preferred embodiment.

FIG. 14 shows addition of splitters 1402 and 1404 in the logical view 402. Splitter objects 1402 and 1404 are used to connect I/O pins to components that are functionally involved in a defined relationship appearing in the logical view 402. Splitters are instantiated form the splitter palette component 558 of logical view 402 and are dragged and dropped to a suitable location on the logical view desktop. Splitter objects are formed pursuant to their implementing code (VJSplit) as follows:

```
import java.awt.*;
import java.util.*;
public class VJSplit extends VJNode {
// Attributes of this component
static int instanceCount = 0;
static Image normalImage;
static Image selectedImage;
final static String out    = "OSplit.gif";
final static String in     = "ISplit.gif";
final static String port0_info = "An input/output pin";
final static String port0_name = "Pin 0";
final static String port1_info = "An output pin";
final static String port1_name = "Pin 1";
final static String port2_info = "An input pin";
final static String port2_name = "Pin 2";
final static String url_name   = "split.html";
final static String info_name = "A Splitter used to connect
input/output pins to componets that are either input or output";
VJ vj;
int send._3index2 = 0;
int request_index0 = 0;
int request_index1 = 0;
// Constructor
public VJSplit(VJ v){
        super(v);
        vj = v;
}
VJNode dup( ) {
    VJSplit b = new VJSplit(vj);
    try {
        int i = x+40;
        int j = y+40;
        b.setNormalIcon(out);
```

-continued

```
        b.setSelectedIcon(in);
        b.setName("Splitter");
        b.setComponent(null);
        b.setComponentURL(url_name);
        b.setComponentInfo(info_name);
        b.VJNodeInit(false, i, j, false);
b.addPort(port0_info, port0_name, VJPort.InputOutput, VJPort.NorthCen
ter); // Pin 0
b.addPort(port1_info, port1_name, VJPort.Output, VJPort.SouthLeftCente
r); // Pin 0
b.addPort(port2_info, port2_name, VJPort.Input, VJPort.SouthRightCente
r); // Pin 0
        b.setXPt(0, getXPt(0)+40);
        b.setYPt(0, getXPt(0)+40);
        b.setXPt(1, getXPt(1)+40);
        b.setYPt(1, getXPt(1)+40);
        b.setXPt(2, getXPt(2)+40);
        b.setYPt(2, getXPt(2)+40);
        b.setImages(normalImage, selectedImage); //Pass references to the
static images down to the node
        b.nodeRect = new Rectange(i-3, j-
3, selectedImage.getWidht(vj.theContainer.theDesktop.vp_w)+3, selectedI
mage.getHeight(vj.theContainer.theDesktop.vp_w)+3);
        b.setSelected(true);
        return b;
    } catch(Exception e) {
        System.out.println(e);
        return null;
    }
}
public static void getImages(GIFFactoryf){
        normalImage = f.GetGIF(out);
        selectedImage = f.GetGIF(in);
}
// Component Initialization
public void VJSplitInit(int x_pt, int y_pt) {
    try {
        setNormalIcon(out);
        setSelectedIcon(in);
        setName("Splitter");
        setComponent(null);
        setComponentURL(url_name);
        setComponentInfo(info_name);
        VJNodeInit(false, x_pt, y_pt, false);
addPort(port0_info, port0_name, VJPort.InputOutput, VJPort.NorthCente
r); // Pin 0
addPort(port1_info, port1_name, VJPort.Output, VJPort.SouthLeftCenter);
// Pin 0
addPort(port2_info, port2_name, VJPort.Input, VJPort.SouthRightCenter);
// Pin 0
        setImages(normalImage, selectedImage); //Pass references to the
static images down to the node
        nodeRect = new Rectange(x_pt-3, y_pt-
3, selectedImage.getWidht(vj.theContainer.theDesktop.vp_w)+3, selectedI
mage.getHeight(vj.theContainer.theDesktop.vp_w)+3);
    } catch(Exception e) {
        System.out.println(e);
    }
}
public int componentID( ) { return 12; }
        public void disconnecting(int port) { }
        public void connecting(int port) { }
        public void load(String s) {
        }
        public String save( ) {
            return " "; }
        public void propertiesEditor( ) { }
        pubic void reset( ) { }
        public void request(int port, int time) {
            switch(port){
            case 0:    vj.request(2, time, this);
                    break;
            case 1:    vj.request(0, time, this);
                    break;
            }
        }
```

```
            public void set(Object o, int port, int time) {
                switch(port){
                    case 0:      vj.set(o, 1, time, this);
                              break;
                    case 2:      vj.set(o, 0, time, this);
                              break;
                }
            }
        }
    public void init( ) { };
    public void start( ){
    };
    public void stop( ){
    };
    public void destroy( ){ };
    }
```

FIG. 15 shows the addition of a calculator object 1502. Calculator object 1502 is instantiated from calculator component 572 of the logical view palette when the mouse is clicked over the calculator icon and the resulting image is dragged into the logical view window. When calculator object 1502 is created, evaluator editor 1504 is popped up so that expressions to be evaluated by the calculator can be input thereto. In this particular example, the Fahrenheit to Centigrade conversion expression to be evaluated is entered and the calculator is thereby informed what its computational task will be.

Figure 16:
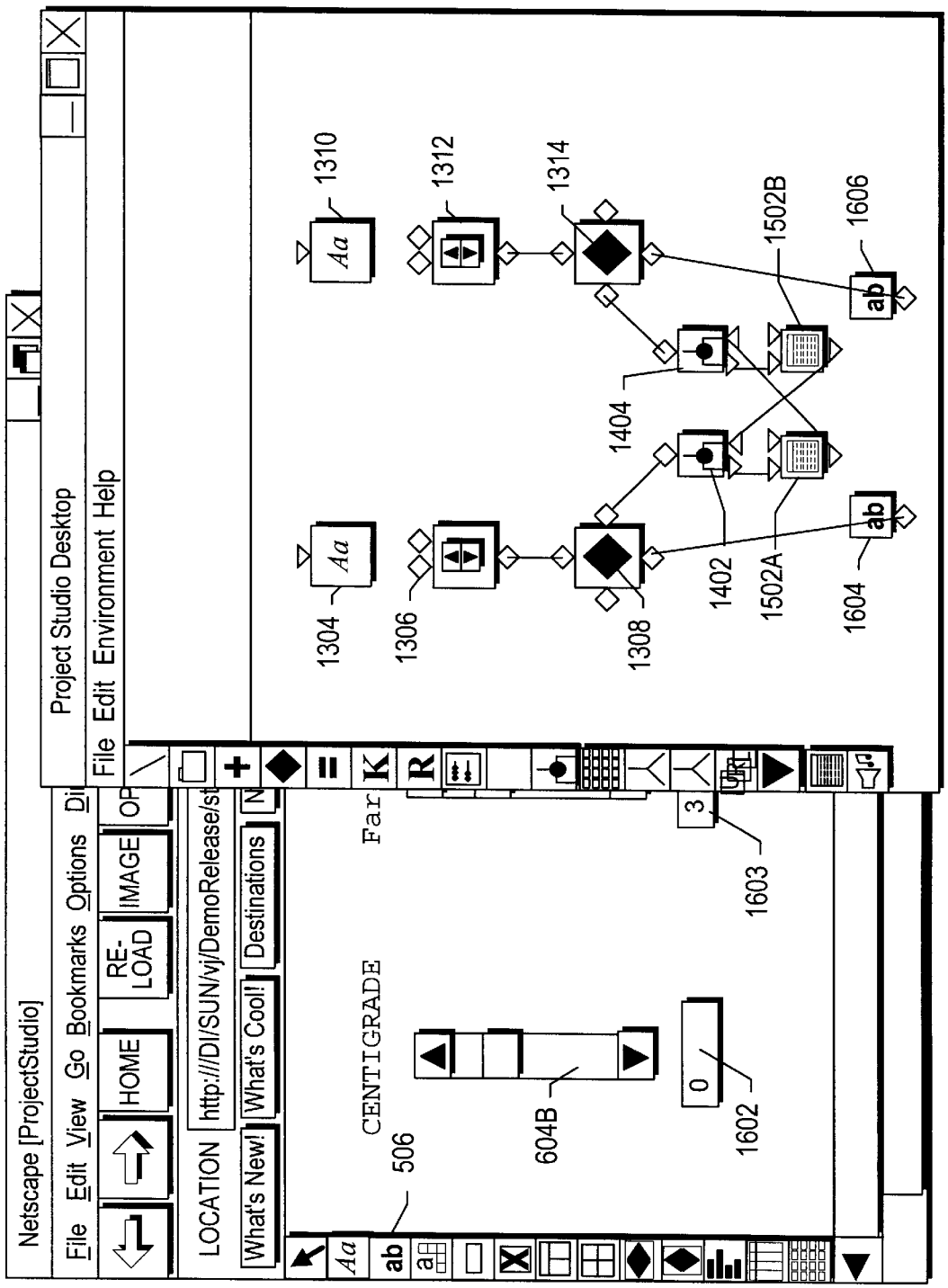
FIG. 16 depicts an additional calculator and the interconnections of several objects to achieve the appropriate Centigrade/Fahrenheit relationship between scrollbars of FIG. 11 in accordance with a preferred embodiment.

FIG. 16 illustrates the interconnections of several objects to achieve the appropriate Centigrade/Fahrenheitrelationship between scroll bars 604b and 1102. Building on to the arrangement depicted in FIG. 15, the user would add two simple text field objects 1602 and 1603 in physical view 500 by clicking on the simple text field icon 506 twice and then dragging and dropping each resultant text field object 1602 and 1603 so that each is located below and adjacent to the scrollbar it contains information for.

When the text field objects are created, logical representations thereof, 1604 and 1606 respectively, are created by VJ Tool in the logical window. The appropriate interconnections between and amongst the several objects in the logical view 402 are then made and the results displayed in the text fields 1602 and 1604 as a direct function of where the scrollbars are actually located. Since scrollbar 604b is at its minimum position, which is zero, text field 1602 accurately displays that result. The display of the position results in a text field without the intervening need to write additional code to transform the scrollbar output, an integer or floating point value to an ASCII string. VJ Tool takes care of that task for the user and permits concentration on the problem being solved.

```
VjTextField is coded as follows:
import java.awt.*;
import java.util*;
public class VjTextField extends VJNode {
// Attributes of this component
public AWTTextField text;
static int instanceCount =0;
textfieldEditor edit;
static Image normalImage;
static Image selectedImage;
final static String out "out_te.gi";
final static String in = "in_te.gif";
final static String port0_info = "for getting or seeting the current text";
final static String port0_name = "Pin 0";
final static String url_name  = "textfield.html";
final static String info_name  = "A simple AWT textfield";
VJvj;
int send_index = 1;
int request_index = 0;
int c_width, c_height;
// Constructor
public VJTextField(VJ v){
    super(v);
        vj = v;
}
VJNode dup() {
VjTextField vj_comp = new VJTextField(vj);
    try{
        int i = x+40;
        intj = y+40;
        AWTTextField t = new AWTTextField(text. getText() ,vj_comp);
        vj_comp.text = t;
        t.setFont(text.getFont());
        yj_comp.setNormalIcon(out);
        vj_comp.setSelectedIcon(in);
```

-continued

```
        vj_comp. setName(text.getText());
        vj_comp.setComponent((Component)t);
        vj_comp.setComponentuRL(url_name);
        vj_comp.setComponentInfo(info_name);
        vj_comp.VJNodeInit(false,i,j,true);
vj_comp.addPort(port0_info,port0_name,VJPort.InputOutput,VJPort. S
outhCenter); / / Pin 0
        vj_comp.setxPt(0,getxpt(0)+40);
        vj_comp.setypt(0,getyPt(0)+40);
        vj_comp. setImages(normalImage, selectedImage); / / Pass references
to the static images down to the node
        vj_comp.nodeRect = new Rectangle(i-3,j-
3,selectedImage.getwidth(vj.theContainer.theDesktop.vp_w) +3 , selecte
dImage.getHeight(vj.theContainer.theDesktop.vp_w) +3);
        vj_comp.setSelected(true);
        vj.theDocument.add(vj comp.comp);
        vj_comp.comp.validate();
    vj_comp.comp.reshape(comp.bounds().x+50 ,comp.bounds().y+50 ,comp
    .bounds().width,comp.bounds().height);
        vj_comp.comp.show();
        return vj_comp;
    } catch(Exception e) {
        System.out.println(e);
        return null;
    }
}
public static void getImages(GIFFactory f){
        normalImage = LGetGIF(out);
        selectedImage = f.GetGIF(in);
}
/ / Component Initialization
public void VJTextFieldInit(int x_pt, int y_pt) {
        try{
            String theText = new String("TextField
"+String.valueOf(instancecount++));
        text = new AWTTextField(theText,this);
        text.setFont(new Font("Courier", Font.PLAIN, 14));
        setNormalIcon(out);
        setSelectedIcon(in);
        setName(theText);
        setComponent((Component)text);
        setComponentURL(urL_name);
        setComponentInfo(info_name);
        VJNodeInit(false,x_pt,y_pt,true);
addPort(port0jnfo,port0_name ,VJPort.InputOutput,VJPort.SouthCent
er); //Pin 0
        setImages(normalImage,selectedImage); / /Pass references to the
static images down to the node
        nodeRect = new Rectangle(x_pt-3,y_pt-
3,selectedImage.getwidth(vj.theContainer.theDesktop.vp_w) +3, selecte
dImage.getHeight(vj.theContainer.theDesktop.vp_w) +3);
    } catch(Exception e) {
        System.out.println(e);
    }
}
public void request(int port,int time) { }
public int componentID() {return 3;
public void disconnecting(int port) {
        send_index= -1;
}
public void connecting(int port) {
        request_index=0;
        send_index = 0;
        vj.request(0,request_index++, this);
}
        public void load(String s) {
            StringTokenizer tokenStream = new
StringTokenizer(s,"@",false);
                String data =
tokenStream.nextToken().replace('^','\t').replace('&',' ');
            if(data.startsWith(" ")) data = data.substring(1);
                text.setText(data);
                    String family = tokenStream.nextToken();
            boolean bold =
Boolean.valueOf(tokenStream.nextToken()).booleanValue();
            boolean italic =
Boolean.valueOf(tokenStream.nextToken()).booleanValue();
            int size =
```

-continued

```
Integer.valueOf(tokenStream.nextToken()).intValue();
            int theStyle = Font.PLAIN;
            if(bold) theStyle = theStyle+Font.BOLD;
            .if(italic) theStyle = theStyle+Font.ITALIC;
            text.setFont(new Font(family, theStyle, size));
                    if(!vj.isMicrosoft)
vj.doRe size(this,text.size().width,text.size().height);
        }
        public String save() {
            String family = text.getFont().getName();
            int size = text.getFont().getSize();
            boolean bold = text.getFont().isBold();
            boolean italic = text.getFont().isItalic();
            return text.getText().replace('
','&').replace('\t',' ') +"@" +family+"@" +bold+"@" +italic+"@" + size; }
        public void set(Object o,int port,int time) {
            boolean ok = false;
            if(o instanceof Color) {text.setForeground((Color)o); ok=true; }
            if(o instanceof String) {text.setText((String)o); ok = true;}
            if(o instanceof Long) {text.setText((String) (((Long) o).toString()));
ok = true;}
            if(o instanceof Double) {
text.setText((String) (((Double)o).toString())); ok = true ;}
            if(o instanceof Float) {text.setText((String) (((Float) o).toString()));
ok = true;}
            if(o instanceof Integer) {
text.setText((String) (((Integer) o).toString()); ok = true;}
            if(o instanceof Boolean) {
text.setText((String) (((Boolean)o).toString())) ;ok = true; }
            if(ok) {
                / /System.out.printin(name +"has input at "+
String.valueOf(time)+"= "+ getText());
                if(time<199) vj.request(0,reque st_index++,this);
            }
            ok = false;
        }
        public boolean handleEvent(Event e) {
            if(e.id == 1001) {
                    if(send_index>=0)
                    vj.set( (Object) text.getText() ,0, send_index++,this);
            }
            switch(e.id){
                case VJEvent.DOUBLECLICK: propertiesEditor(); break;
                //case 0: set(e.arg,0); System.out.println("GOT TF 0
"+e.toString()); break;
            }
            return false;
        }
public void propertiesEditor() {
    if(edit==null){
        edit = new textfieldEditor((Frame) (vj.theFrame) , this);
        edit.pack();
        edit.resize(12*32,6*32);
        edit.show();
    }
}
public void init(){};
public void start(){};
public void stop(){};
public void destroy(){};
} / / end class VJButton
class textfieldEditor extends Frame
{
        VjTextField vjtf;
        TextField tf;
        Button ok,
        Button cancel;
        Choice fonts;
        Font compFont;
        Checkbox bold;
        Checkbox italic;
        TextField size;
        String fontnames[];
        boolean dirty;
        public textfieldEditor (Frame parent,VJTextField 1)
        {
                super("TextField Editor");
            setBackground(Color.lightGray);
                setLayout(new BorderLayout());
```

-continued

```
            Panel p = new Panel();
        Panel centerPanel = new Panel();
                p.add(new Button("OK"));
                p.add(new Button("Cancel"));
            add("South",p);
            vjtf = 1;
            dirty = false;
            Panel PN = new Panel();
            fonts = new Choice();
            fontnames = vjtf.text.getToolkit().getFontList();
            compFont = vjtf.text.getFont();
            for (int i = 0; i < fontnames.length; i++) {
                    fonts.addItem(fontnames[i]);
if(fontnames[i].equals(compFont.getFamily()))fonts.select(i);
            }
            fonts.SetBackground(Color.lightGray);
            bold = new Checkbox("Bold");
            bold.setState(compFont.isBold());
            italic = new Checkbox("Italic");
            italic.setState(compFont.isItalic());
            size = new TestField(String.valueOf(compFont.getSize ()));
            tf = new TextField(vjtf.text.getText());
               centerPanel.setLayout(new GridLayout(2,3));
               centerPanel.add(new Label("Fonts"));
               centerPanel.add(new Label("Text"));
               centerPanel.add(new Label("Font Size"));
            centerPanel.add(fonts);
            centerPanel.add(tf);
            centerPanel.add(size);
            Panel textP = new Panel();
            textp.add(bold);
            textP.add(italic);
            PN.add(textP);
            add("North",PN);
            add("Center",centerpanel);
    }
    public boolean handleEvent(Event evt)
        {       // / System.out.println(evt.toString());
              switch(evt.id){
                case Event.ACTION_EVENT:
            {
                    if("OK".equals(evt.arg))
                    {
                        int theStyle = Font.PLAIN;
                        if(bold.getState()) theStyle = theStyle+Font.BOLD;
                        if(italic.getState()) theStyle = theStyle+Font.ITALIC;
                        vjtf.text.setFont(new Font(fonts.getSelectedItem(),
theStyle, Integer.valueOf(size.getText()).intValue()));
                        vjtf.text.setText(tf.getText());
                        if(?vjtf.vj.isMicrosoft)
vjtf.vj.doResize (vjtf,vjf.c_width,vjtf.c_height);
                            dispose();
                            return true;
                        }
                        if("Cancel".equals(evt.arg))
                        {
                          dispose();
                          return true;
                        }
                        return false;
                        }
                    default:
                        return false;
                }
            }
    }
}
The AWTTextField.Java is as follows:
import java.awt.*;
public class AWTTextArea extends TextArea {
    VJTextArea vjt;
    public AWTTextArea(String n,VJTextArea v){
        super(n);
        vjt = v;
        setFont(new Font("Courier", Font.PLAIN, 14));
    }
```

-continued

```
    public boolean handleEvent(Event e) {
        return vjt.handleEvent(e);
    }
}
```

In this example, interconnections are made by mouse click, drag and drop operations as follows. The output of scrollbars 1306 and 1308 are connected to the bicopy objects 1308 and 1314 respectively. That value is passed from bicopy object 1308 to splitter 1402 and text field representation 1604 and from bicopy object 1314 to splitter 1404 and text field representation 1606. In addition, the output of splitter 1402 is coupled to the input of calculator 1502a while the output of splitter 1404 is coupled to the input of calculator 1502b. Finally, the outputs of calculators 1502a and 1502b are respectively connected to the inputs of splitters 1402 and 1404. Thus, when scrollbar 604b is moved to a new position, the value of that position is transmitted by the scrollbar object 1306 to bicopy object 1308 and from there to text field component representation 1604. This means that the text fields 1602 and 1603 both display the changing values for their associated scrollbars 604b and 1102 when either one of them is moved to a new position.

It is rather important to note that the interconnections described above between objects on the logical view are subject to type and functionality checking in a dynamic manner when they are attempted. Thus, the connection in FIG. 16 that was made between the output port of splitter 1402 and the input port of calculator 1502a is functionally permissible and was permitted to be made in a manner that was transparent to the user. Conversely, if an attempt had been made to connect the output port of splitter 1402 to the output port of calculator 1502a, that attempt would have been denied as functionally impermissible. In a similar manner, had an attempt been made to the output of calculator 1502a to the input of text label object 1304, that connection would have been denied since the input type (a value or number) was mistyped as an input to text label object 1304 which only accepts input of type char or a string of characters. This functional and type compatibility checking is performed by the VJDesktop code as set forth above.

Figure 16A:
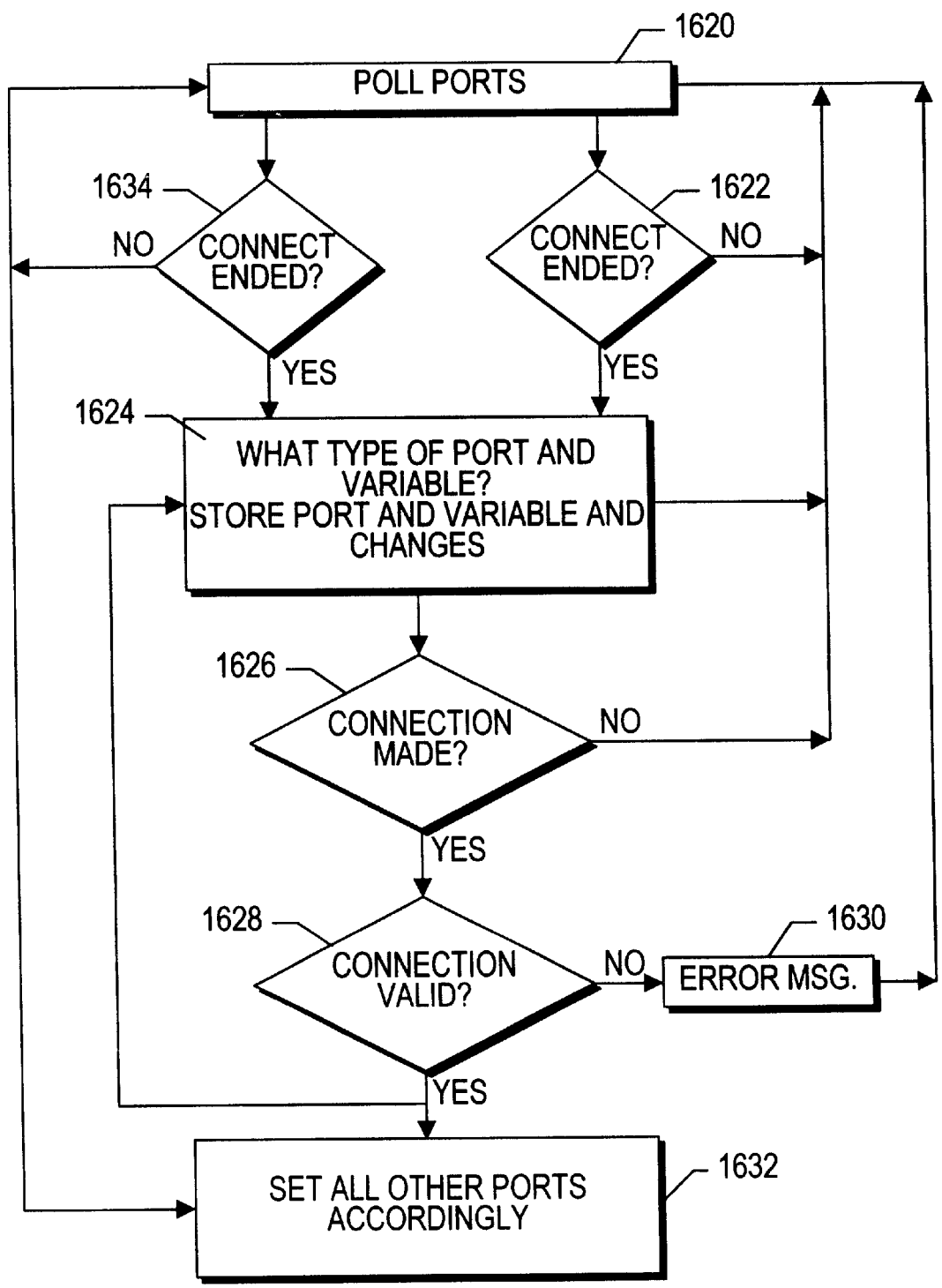
FIG. 16A is a flowchart of the detailed logic for port connection in accordance with a preferred embodiment.

The port or netpin type verification works in the following functional manner. When a component or object pin is created by being dropped onto the logical view desktop 402, its presence there and the number and nature of its pins, if any, is logged, stored and tracked by the VJDesktop code. Specifically, the number and types of ports or netpins on the newly instantiated component or object is noted Once a component or object having pins is instantiated, VJDesktop tracks and stores the status of its ports by polling them periodically as depicted by block 1620 in FIG. 16A. The same is true for variables, the information for which is initially stored when a component that can pass, duplicate or manipulate a variable is instantiated.

As used herein, the term "initiate a connection" means that the mouse has been clicked over only one port in preparation for tacking the line that appears to another port. Once that other port is clicked on, the connection is deemed to be completed.

Decision block 1622 is advised by block 1620 whether or not a connection to one of the ports has been initiated. If no attempt to initiate a connection has been made, polling continues. If a connection has been initiated, the type of port involved (input, output or bidirectional) and, if known, the type of variable expected (character, float, long integer, short integer, string, etc.) on that port are stored as per block 1624 with VJDesktop and control waits for completion of a connection for the involved port while polling continues for the remaining ports.

Decision block 1626 sends control back to polling if the pending connection has not yet been made. If the connection is completed, control for the ports involved is passed to decision block 1628 which decides if the attempted complete connection between the ports involved is valid. The type of ports involved and their functional affinity for each other will be checked and verified. Connections directly between an input port on one component will not be allowed to an input port on another component nor will a direct connection between an output port on a first container to an output port on a second container. Also forbidden are connections between ports on the same component regardless of their type.

In addition to checking that interport connections are valid, decision block 1628 also ascertains if the variable to be transmitted across the new connection is valid for both ports. By referring to the stored component and object port information, it can be determined, for example, that the variable at the output of calculator 1502a in FIG. 16 is mistyped as to the variable expected at the input of label 1304, a character or string. As a result, when that otherwise valid output to input connection is attempted, it would be prevented by decision block 1628 because of a variable type mismatch.

When the attempted connection is invalid, an error message will be sent to the screen for the user to see and notification is sent to block 1620 to keep on polling for completion of the initiated, but not completed connection. If the attempted connection is valid, it is completed and also reflected on the display and the polling block 1620 is so advised. The stored port information is updated and the system waits for the next attempted connection. If a completed connection is ended, decision block 1634 is so advised by polling block 1620 and the stored type information for that connection is appropriately adjusted to reflect that the ports which were involved in the ended connection are now free for other use.

Figure 17:
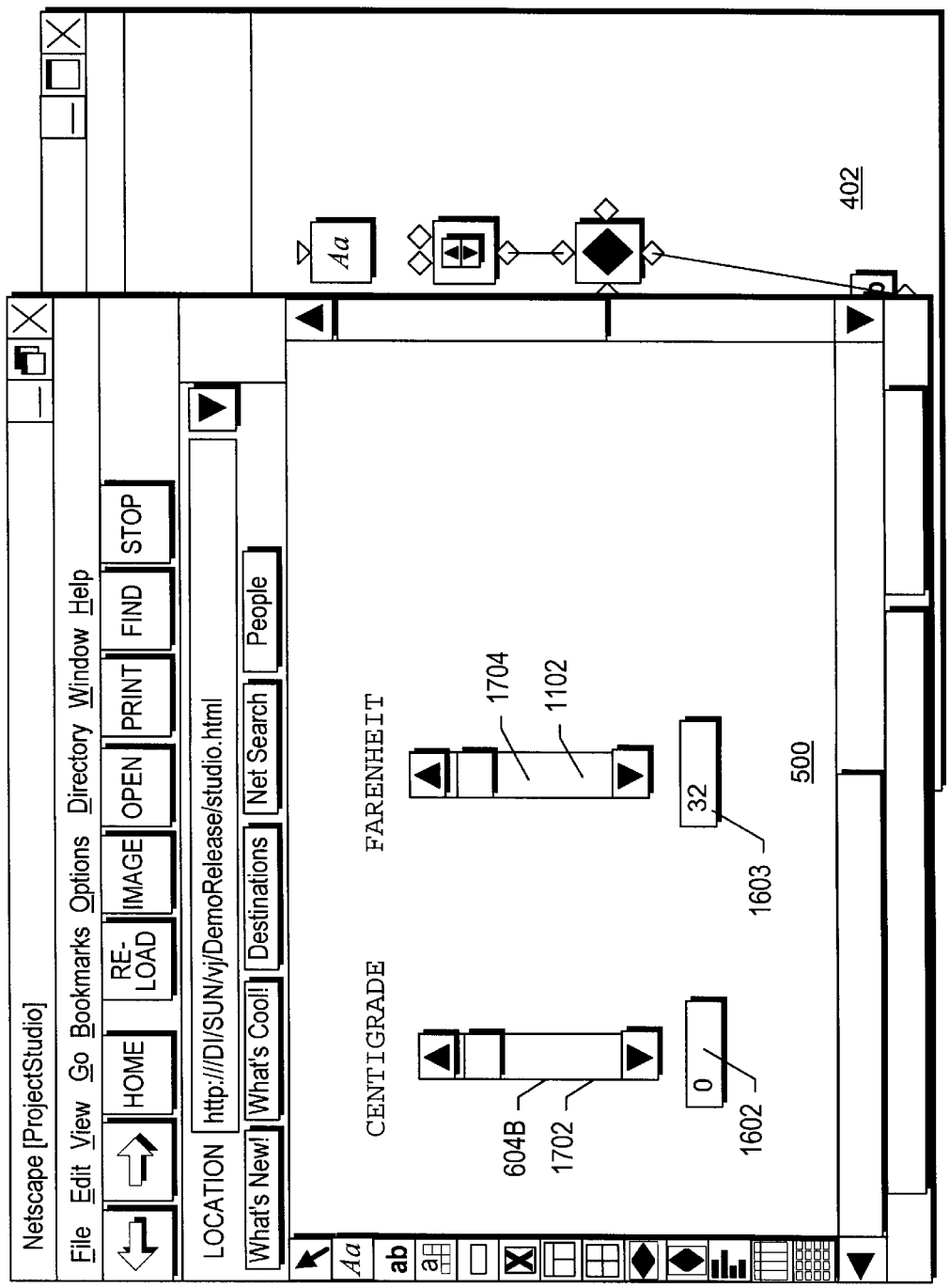
FIG. 17 shows the final result of the conecteded scrollbars with correct Fahrenheit and Centigrade temperatures shown in the text fields in accordance with a preferred embodiment.

FIG. 17 shows the final result of the coupled scrollbars with correct Fahrenheit and Centigrade temperatures shown in text fields 1602 and 1603, respectively. With both scrollbars at their minimum positions, the Centigrade scrollbar 604b position produces the value 0 in text field 1602. In similar fashion, scrollbar 1102 produces a value of 32 in text field 1603. If scrollbar 604b is pulled down to position 1702 where it has a value of 80, as will then be displayed in text field 1602, then scrollbar 1102, because of what are essentially feedback connections made in FIG. 16, will move to position 1704 which will cause text field 1603 to then display its corresponding value of 176 degrees. Because of the cross coupling described in connection with FIG. 16, moving scrollbar 1102 first to a position of 176 would cause scrollbar 604b to be positioned at the point that represents the value 80, which would be displayed in text field 1602.

```java
import java.net.*;
import java.io.*;
import java.util.Vector;
class ServerConnection extends Thread
{
    private Socket          _mysocket;
    private PrintStream     _output;
    private DataInputStream _input;
    String id;
    ConnectionManager creator;
    int intId;
    private Socket some_server = null;
    private DataInputStream in;
    private PrintStream out;
    private int clientType;
    theClient XXXXserver;
        private void doServerWork()
        {
            Parser p;
            String temp;
            String command;
            while(true){
            while(!inputWaiting())
                Thread.yield();
            String s = receive();
        // Dump a copy of rec input to console to see waht is happening
        // uncomment next line in development
        // System.out.println(id + " ->" + s);
        // Parse the input string
         p = new Parser(s);
        // determine the command recieved from the client
        command = p.arg(0);
        if(!p.isValid()){
          send("--" + command);
                }
                else if(command.compareTo("Confirm") == 0){
        send("--" + command + "confirmed");
                }
                else if(command.compareTo("SendAll") == 0){
        creator.sendToAll(intId + " ->" + p.arg(1));
                send("--" + command + "confirmed");
                }
                else if(command.compareTo("Connect") == 0){
                    send(handleConnect(p, s));
                }
                else if(command.compareTo("Command 1") == 0){
                    send(handleFileServer(p, s));
                }
                else if(command.compareTo("Command2") == 0){
                    send(handleFileServer(p, s));
                }
                else if(command.compareTo("Command3") == 0){
                    send(handleFileServer(p, s));
                }
                else if(command.compareTo("Command4") == 0){
                    send(handleFileServer(p, s));
                }
            // Add more commands as required
                else{
            send("--Unknown request -" + command);
                } }
            }
private String handleFileServer(Parser p, String s){
            String command = p.arg(0);
            XXXXserver.send(s);
            return XXXXserver.receive();
                }
                public DataInputStream getDataInputStream(){
            return in;
                }
                public PrintStream getPrintStream(){
            return out;
                }
                public void handleMessage(String s){
                }
```

-continued

```
        private String handleConnect(Parser p, String s){
        if(initSocket(p.arg(1),Integer.valueOf(p.arg(2)).intValue())){
            clientType = TypesOfClients.CONNECTED_CLIENT;
            XXXXserver = new theClient(this);
            return("--"+ XXXXserver.receive());
        }
        clientType = TypesOfClients.NORMAL_CLIENT;
        return ("--Failed connecting to "+ p.arg(1) + ":" + p.arg(2));
    }
private boolean initSocket(String addr, int port){
        try{
        some_server = new Socket(addr, port);
        in = new DataInputStream(some_server.getInputStream());
        out = new PrintStream(some_server.getOutputStream());
        }
        catch(Exception e){
            try
            {
                some_server. close();
            }
            catch(Exception e2)
            {
                System.err.println("Exception: \n" + e);
                return false;
            }
            return false;
        }
        return true;
    }
        public ServerConnection(Socket s, ConnectionManager c, int
        id1)
                {
                    _mysocket = s;
                    creator = c;
                intId = id1;
                    clientType = TypesOfClients.NORMAL_CLIENT;   }
public boolean send(String s){
        System.out.println("Sending" + s);
            try{
        _output.println(s);
        }
            catch(Exception e){
        return false;
            }
            return true;
        }
    private String receive(){
            try{
        return _input.readLine();
            }
            catch(Exception e){
            }
            return " ";
        }
        private boolean inputwaiting(){
            try{
            return (_input.available() != 0);
        }
        catch(Exception e){
        }
        return false;
}
        public void run()
        {
                id = _mysocket.getInetAddress() + ":"+
_mysocket.getPort();
                System.out.println("New Client: " + id);
                try
                {
                _output = new
PrintStream(_mysocket.getOutputStream());
                _input = new
DataInputStream(_mysocket.getInputStream());
                    send("Your id is" + intId);
                        doServerWork();
                        _mysocket.close();
                }
        catch (Exception e)
```

```
                {
                            System.err.println("Exception: \n" + e);
                }
                System.out.println("Disconnecting : " + id);
                stop();
            }
    }
}
class TypesOfClients{
    static int NORMAL_CLIENT = 1;
    static int CONNECTED_CLIENT = 2;
}
class Parser{
    String args[] = new String[10];
    int n;
    boolean valid;
public Parser(String s){
    if (parse(s))
                valid = true;
        else
                valid = false;
    }
    public boolean isValid(){
        return valid;
    }
    public String arg(int i){
        if(i <= n)
                return args[i];
        else
                return ""
    }
    public int getNumberOfArgs(){
        return n;
    }
    private boolean parse(String s){
        String out = "";
        int i = 0;
        int commas[] = new int[10];
                int start, end;
    int count = 0;
        int openingB = s.indexOf("(");
        if(openingB == -1){
            args[0] = "No Opening Parantheses";
            n = 1;
            return false;
    }
        int lastPos = openingB;
        args[count] = s.substring(0, lastPos);
        out = out + "{" + args[count] + "}";
        count = count +1;
    boolean GoOn = true;
        while (GoOn){
    start = s.indexOf("'", lastPos);
        if(start == -1){
                GoOn = false;
    }
        else{
            end = s.indexOf("'", start+1);
                if(end == -1){
                args[0] = "Unmatched apostrophes";
                n = 1;
                return false;
    }
                commas[i] = s.indexOf(",",end+1);
                if(commas[i]== -1){
                    commas[i] = s.indexOf(")", end+1);
                    if(commas[i]== -1){
                        args[0] = "Something's wrong";
                        n= 1;
                        return false;
    }
                }
    args[count] = s.substring(start + 1, end);
                out = out + "{" + args[count] +"}";
    count = count +1;
                lastPos = commas[i];
                i = i +1;
    }
        }
```

-continued

```
        System.out.println(out);
        n = count;
            return true;
        }
    }
}
// This is the MAIN routine for the server
// It initializes on a predetermined socket port. There can be many
// sockets for a particular computer that may have a unique IP
address.
// In this case port # 4000
// The corresponding collaborative component must use this
// socket to communicate with this server
// You must make sure that no other services are using this
// socket number.
class GenericServer
{
        private static final int DEFAULT_PORT=4000;
        private ConnectionManager cm = null;
        public GenericServer(int port)
        {
                System.out.println("Server using port" + port);
                cm = new ConnectionManager(port);
                cm. start();
        }
        public static void main(String args[])
        {
                int server_port;
                try
                {   // See if the user is using a commandline argument
to
                // choose a different port for the service
                    server_port = Integer.parseInt(args[0], 10);
}
                catch(Exception e)
                {
                        System.out.printin("Defaulting to port" +
DEFAULT_PORT);
                        serverport = DEFAULT_PORT;
                }
                new GenericServer(server_port);
        }
}
// Wait for a connection then act on it
class ConnectionManager extends Thread
{
        private static int_port;
        private static Vector_my_threads = new Vector(5,2);
        private ServerSocket _main_socket = null;
        public ConnectionManager(int port)
        {
            _port              =port;
        }
        public void run()
        {
            serveRequests();
        }
    public void sendToAll(String msg){
        ServerConnection s;
        for(int i = 0; i < _my_threads.size(); i++){
        s = (ServerConnection) (_my_threads.elementAt(i));
        // For each client connected send out message
        s.send(msg);
        }
    }
        private void serveRequests()
        {
            try {_main_socket = new ServerSocket(_port) ;}
            catch(Exceptjon e) { System. err. println(e); System.exit(1);)
            ServerConnection temp_sc = null;
            System.out.println(_main_socket.toString());
            while (true)
            {
                try
                {
                    Socket this_connection =
_main_socket.accept();
                    temp_sc = new
```

-continued

```
ServerConnection(this__connection, this, __my__threads. size());
                        temp__sc. start();
                        my__threads.addElement(temp__sc);
                        // clean up the vector if needed
                        for(int
i=0;i<ConnectionManager.__my__threads.size() ;i++)
        if(!((ServerConnection) (__my__threads.elementkt(i))).isAlive())
                        my__threads.removeElement(i);
                }
                catch(Exception e)
                {
                    System.err.println("Exception: \n" +e);
                }
            }
        }
}
```

As described above, the VJ Tool provides a live development or authoring environment in which socialization among objects or components can occur immediately upon their creation or instantiation without any wait to plan or test their integration. For example, as shown in FIG. 16, once the output of bicopy object 1308 was connected to text field representation 1604, the output value of scrollbar 1306 was displayed in the physical view 500. If this result is not what was desired, the user can change the connection or add another component on the fly without having to debug code or review a flowchart. Similarly, when the output of splitter 1404 is connected to the input of calculator 1502b and displayed via text field representation 1606, the user is able to make an immediate determination that the conversion calculations are correct and that the displayed arrangement is satisfactory. In other words, being able to make connections on the fly immediately proved or disproved the results obtained because VJ Tool creates a "live" environment wherein applet design creation and trial are integrated so that the result is then played out virtually simultaneously with creation. This is analogous to building a hardware prototype or test board by connecting, disconnecting and moving components around the board while the power is on!

Component 542 of FIG. 5 is a folder component in which associated components can be stored to act as templates for other applets to be designed in the future. Say, for example, that a user had designed the specific arrangement shown in FIG. 16 and dragged it as a component assembly into an object folder instantiated from folder 542. That object folder can later be opened and the component assembly stored therein be reused or its calculators modified to display Centigrade versus Kelvin or with slightly more modification to the text and label fields, feet versus meters. In fact, a hierarchy of folders can be built up in this manner. Unlike ordinary folders which are static and store only files that can be copied in an ordinary fashion, component folder 542 actually stores parts or all of a program with its interconnections intact.

To build a hierachial component, a component is instantiated on a logical or physical display. Then, a hierarchial component folder is selected and instantiated on the display. The customization (edit) window is completed to reflect an appropriate name for the particular component folder and the customization window is closed. Another window is presented for receipt of one or more components and their connections to capture and create the "hierarchial component." Thus, the hierarchial component acts as an organizer to capture debugged logic and make it available to other applets without modification.

There are several kinds of components in VJ Tool. For example, as shown in FIG. 5, there is a GUI primitive such as 508, a primitive spreadsheet 524, a primitive backend component 570 (calculator) and a backend component 558 (splitter). In addition, some of the components have the ability to be made collaborative, that is, they can interact with each other to show or indicate interdependencies. For example, if three users are working with collaborative spreadsheets, a change made by one user will also be reflected in the spreadsheets of the other two users. This makes it easy to keep all members of a team current with respect to changes in spreadsheet information. Under VJ Tools, collaborative components work as follows.

Figure 18:
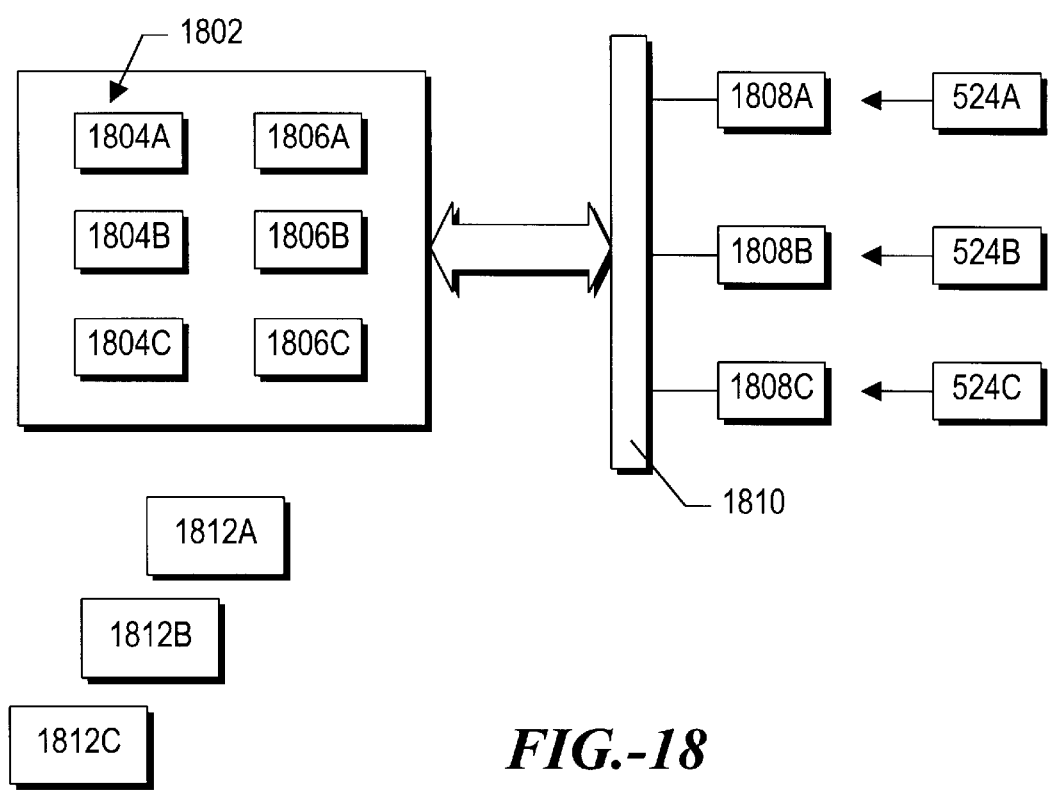
FIG. 18 is a diagram in block format of an arrangement adapted to provide collaboration between components or portions of components of an applet as designated by the user in accordance with a preferred embodiment.

To begin the collaboration process, a standard VJ Tool component, such as a spreadsheet 524, is created from the physical view palette of VJ Tool, see FIG. 5. As shown in FIG. 18, there would be a copy, 524a, 524b and 524c, of each spreadsheet object instantiated for each client user, 1806a, 1806b and 1806c, that wanted their spreadsheet to be collaboratively coupled to other spreadsheets. Collaboration can be extended to the entire spreadsheet or it can be limited to designated cells in the spreadsheet. For example, individual cells in each spreadsheet can be collaborated by simply clicking on them or the entire spreadsheet can be collaboratively coupled by simultaneously apressing the <CONTROL> key while clicking on any portion of the spreadsheet. It is also possible to have two collaborating spreadsheets completely linked to each other while one of these is linked to a third spreadsheet on a designated cell basis only.

All such standard components to be collaborated are augmented with code than connects them to a VJ Spreadsheet Server, a Java application, that is running on the same HTTP server as the VJ Tool applet. VJ Spreadsheet Server is responsible for managing the collaboration. This arrangement is necessitated by the fact that this is the only way a Java applet, when VJ Tool is implemented as a Java applet, can interact with a Java server application through a designated socket.

The clients, 1808a, 1808b and 1808c, are typically connected across the Internet 1810 to an HTTP server 1802. The HTTP server 1802 can include many applications and applets and it often does, but for the sake of clarity there are only three applications, 1804a, 1804b and 1804c, and three applets, 1806a, 1806b and 1806c, shown. Application 1804c, designated for purposes of this explanation as the Java Server, is usually a daemon server, has full access to the underlying file system and can be used to communicate with related servers, not necessarily Java servers, on the Internet.

In the simplest mode, collaborative capable components, are associated with one or more Java servers running on the same HTTP server that houses and services the VJ Tool applet. As each instance of such components are created and deployed in the VJ Tool environment, and collaboration is desired, each collaborative component to be is registered with the Java server, in this case 1804c. The process of registration builds an instance 1812a of the registering component 524a in Server 1804c. It will also build a similar instance of the other components involved, 1812b and 1812c, as they are registered. Once registered with the Java Spreadsheet Server 1804c, the component, assume it's 524a for purposes of this discussion, sends out information to Server 1804c based on interactions with the user and possibly other registered components, 524b and 524c, in the deployment environment; that is; other collaborative components to which a changing component is tied. In addition, the collaborated component 524a will receive information from Server 1804c which it may choose to use as feedback to the user or to the other collaborated components with which it is so associated. Basically, the message set "Publish cell", "Unpublish cell" and "Update cell" is used to alter cell content.

However, each time the collaborative arrangement is initialized, nothing is shared between the collaborated components unless the state of the last session was saved and reloaded at initialization into Spreadsheet Server 1802. Since the registration process builds a record in Server 1804c of which portions of which collaborated components are coupled, it is relatively straightforward for the Server to accumulate this information from a changed component, which utilizes a publish message to send it there and then republish or broadcast it to the other collaborated components to effect updating, thereby making it public. Thus, nothing is seen by any of the unchanged collaborated components until the Spreadsheet Server 1802 has relayed the changed information on to them.

Figure 19:
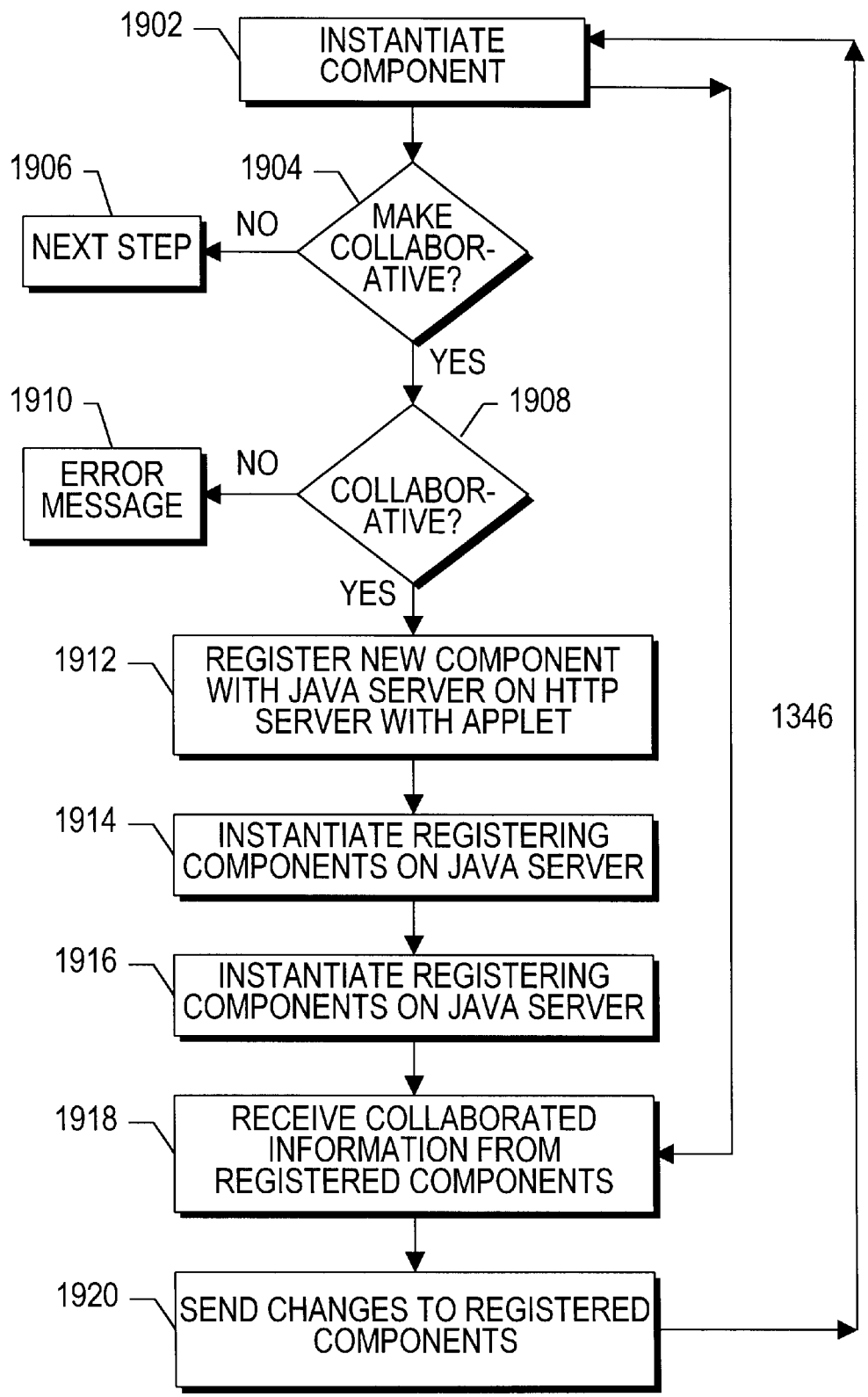
FIG. 19 presents a flowchart of the collaboration process in accordance with a preferred embodiment.

A flowchart of the collaboration process is illustrated in FIG. 19. When a new component is created as in block 1902, the user is asked by decision block 1904 if the new component should be collaborative. If not, the user and VJ Tool go off via block 1906 and do something else. If the user responds in the affirmative to the query of block 1904, to the component properties are examined to determine if this specific component can be collaborated by decision block 1908. If collaboration isn't possible, control is passed to block 1910 which sends an appropriate message to the user and then waits for the user to make another request.

If a new component can be collaborated, it is registered with a Java server as shown in function block 1912. The server, as indicated by block 1914, then builds an instance of the registering component in order to know which components it is responsible for. In addition, pursuant to block 1916, the server builds a record listing those portions, some or all, of the registered components which are linked or collaborated. Once that identity and designated linked portions of the components have been identified and recorded, the server changes the infirmation in the collaborated portions when it receives information from a component as shown in block 1918 and broadcasts the changed information to the other collaborated components via block 1920.

Collaboration within the VJ Tool, in accordance with the foregoing description, is accomplished utilizing the source code presented below.

```
import java.awt.*;
import java.net.*;
importjava.io. *;
public class VJChat extends TextArea implements VJContext {
      static String info_url = "VJChat.html";
      static String quick_info = "Chat component - chat to others using
VJ specify user name by doubleclicking icon";
      static String port_name[] = {"send in", "send out"};
      static String ports_info[] {"messages to send to chat (attach to
textField)","all incoming messages (attach to textarea)"};
      static int port_type[] = {VJPort.Input, VJPort.Output};
      static int port_location[] = {VJPort.NorthCenter
,VJPort. Southcenter};
      static int numberOfPorts = 2;
      static Image normalImage;
      static Image selectedImage;
      private auxClient client;
      static int instanceCount = 0;
      / / Instance specific attributes
      String name;
      / / To send messages to the visualJava kernel
      visualJava vj;
      public VJChat(visualjava v){
          super();
          vj = v;
          client = new auxClient(this, vj);
          client.startUp();
          name = new String("Chat "+String.valueOf(instanceCount++));
      }
  public static void getImages(GlFFactory f){
              normalImage = f.GetGIF("chat.gif");
              selectedImage = f.GetGIF("chat.gif");
  }
  String clientname = new String("");
  public void setName(String s){
    clientname = s;
    client.write("SetName(\"" + clientname + "\") ");
  }
```

-continued

```
public void handleMessage(byte msg[]){
    try{
    String s = new String(msg, 0);
    if(!s.startsWith("--")){
        s = s.substring(0, s.indexof("zzyx"));
// Output the message rec from the SERVER on port 1
// So you can see what is being chatted about!
vj.set((Object)s, 1, send_index++, (Component)this);
}
}
        catch(Exception e){};
        public boolean editorOpen false;
        public void propertiesEditor() {
        if(!editorOpen){
            propsEditor edit = new propsEditor((Frame) (vj.main_w) ,this);
            edit.pack();
            edit.resize(4*32,4*32+10);
            edit.show();
            editorOpen = true;
        }
    }
    public void reset() {}
    public String portName(int port){return port name[port]; };
    public String portInfor(int port){return ports_info[port]; };
    public String nodeInfo(){return quick_info };
    public String authorName(){return new String("The Duke's
Girlfriend"); };
    public String expirationDate(){return new String("8/10/97"); };
    public String cost() {return new String("Demo"); };
    public String version(){return new String("0.1"); };
    public boolean hasOwnThread() {return false; };
    public String componentuRL() {return info_url; }
    public int componentID() {return 5556432; }
    public void disconnecting(int port) {}
    public void connecting(int port) {
    public void load(String s) {
    }
    public String save() {
        return ""; }
    int request_index 0, send_index = 0;
    public void run() {
                                    request_index= 0;
send_index=0;
                            vj .request(0,requesundex++,this);
    }
    public void request(int port,int time) {
    }
    public void set(Object o,int port,int time) {
        if(port==0) {
            try{
        // Send the message rec on input port 0 to server for
distribution to all
        // other connected clients
                client.write("SendAllClients(\"" + (String)o + "zzyx\")");
                }
                catch(Exception e){
                }
        }
            vj.request(0,request_index++,this);
}
public String name() {return name;
public void init(){      }
public void start(){   };
public void stop(){};
public void destroy(){};
public Image getNormalImage() {return normalImage; }
public Image getSelectedImage(){return selectedImage; };
public int numberOfPorts(){return numberOfPorts; };
public int numberOfConnections(){return 0; };
public int portType(int i){return port_type[i]; };
public int portLocation(int i){return port_locahon[i]; };
    public boolean handleEvent(Event e) {
        switch(e.id){
            case VjEvent. DOUBLECLICK: propertiesEditor(); break
        }
        return false;
    }
}
```

-continued

```
class propsEditor extends Frame
{
    VJChat vjc;
    TextField tf;
    Button b;
    Button cancel;
 public propsEditor (Frame parent,VJChat c)
  {
    super("Enter name");
        setLayout(new BorderLayout());
        add("North",new Label("Name"));
        vjc = c;
        tf = new TextField(vjc.clientname);
        add("Center",tf);
        b = new Button("OK");
        cancel = new Button("Cancel");
        Panel sp = new Panel();
        sp.add(b);
    sp.add(cancel);
    add("South", sp);
}
    public boolean handleEvent(Event evt)
    {    // System.out.println(evt.toString());
        switch(evt.id){
            case Event.WINDOW_DESTROY:
            {
            vjc.editorOpen = false;
                dispose();
                return true;
            }
            case Event.ACTION_EVENT:
            {
                if("OK".equals(evt.arg))
                {   vjc.editorOpen = false;
                    vjc.setName(tf.getText());
                    dispose();
                    return true;
                }
                    if("Cancel".equals(evt.arg))
                    {    vjc.editorOpen = false;
                        dispose();
                        return true;
                    }
                    return false;
            }
            default:
                return false;
        }
    }
}
class auxClient{
private AAuxClient writer;
private DataInputStream in;
private PrintStream out;
private Socket server;
static int SERVER_PORT = 4000;
VJChat creator;
visualJavavj;
public auxClient(VJChat t, visualJava v){
        creator = t;
vj = v;
initSocket();
}
public void startUp(){
    AAuxClient reader = new AAuxClient(this, in, out);
            Thread t = new Thread(reader);
            t.setpriority(Thread.MIN_PRIORITY);
        writer = new AAuxClient(this, in, out);
            t.start();
    }
    public void write(String s){
        writer.send(s);
    }
    public void handleMessage(byte[] b){
        creator.handleMessage(b);
    }
```

-continued

```
    private void initSocket(){
        byte bytes[] = new byte[4096];
        int c;
        try{
            server = new Socket(vj.getDocumentBase().getHost(),
SERVER_PORT);
            in = new DataInputStream(server.getInputStream());
            out = new PrintStream(server.getOutputStream());
        }
    catch(Exception e){
        try{
        server.close();
    }
    catch(Exception e2){
            System.err.println("Exception: \n" + e);
            //System.exit(1);
        }
            //System.exit(1);
        }
    }
}
class AAuxClient implements Runnable
}
            DataInputStream input = null;
            PrintStream output = null;
    auxClient creator;
    boolean inputValid = false;
            public AAuxClient(auxClient b, DataInputStream in,
PrintStream out){
            creator = b;
    input = in;
    output = out;
        }
        public void run(){
            String msg;
                int n;
                byte[] b = new byte[500];
                    while(true){
                        try{
                    while(input.available() == 0){
                        Thread.sleep(100);
                }
            }
                    catch(Exception e){
                    System.out.println("IO exception in run()");
                    }
                b = receive();
                    if(b.length == 0){
                    return;
            }
                service(b);
        }
            }
        public boolean send(byte b[], int length){
            try{
                    output.write(b, 0, length);
                output.flush();
        }
            catch(Exception e){
            return false;
            }
            return true;
            }
    public boolean send(String s){
        byte[] b = new byte[200];
        s.getBytes(0, s.length(), b, 0);
        return send(b, s.length());
    }
    private void service(byte msg[]){
        creator.handleMessage(msg);
            }
            private byte[] receive(){
                byte[] b = new byte[200];
    try{
        input.read(b);
    }
```

```
        catch(Exception e){
    return new byte[0];
        }
    return b;
        }
}
```

Figure 20:
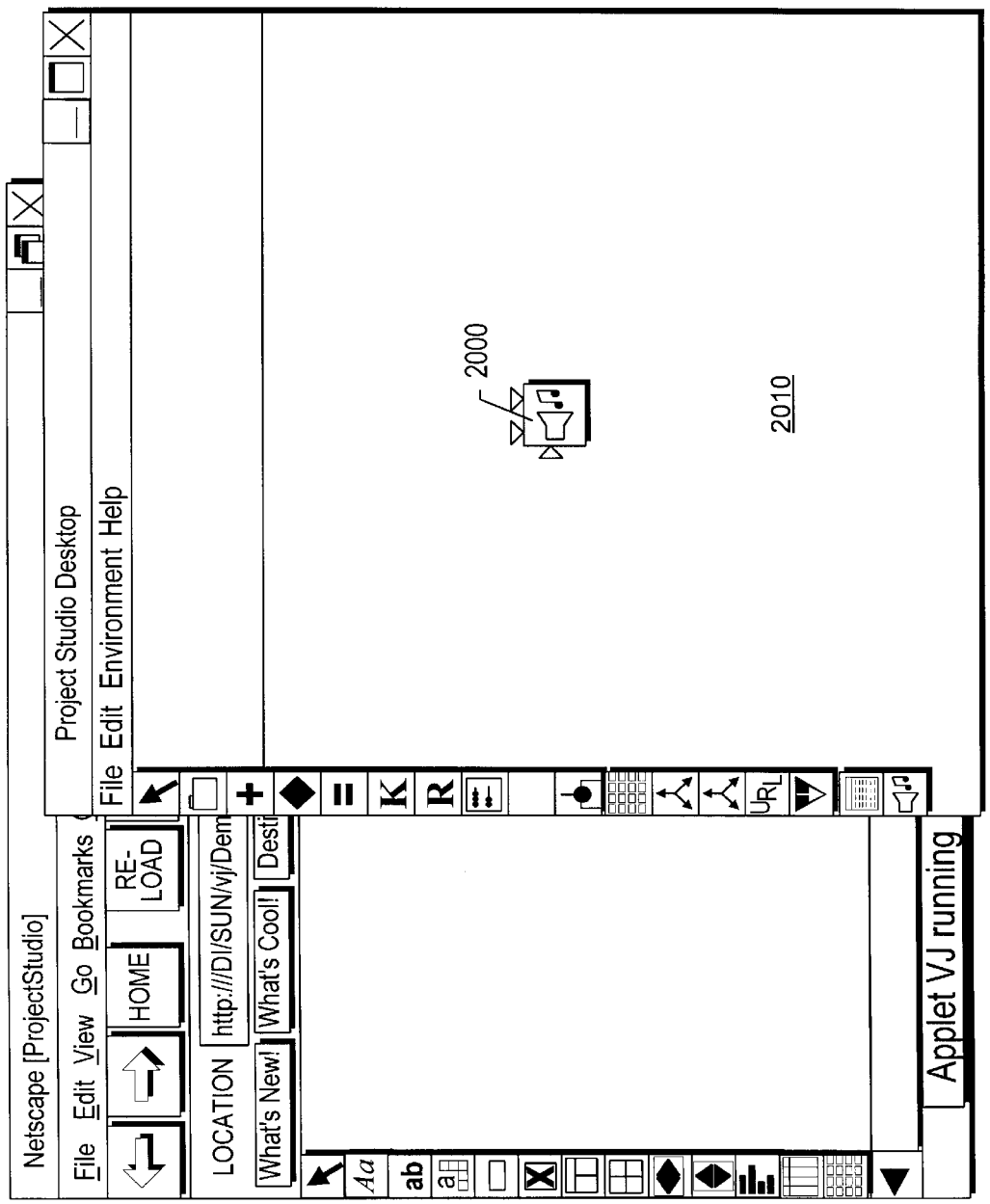
FIG. 20 illustrates a screen with the logical view in accordance with a preferred embodiment.

FIG. 20 illustrates a screen with the logical view in accordance with a preferred embodiment. A sound component 2000 has been instantiated on the logical view by dropping a sound icon onto the logical desktop 2010.

Figure 21:
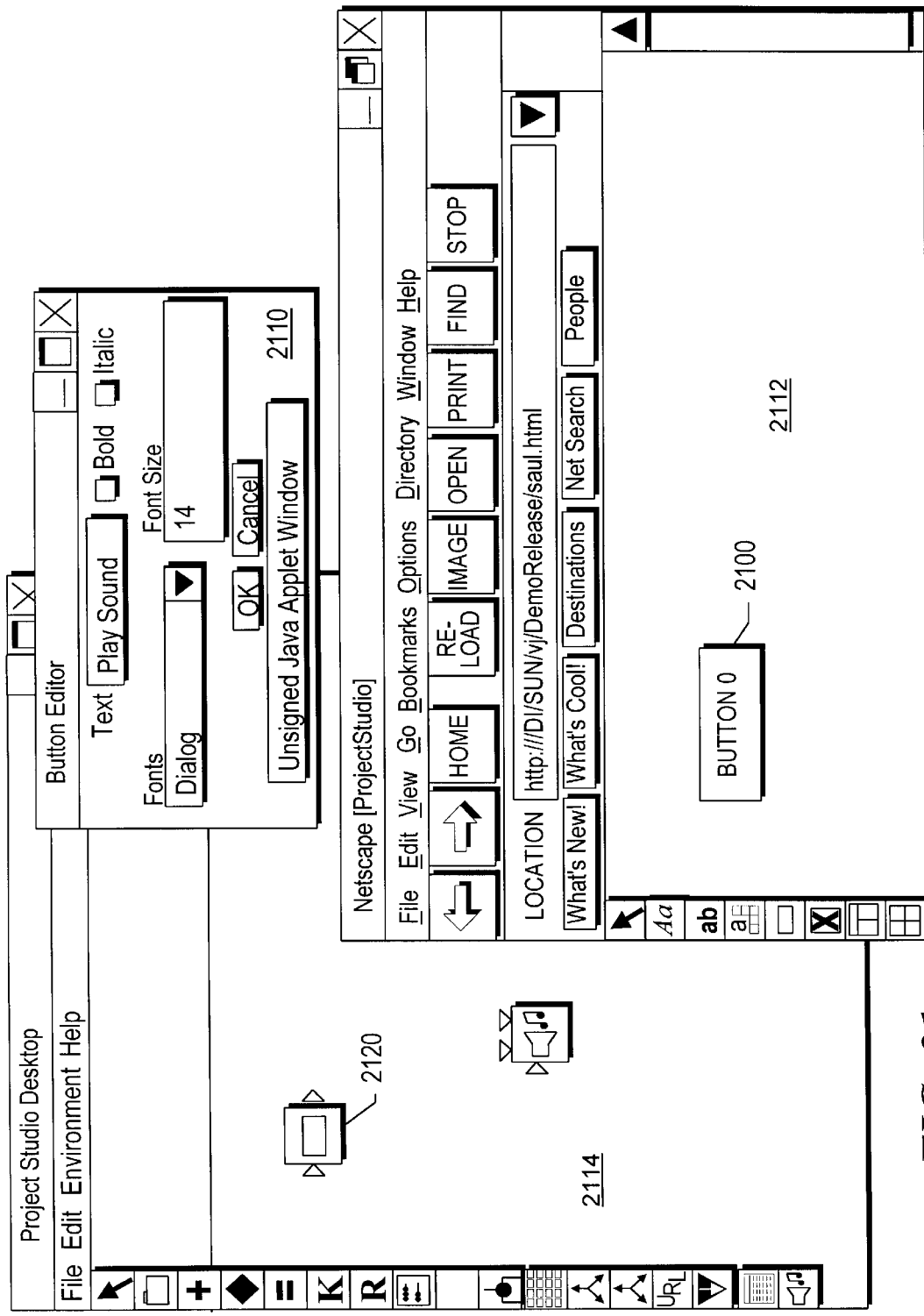
FIG. 21 illustrates a screen with the logical and physical view preparing a hierarchial component in accordance with a preferred embodiment.

FIG. 21 illustrates a screen with the logical and physical view preparing a hierarchical component in accordance with a preferred embodiment. A button 2120 has been instantiated and customized 2110 on the logical desktop 2114 and its physical representation 2100 is also reflected in the physical desktop 2112.

Figure 22:
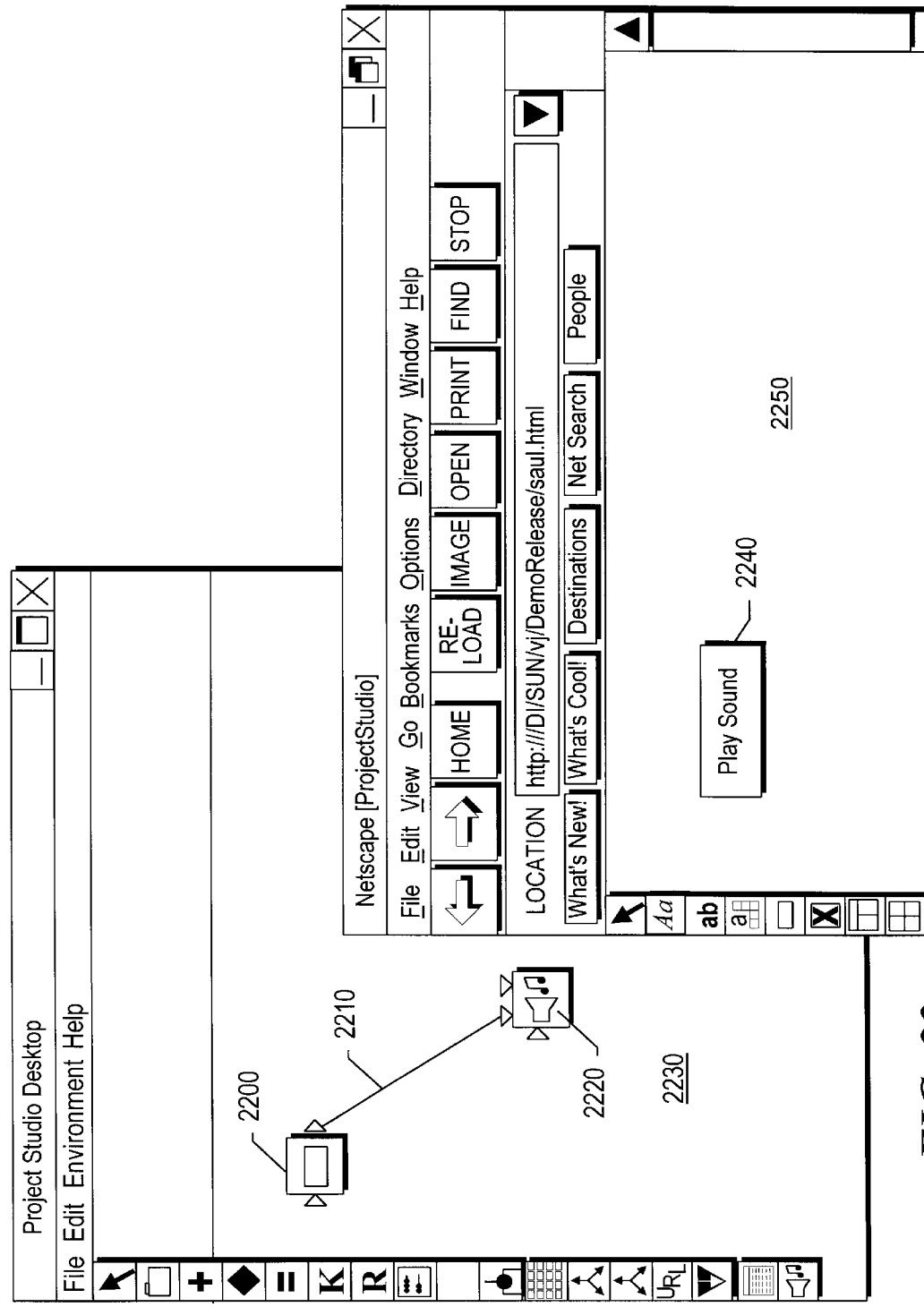
FIG. 22 illustrates a screen with a connection made for playing a sound in accordance with a preferred embodiment.

FIG. 22 illustrates a screen with a connection made for playing a sound in accordance with a preferred embodiment. The button component 2200 is connected 2210 to the sound component 2220 in the logical desktop 2230. The Play Sound Button component 2240 is the physical view in the physical desktop 2250.

Figure 23:
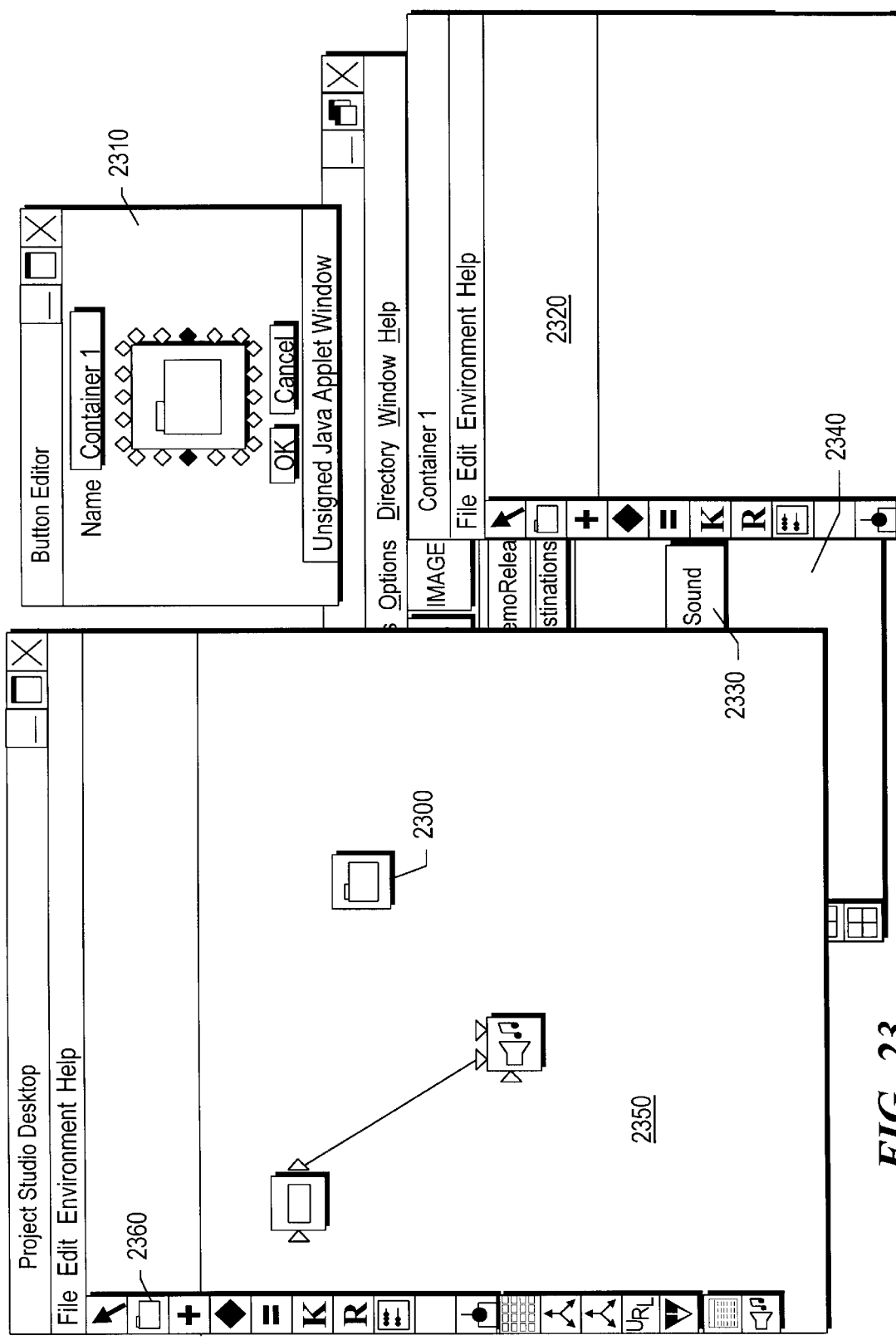
FIG. 23 illustrates an edit screen for a folder component utilized to prepare a hierarchial component in accordance with a preferred embodiment.

FIG. 23 illustrates an edit screen for a folder component utilized to prepare a hierarchical component in accordance with a preferred embodiment. A Container 1 folder 2300 is instantiated in the logical desktop 2350 by dropping a folder component 2360 on the desktop. A customize or edit window 2310 pops up when the folder is instantiated. This edit window can be utilized to change the name of the folder and the number, location and type of active ports of the folder component. The Container 1 folder is logically represented by a window 2320 where the logic of the folder (hierachial component) can be created on the fly by adding or deleting components in the window 2320. The button 2330 is also shown in the physical desktop 2340.

Figure 23A:
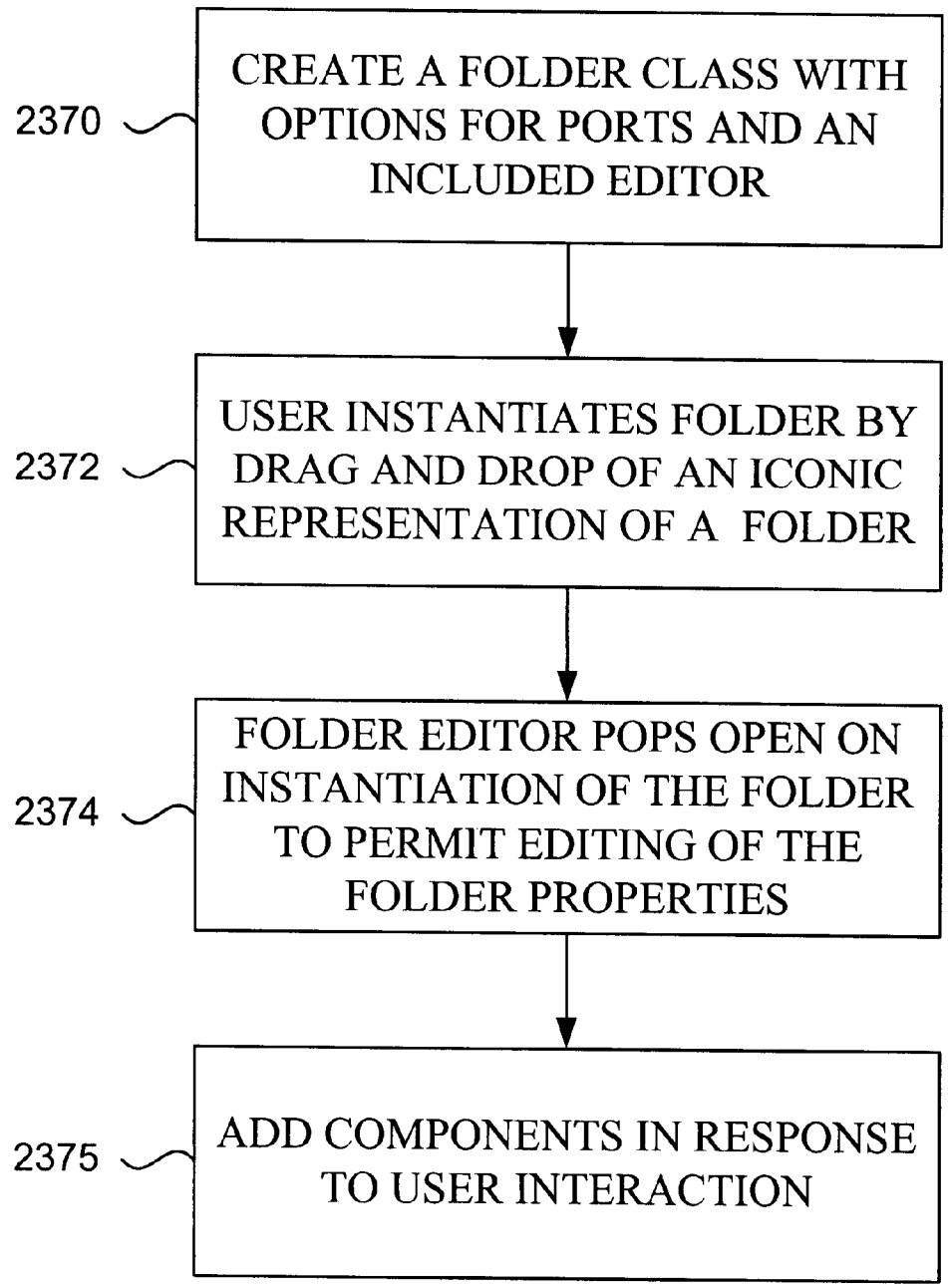

As shown in FIG. 23A, a folder class with options for unidirectional and bidirectional ports and an editor is first created as depicted by block 2370. The user instantiates a folder component by dragging and dropping it onto the logical desktop 2350 as reflected by block 2372. When the folder is instantiated and its edit window 2310 pops up, as described above, the folder name and the number, location and type of ports can be selected or changed. This capability is reflected in block 2374. Finally, as shown by block 2376, the folder component waits on the user to indicate what other components, including other folders, should be placed within it. This procedure is described hereafter in connection with FIG. 24.

Figure 24:
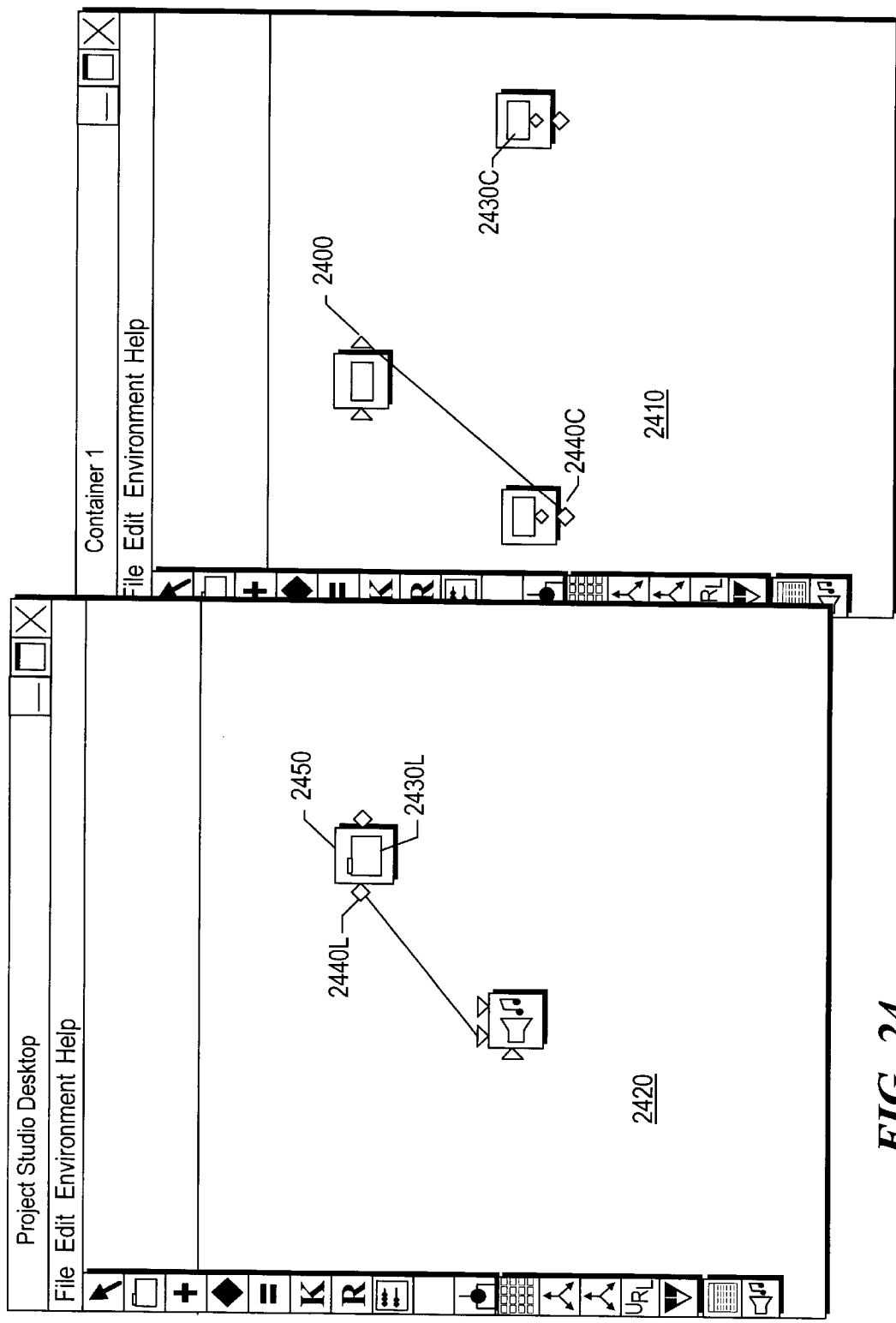
FIG. 24 illustrates a hierarchial component creation customization in accordance with a preferred embodiment.

FIG. 24 illustrates a hierarchical component creation customization in accordance with a preferred embodiment. The button 2400 which was originally in the logical desktop 2420 has been moved into the Container 1 folder 2410. The internal connectors 2430C and 2440C are represented in the Container 1 folder 2410 and refer back to the logical desktop ports 2440L and 2430L of the folder 2450 in the logical desktop 2420. The ports can be used to transfer information into and out of a folder 2410. One of ordinary skill in the art will readily recognize that other components could be added to the Container 1 folder 2410 to create a more complex hierarchical component which could even include nested and recursive hierarchical components.

Figure 25:
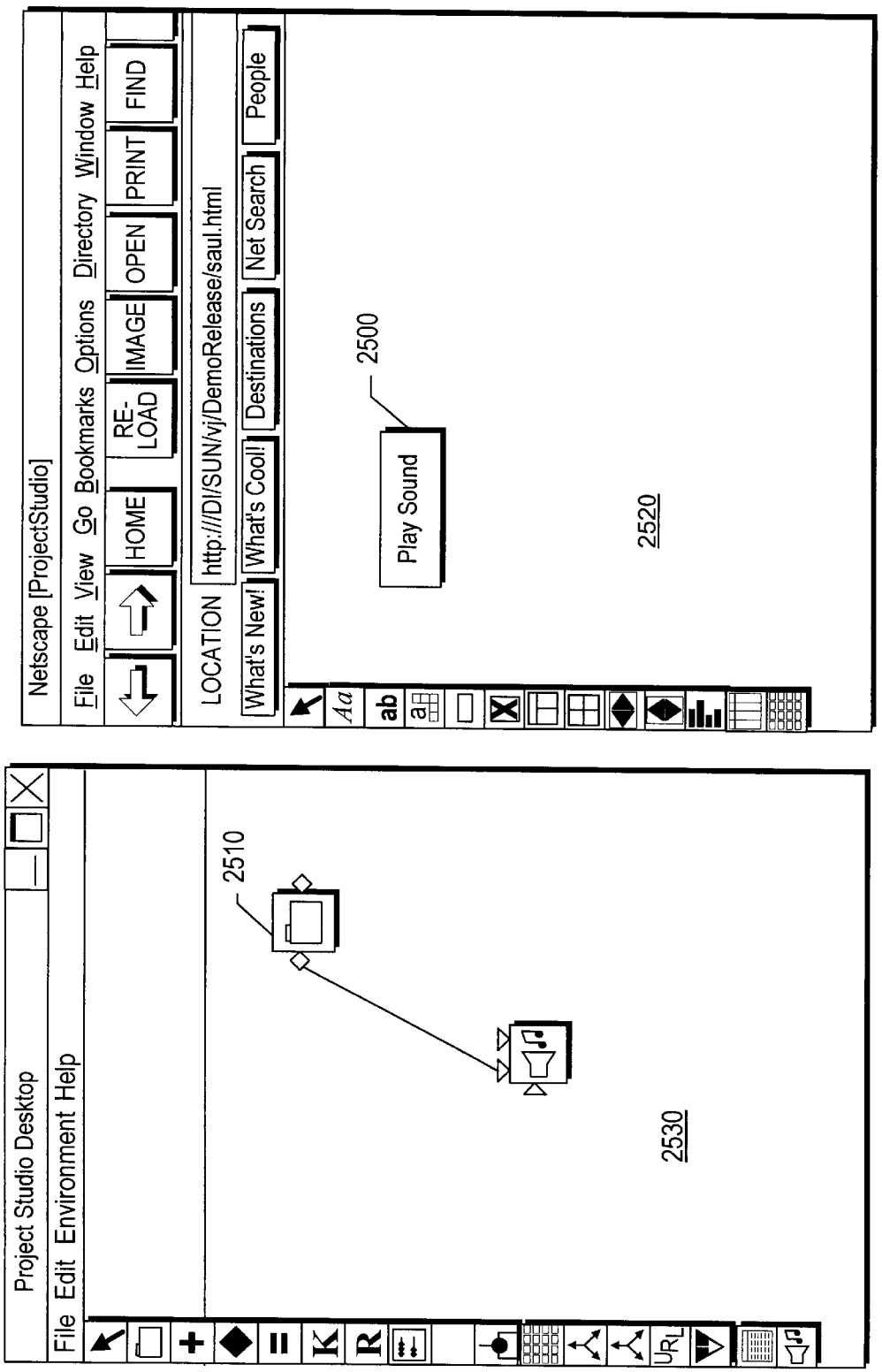
FIG. 25 illustrates the completed physical view of a hierarchial component in accordance with a preferred embodiment.

FIG. 25 illustrates the completed physical view of a hierarchical component in accordance with a preferred embodiment. The sound button 2500 in the physical view 2520 is now inside the folder 2510 which can be used to simplify complex logic on the logical desktop 2530 and reduce screen clutter. This technique can be utilized to capture debugged components and component assemblies in a single representation of many components. Users can thus create their own components.

While the invention is described in terms of preferred embodiments in a specific system environment, those skilled in the art will recognize that the invention can be practiced, with modification, in other and different hardware and software environments within the spirit and scope of the appended claims.

What is claimed is:

1. A method of developing software in an object-oriented applet or application developing environment, the method comprising:

providing an application development environment configured to enable construction of software by defining connections between at least two object-oriented software components that are graphally resented in the application development environmet;

providing a first object-oriented software component having a bidirectional port, the bidirectional port having a graphical reprentation being presented in the application development environment and the bi-directonal port configured to enable the connection of the first object-oriented software component to a second object-oriented software component by allowing connection of the bi-directional port to a second graphical representation in the application development elavironment, the second graphical representation representing a second port that is associated with the second object-oriented software;

initializing the bidirectional port of the first object-oriented software component to a two-way state by assigning a first and a second logic to service inputs and service outputs associated with the bidirectional port respectively;

determining whether the bidirectional port should serve as input or output;

amending a first input output status associated with the bidirectional port to reflect the current status of the bidirectional port as input or output;

sending a message to the second object-oriented software component that is to be connected with the first object-oriented software component, the message indicating the input output status of the bidirectional port of the first object-oriented software component;

comparing the first input output status associated with the bidirectional port of the first object-oriented software to a second input output status associated with the second port of the second object-oriented software component;

permitting the connection of the first object-oriented software component to the second object-oriented software component when the first input output status is opposite to the second input output status of the second object-oriented software component.

2. The method according to claim 1 which includes the step of switching the status of the second connected port to be opposite that of the first connected port if the second connected port is bidirectional.

3. The method according to claim 2 which includes the step of prohibiting the connection if the second connected port is unidirectional and its input output status conflicts with that of the first connected port.

4. The method according to claim 3 which includes the step of sending an error message to the user if the second connected port is not bidirectional and has an input output status that is the same as that of the first connected port.

5. The method according to claim 1 which includes the step of prohibiting the connection if the second connected port is unidirectional and its input output status conflicts with that of the first connected port.

6. The method according to claim 5 which includes the step of sending an error message to the user if the second connected port is not bidirectional and has an input output status that is the same as that of the first connected port.

7. The method according to claim 1 which includes the step of sending an error message to the user if the second connected port is not bidirectional and has an input output status that is the same as that of the first connected port.

8. A software development system operating to provide the ability to connect object-oriented software components in an object-oriented applet or application environment, the software development system comprising:

an application development environment configured to enable the construction of software by defining connections between at least two object-oriented software components that are graphically represented in the application development environment;

a first object-oriented software component having a bidirectional port, the bidirectional port configured to enable the connection of the first object-oriented software component to a second object-oriented software component through a second port that is associated with the second object-oriented software by allowing connection of a graphical representation of the bi-directional port to a second graphical representation of a second port associated with the second object-oriented software;

a port initializer that initializes the bidirectional port of the first object-oriented software component to a two-way state by assigning a first and a second logic to service inputs and service outputs associated with the bidirectional port respectively;

a first input output status associated with the bidirectional port to reflect the current status of the bidirectional port as input or output, the current status of the bidirectional port being set based on the determination of whether the bidirectional port should serve as input or output;

a message transmitter for sending a message to the second object-oriented software component that is to be connected with the first object-oriented software component, the message indicating the input output status of the bidirectional port of the first object-oriented software component;

a comparator for comparing the first input output status associated with the bidirectional port of the first object-oriented software to a second input output status associated with the second port of the second object-oriented software component;

a facilitator for permitting the connection of the first object-oriented software component to the second object-oriented software component when the first input output status is opposite of the second object-oriented software component.

9. The system according to claim 8 which additionally comprises a port switcher that converts the status of the second connected port to be opposite that of the first connected port if the second connected port is bidirectional.

10. The system according to claim 9 which additionally comprises a facilitator that prevents the connection if the second connected port is unidirectional and its input output status conflicts with that of the first connected port.

11. The system according to claim 10 which additionally comprises an error message generator that sends an error message to the user if the second connected port is not bidirectional and has an input output status that is the same as that of the first connected port.

12. The system according to claim 8 which additionally comprises a facilitator that prevents the connection if the second connected port is unidirectional and its input output status conflicts with that of the first connected port.

13. The system according to claim 12 which additionally comprises an error message generator that sends an error message to the user if the second connected port is not bidirectional and has an input output status that is the same as that of the first connected port.

14. The system according to claim 8 which additionally comprises an error message generator that sends an error message to the user if the second connected port is not bidirectional and has an input output status that is the same as that of the first connected port.

15. A computer program embodied on a computer-readable medium for developing software in an object-oriented applet or application environment, the computer program comprising:

computer embodied code for providing an application development environment configured to enable the construction of software by defining connections between at least two object-oriented software components that are graphically represented in the application development environment;

computer embodied code for providing a first object-oriented software component having a bidirectional port, the bidirectional port having a graphical reprentation begin presented in the application development environment and configured to enable the connection of the first object-oriented software component to a second object-oriented software component by allowing connection of the graphical representation of the bidirectional port to a second graphical representation in the application development environment, the second graphical representation representing a second port that is associated with the second object-oriented software;

computer embodied code for initializing the bidirectional port of the first object-oriented software component to a two-way state by assigning a first and a second logic to service inputs and service outputs associated with the bidirectional port respectively;

computer embodied code for determining whether the bidirectional port should serve as input or output;

computer embodied code for amending a first input output status associated with the bidirectional port to reflect the current status of the bidirectional port as input or output;

computer embodied code for sending a message to the second object-oriented software component that is to be connected with the first object-oriented software component, the message indicating the input output status of the bidirectional port of the first object-oriented software component;

computer embodied code for comparing the first input output status associated with the bidirectional port of the first object-oriented software to a second input output status associated with the second port of the second object-oriented software component;

computer embodied code for permitting the connection of the first object-oriented software component to the second object-oriented software component when the first input output status is opposite of the second object-oriented software component.

16. The computer program embodied on a computer-readable medium as recited in claim 15 which additionally comprises sixth software for switching the status of the second connected port to be opposite that of the first connected port if the second connected port is bidirectional.

17. The computer program embodied on a computer-readable medium as recited in claim 16 which additionally comprises seventh software for prohibiting the connection if the second connected port is unidirectional and its input output status conflicts with that of the first connected port.

18. The computer program embodied on a computer-readable medium as recited in claim 17 which additionally comprises eighth software for sending an error message to the user if the second connected port is not bidirectional and has an input output status that is the same as that of the first connected port.

19. The computer program embodied on a computer-readable medium as recited in claim 15 which additionally comprises sixth software for prohibiting the connection if the second connected port is unidirectional and its input output status conflicts with that of the first connected port.

20. The computer program embodied on a computer-readable medium as recited in claim 19 which additionally comprises seventh software for sending an error message to the user if the second connected port is not bidirectional and has an input output status that is the same as that of the first connected port.

21. The computer program embodied on a computer-readable medium as recited in claim 15 which additionally comprises sixth software for sending an error message to the user if the second connected port is not bidirectional and has an input output status that is the same as that of the first connected port.

22. A method as recited in claim 1 wherein when the second port associated with the second object-oriented software component is a bidirectional port, the input output status associated with the second port is set to be the opposite of the input output status of the first bidirectional port.

23. A method as recited in claim 1, wherein when a third bidirectional port is also associated with the first object-oriented software component, a third input output status associated with the third bidirectional port is set to be the opposite of the input output status of the first bidirectional port.

24. A method as recited in claim 22, wherein when a fourth bidirectional port is also associated with the second object-oriented software component, the input output status associated with the second port is set to be the opposite of the input output status of the fourth bidirectional port.

25. A system as recited in claim 8, wherein when the second port associated with the second object-oriented software component is a bidirectional port, the input output status associated with the second port is set to be the opposite of the input output status of the first directional port.

26. A system as recited in claim 8, wherein when a third bidirectional port is also associated with the first object-oriented software component, the input output status associated with the third port is set to be the opposite of the input output status of the first bidirectional port.

27. A system as recited in claim 25, wherein when a fourth bidirectional port is also associated with the second object-oriented software component, the input output status associated with the second port is set to be the opposite of the input output status of the fourth bidirectional port.

28. A computer program as recited in claim 15, wherein when the second port associated with the second object-oriented software component is a bidirectional port, the input output status associated with the second port is set to be the opposite of the input output status of the first bidirectional port.

29. A computer program as recited in claim 15, wherein when a third bidirectional port is also associated with the first object-oriented software component, the input output status associated with the third port is set to be the opposite of the input output status of the first bidirectional port.

30. A computer program as recited in claim 28, wherein when a fourth bidirectional is also associated with the second object-oriented software component, the input output status associated with the second port is set to be the opposite of the input output status of the fourth bidirectional port.

* * * * *

UNITED STATES PATENT AND TRADEMARK OFFICE
CERTIFICATE OF CORRECTION

PATENT NO. : 6,438,615 B1
DATED : August 20, 2002
INVENTOR(S) : Faustini

It is certified that error appears in the above-identified patent and that said Letters Patent is hereby corrected as shown below:

Column 136,
Line 31, change "graphally represented" to -- graphically represented --
Line 35, change "reprentation" to -- representation --
Line 41, change "elavironment" to -- environment --

Column 138,
Line 46, change "begin" to -- being --

Signed and Sealed this

Tenth Day of February, 2004

JON W. DUDAS
*Acting Director of the United States Patent and Trademark Office*